US006695321B2

(12) United States Patent
Bedi et al.

(10) Patent No.: US 6,695,321 B2
(45) Date of Patent: Feb. 24, 2004

(54) QUICK-CONNECT MECHANISM

(75) Inventors: Sanjeev Bedi, Waterloo (CA); Kailash C. Vasudeva, Waterloo (CA)

(73) Assignee: Maxtech Manufacturing Inc., Waterloo (CA)

( * ) Notice: Subject to any disclaimer, the term of this patent is extended or adjusted under 35 U.S.C. 154(b) by 34 days.

(21) Appl. No.: 09/783,082

(22) Filed: Feb. 15, 2001

(65) Prior Publication Data

US 2001/0042964 A1 Nov. 22, 2001

Related U.S. Application Data

(63) Continuation-in-part of application No. PCT/CA00/00521, filed on May 3, 2000.
(60) Provisional application No. 60/132,226, filed on May 3, 1999.

(51) Int. Cl.$^{7}$ .............................................. B23B 31/107
(52) U.S. Cl. ............................. 279/22; 279/30; 279/75; 279/82; 279/905
(58) Field of Search ............................. 279/22, 30, 75, 279/904–906, 78, 82, 155

(56) References Cited

U.S. PATENT DOCUMENTS 2,177,979 A * 10/1939 Davis ......................... 279/155
4,632,613 A * 12/1986 Wollermann ................ 279/155
4,692,073 A * 9/1987 Martindell ................... 279/75
5,398,946 A 3/1995 Quiring
5,682,800 A 11/1997 Jore
5,722,805 A 3/1998 Giffin
5,779,404 A 7/1998 Jore
5,881,613 A 3/1999 Han
6,053,675 A * 4/2000 Holland et al. ............... 279/82
6,261,035 B1 * 7/2001 Moores, Jr. et al. .......... 279/82
6,270,085 B1 * 8/2001 Chen et al. ................... 279/22
6,325,393 B1 * 12/2001 Chen et al. ................... 279/30
6,347,914 B1 * 2/2002 Boyle et al. ................ 408/240
6,474,656 B1 * 11/2002 Thomas ....................... 279/30

FOREIGN PATENT DOCUMENTS

| | | |
|---|---|---|
| DE | 42 07 337 C1 | 6/1993 |
| WO | WO 97/21512 | 6/1997 |

* cited by examiner

*Primary Examiner*—Steven C. Bishop
(74) *Attorney, Agent, or Firm*—R. Craig Armstrong; Borden Ladner Gervais LLP

(57) ABSTRACT

A holder having a quick-connect mechanism actuated by inserting a single- or double-ended tool bit, the tool bit engaging means to force deflection of retaining means, where the retaining means actuate means for engaging the tool bit, and released by manual operation of the retaining means, whereby the tool bit is pushed out from the holder so that the user can operate the tool bit holder using one hand only.

4 Claims, 68 Drawing Sheets

QUICK-CONNECT MECHANISM

REFERENCE TO RELATED APPLICATIONS

This is a continuation-in-part application, based on and claiming the benefit of international application no. PCT/CA00/00521, filed May 3, 2000 and designating the United States. That application claimed the benefit of U.S. provisional application No. 60/132,226, filed May 3, 1999.

BACKGROUND OF THE INVENTION

1. Field of the Invention

This invention relates to a quick-connect mechanism for receiving tools and tool bits, the mechanism being embodied in a holder which it turn may be mounted, permanently or removably, in a driving tool such as a power drill for example, or a hand tool such as a screwdriver for example.

2. Description of the Prior Art

Traditional quick-connect mechanisms for connecting tools to a holder are shown in, for example, U.S. Pat. No. 5,779,404 (Jore). This mechanism has the apparent drawback of not allowing an operator to insert and release the tool using only one hand (the other hand would be used to grip the power tool or hand tool which would power the tool/holder), necessitating the sleeve to be retracted manually to release the tool from the holder.

SUMMARY OF THE INVENTION

It is an object of the invention to provide an improved holder for tools or tool bits such as drill bits, screwdriver bits or the like, the holder being simple to produce and assemble, and yet performing the required functions well.

The invention provides a holder which has a quick-connect mechanism actuated by inserting a bit, the bit engaging means to force retraction of a collar, where the collar actuates means for engaging the bit, and released by manual retraction of the collar, whereby the tool bit is release from the holder.

In the invention, a holder for holding a tool bit comprises an elongate connector means attachable to a power tool/hand tool, the connector having a longitudinal hole with a cross-section corresponding to the cross-section of a mounting portion of the tool bit. The connector means further includes a first radial hole running from an outside surface of the connector to the longitudinal hole, the first radial hole having a large diameter bore portion at the outside surface of the connector and a small diameter bore portion at the longitudinal hole, and a substantially truncated hemispherical shape. A substantially spherical locking ball is movably arranged in the first radial hole, cooperating with the substantially truncated hemispherical shape of the first radial hole, where the locking ball cooperates with a circumferential groove in the tool bit to lock the tool bit in place when the tool bit is fully inserted into the holder. An outer sleeve is arranged to reciprocally slide over the first connector between two end positions. The outer sleeve has a first end facing the tool bit and a second end facing the tool mount. The connector means is attachable to a power tool or hand tool via a tool mount. The outer sleeve has a stepped inside diameter, having a smaller diameter part facing the power tool or hand tool, and a larger diameter part facing the tool bit. A bevelled transition is arranged between the two different diameter parts, the bevelled transition is arranged to cooperate with a transition ball. A sleeve biasing means, for example a coil spring, is arranged to bias the sleeve away from the tool mount. The transition ball is arranged in a transition hole in the connector means. The transition hole is substantially radial, and preferably, but not necessarily, angled so that the bottom of the transition hole is arranged further from the tool mount than the top of the transition hole. Alternatively, the transition hole is substantially perpendicular to the longitudinal hole. Thus, the transition ball, which has a diameter substantially corresponding to the diameter of the transition hole, is slidable between a first position at the bottom of the transition hole, to a second position protruding from the top of the transition hole. The bevelled transition is pressed against the transition ball by the sleeve biasing means.

The sleeve is held in its end positions by a mechanism comprising a locking cavity, which cooperates with a locking ring arranged in a locking ring groove arranged on the elongate connector means, to limit the stroke of the sliding movement of the sleeve along the elongate connector means in the direction towards the tool mount or handle by the locking ring blocking further movement because the locking ring contacts the edge of the locking cavity, and in the direction towards the tool bit by the bevelled transition contacting the transition ball in its position at the bottom of the transition hole, which protrudes enough to block the movement of the sleeve when the bevelled transition contacts the larger diameter portion of the elongate connector means. In the latter position, the sleeve is prevented from sliding towards the tool mount or handle, under the biasing influence of the biasing means, by the frictional forces present between the inside of the sleeve and the locking ring.

When the tool bit is inserted into the longitudinal hole, the inserted end of the tool bit will push the transition ball radially outwards in the transition hole. The transition ball is pressed by the inserted end of the tool bit, from its position at the bottom of the transition hole towards the sleeve and the bevelled transition, thus pressing the sleeve towards the tool mount or handle. A locking portion of the sleeve effectively blocks the locking ball from movement in the first radial hole, locking the tool bit in the longitudinal hole.

In a further embodiment of the invention, the sleeve has a locking cavity, which cooperates with a locking ring arranged in a locking ring groove arranged on the elongate connector means to limit the stroke of the sliding movement of the sleeve along the elongate connector means, by either edge of the locking cavity contacting the sides of the locking ring to provide the blocking of the sleeve. The outer sleeve is arranged to reciprocally slide over the connector means between two end positions, and has a stepped inside diameter, having a smaller diameter part facing the tool mount and a larger diameter part facing the tool bit. A middle diameter part is arranged between the smaller and the larger diameter parts, having a diameter which is larger than the diameter of the small diameter part but smaller than the diameter of the large diameter part. The middle diameter part is arranged to house a sleeve biasing means. A bevelled transition is arranged between the large and middle diameter parts. The bevelled transition functions similarly to the bevelled transition described for the earlier embodiment, in cooperation with a transition ball.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 2:
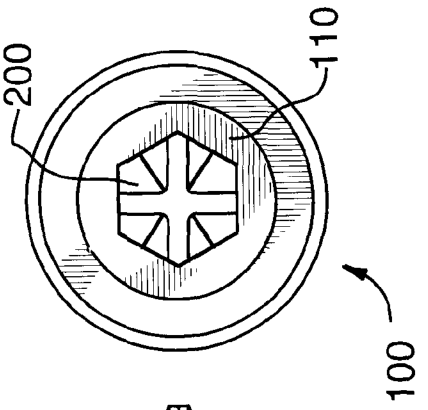
FIG. 2 is a frontal view of the device of FIG. 1.
Figure 1:
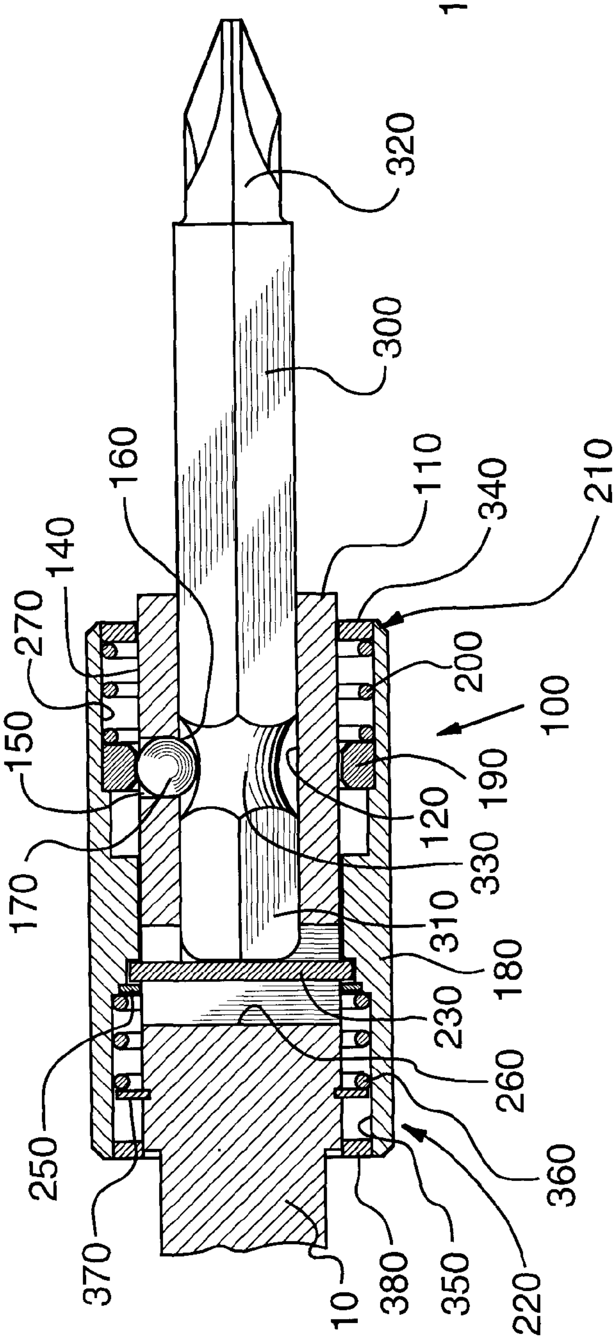
FIG. 1 is a sectional side view of a device according to a first embodiment of the invention, showing an exchangeable bit tool in its locked position in the tool holder.

Referring to FIGS. 1 and 2, a holder 100, for example mounted on a power tool or a hand tool for securely holding any one of a plurality of exchangeable tool bits 300, comprises an elongate connector means 110 and an outer sleeve 180. The connector means is attachable to a power tool or a hand tool via a tool mount 10.

The connector means 110 has a central longitudinal hole 120, which has a cross-section corresponding to the cross-section of a mounting portion 310 of the tool bit. The mounting portion of the tool bit may thus be inserted into the longitudinal hole of the connector means. The tool bit further has a profiled working portion 320 opposite the mounting portion. The connector means includes a first radial hole 130 (see FIG. 6) which runs from an outside surface 140 of the connector means to the longitudinal hole. The first radial hole has a large diameter bore portion 150 at the outside surface of the connector means and a small diameter bore portion 160 at the radial hole. The first radial hole 130 further has a substantially truncated hemispherical shape, which cooperates with a substantially spherical locking ball 170 movably arranged in the first radial hole. The locking ball may, in principle, move from a position outside the longitudinal hole to a position where the locking ball protrudes a distance into the longitudinal hole 120, but further movement is blocked because the diameter of the small diameter portion 160 of the first radial hole is smaller than the diameter of the locking ball. The locking ball 170 cooperates with a circumferential groove 330 in the tool bit 300 to lock the tool bit in place when the tool bit is fully inserted into the holder 100.

The outer sleeve 180 is arranged to reciprocally slide over the connector means 110 between two end positions. The outer sleeve has a first end 210 facing the tool bit 300 and a second end 220 facing the power tool or hand tool tool mount 10. A guiding bar 230 is mounted inside the outer sleeve in a radial position, i.e. transversely mounted compared to the longitudinal direction of the outer sleeve. The guiding bar is preferably mounted in a bar groove 240 (see FIG. 5) in the outer sleeve and held in place by a guiding bar retainer 250. The connector means 110 has a transverse through slot 260 in which the guiding bar may slide. The axial width of the through slot is larger than the radial width of the through slot, and the axial width defines the stroke of the outer sleeve 180. The guiding bar 230 may thus slide between two end positions, defined by the axial width of the through slot of the connector means.

On the inside of the first end 210 of the outer sleeve, a stepped recess 270 is arranged. The stepped recess preferably has a first large diameter part 280 (see FIG. 5) and a second smaller diameter part 290 (see FIG. 5). Both the first part 280 and the second part 290 have diameters which are larger than the outer diameter of the connector means 110. A locking ball depressor 190 is arranged to reciprocally slide inside the first large diameter part of the stepped recess. The depressor preferably is formed as a ring having an inner diameter which is slightly larger than the outer diameter of the connector means 110 and an outer diameter which is slightly smaller than the diameter of the first large diameter part 280 of the stepped recess 270. A depressor biasing means 200, for example a coil spring, is arranged to bias the depressor against the step between the first large diameter part and the second small diameter part of the stepped recess. A first end cap 340 is arranged at the first end 210 of the outer sleeve 180 to hold the depressor biasing means inside the stepped recess 270. The first end cap is preferably ring formed, having an outer diameter which is slightly larger than the larger diameter of the stepped recess 270, thus enabling the first end cap to be press fit into the stepped recess, and an inside diameter which is slightly larger than the outer diameter of the connector means 110, thus enabling the connector means to protrude through the first end cap.

On the inside of the second end 220 of the outer sleeve, a second recess 350 is arranged. The second recess has a diameter which is larger than the outer diameter of the connector means 110. A second end cap 380 is arranged at the second end of the outer sleeve 180. The second end cap is preferably ring formed, having an outer diameter which is slightly larger than the diameter of the second recess 350, thus enabling the second end cap to be press fit into the second recess, and an inside diameter which is slightly larger than the outer diameter of the connector means 110, thus enabling the connector means to protrude through the second end cap. A sleeve biasing means 360 is arranged between the guiding bar retainer 250 and a sleeve retainer means 370 to bias the outer sleeve in a direction away from the tool mount 10. The sleeve retainer means is arranged on the part of the connector means 110 which faces the tool mount and is preferably shaped as a ring which fits in a retainer groove on the connector means.

As shown in FIG. 1, the tool bit 300 is locked in the longitudinal hole 120 of the connector means 110 by the locking ball 170. The locking ball is prevented from moving from its position, protruding into the longitudinal hole, by the locking ball depressor 190.

Figure 3:
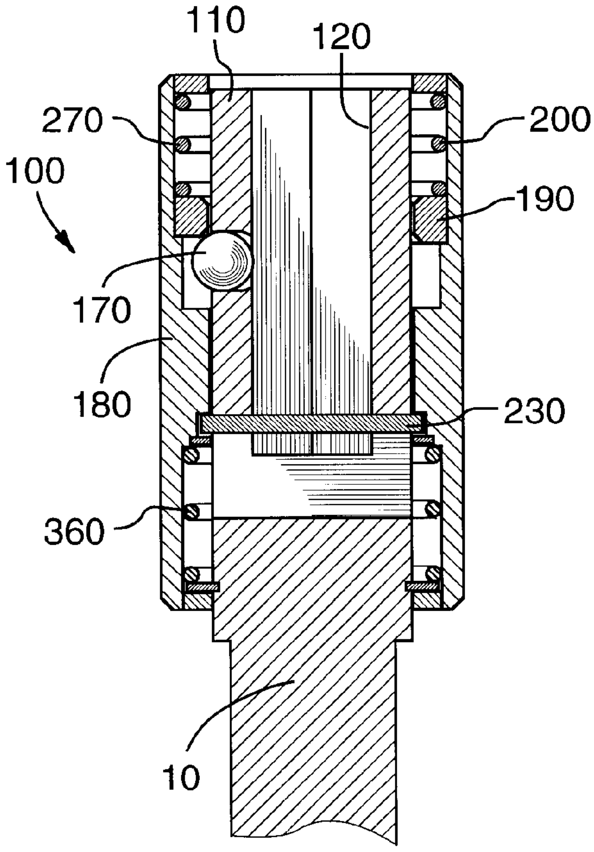
FIG. 3 is a sectional side view of the device of FIG. 1, showing the device in a position without an inserted tool bit.

FIG. 3 shows a device according to the invention, without an inserted tool bit. The outer sleeve 180 is pressed to its position furthest away from the tool mount 10 by the sleeve biasing means 360. In this position, there is enough space inside the stepped recess 270, between the locking ball and the locking ball depressor 190, to allow the locking ball 170 to freely move inside the first radial hole 130. Thus, a tool bit (not shown) may be inserted into the longitudinal hole 120 of the connector means 110 without encountering resistance from the locking ball. When the tool bit is inserted, the mounting portion 310 of the tool bit hits the guiding bar 230, thus pressing the outer sleeve 180, against the biasing force of the sleeve biasing means 360, towards the tool mount 10. As the outer sleeve is pressed towards the hand tool, the locking ball depressor 190 will also be pressed towards the hand tool by the depressor biasing means 200. The locking ball depressor will thus slide over the locking ball and block the ball in its movement in the first radial hole 130, effectively locking the tool bit in the longitudinal hole 120.

Figure 4:
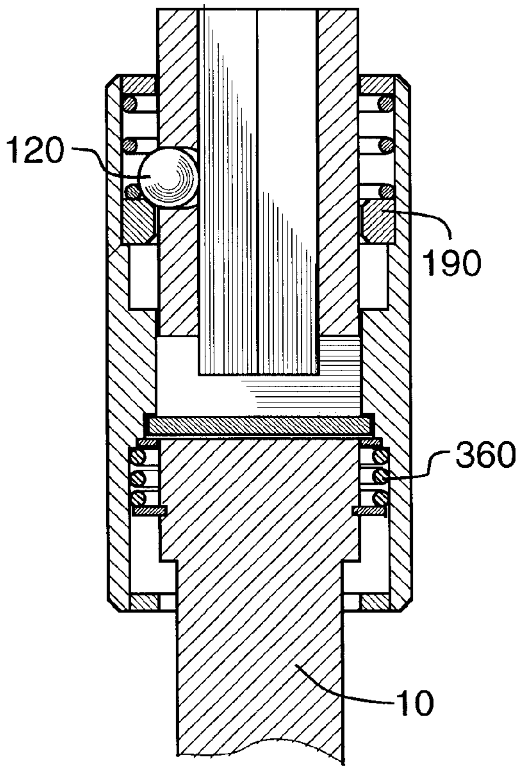
FIG. 4 is a sectional side view of the device of FIG. 1, showing the device in a position where the outer sleeve is pulled back to release an inserted tool bit from the holder.

To release the tool bit 300 from the longitudinal hole 120, the outer sleeve 180 will have to be fully pressed towards the tool mount 10 against the biasing force of the sleeve biasing means 360, as shown in FIG. 4. The locking ball depressor 190 is then forced by the depressor biasing means to slide over the locking ball 170, thus releasing the locking ball. The tool bit may thus be removed without excessive force.

Figure 5:
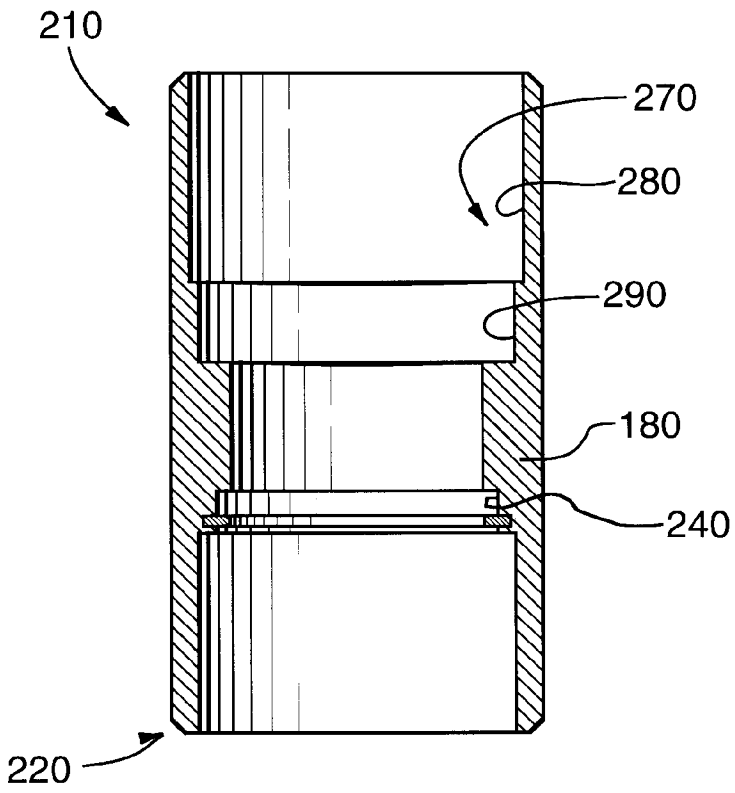
FIG. 5 is a sectional side view of an outer sleeve according to the invention.

In FIG. 5, the outer sleeve 180 is shown alone. The first end 210 facing the tool bit 300, the second end 220 facing the tool mount (not shown), the guiding bar groove 240 and the stepped recess 270, arranged on the inside of the first end of the outer sleeve, with its first large diameter part 280 and second smaller diameter part 290, are shown as previously described.

Figure 6:
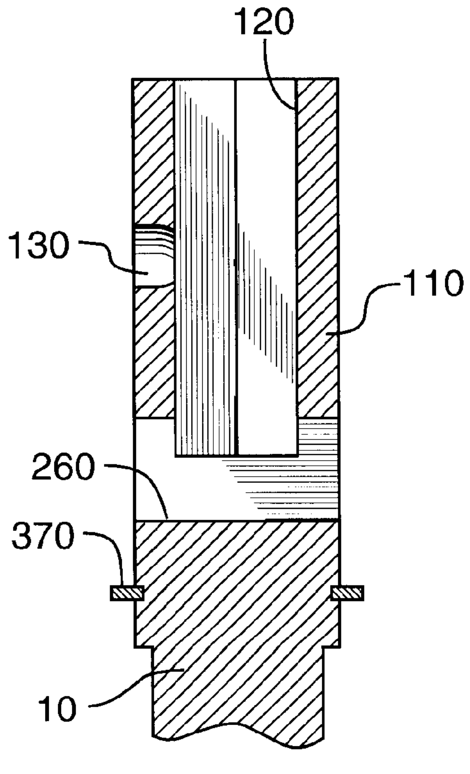
FIG. 6 is a sectional side view of a first connector according to the invention.
Figure 7:
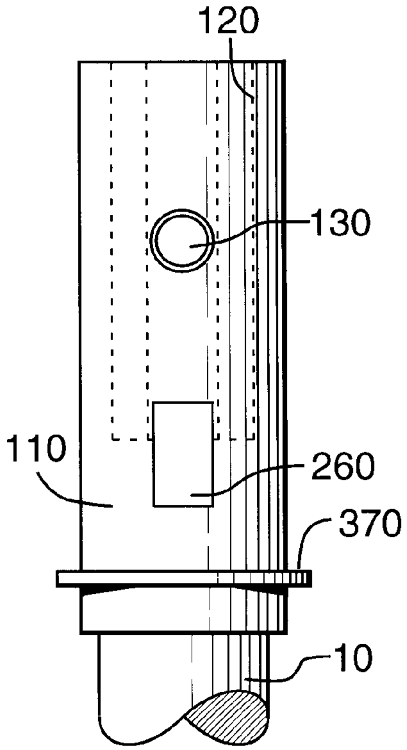
FIG. 7 is a side view of a first connector according to the invention, seen from the side having the second radial hole.

In FIGS. 6 and 7, the connector means 110 is shown. The longitudinal hole 120, the transverse slot 260 and the first radial hole 130, with its large diameter bore portion 150 at the outside surface of the connector means and the small diameter bore portion 160 at the longitudinal hole, are shown as previously described. Also the sleeve retainer means 370 is shown, although this is preferably not manufactured as an integral part of the connector means 110.

Figure 8:
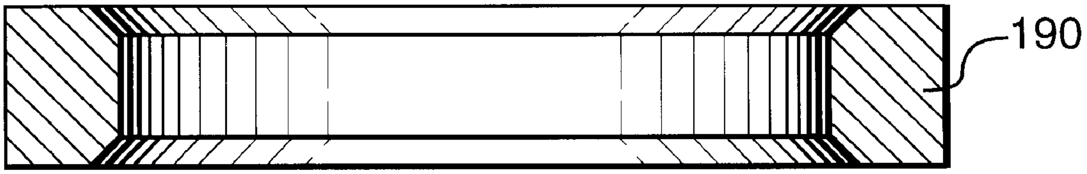
FIG. 8 is a sectional view of a locking ball depressor according to the invention.

In FIG. 8, the locking ball depressor 190 is shown. The depressor is advantageously shaped as a ring having bevelled inner edges to facilitate the depressor sliding over the locking ball (not shown).

Figure 9A:
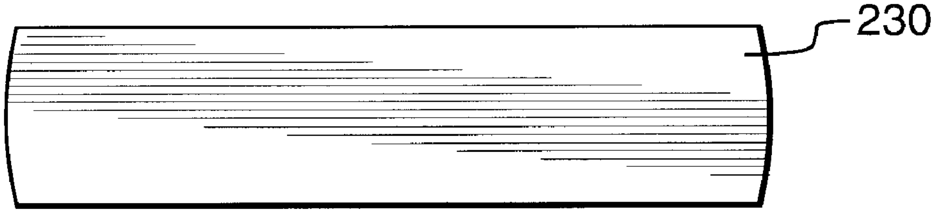
FIG. 9A is a top view of a guiding bar according to the invention.
Figure 9B:
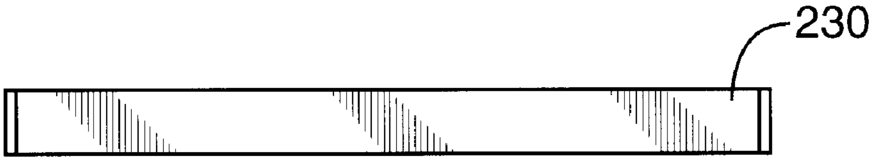
FIG. 9B is a side view of a guiding bar according to FIG. 9A.
Figure 10:
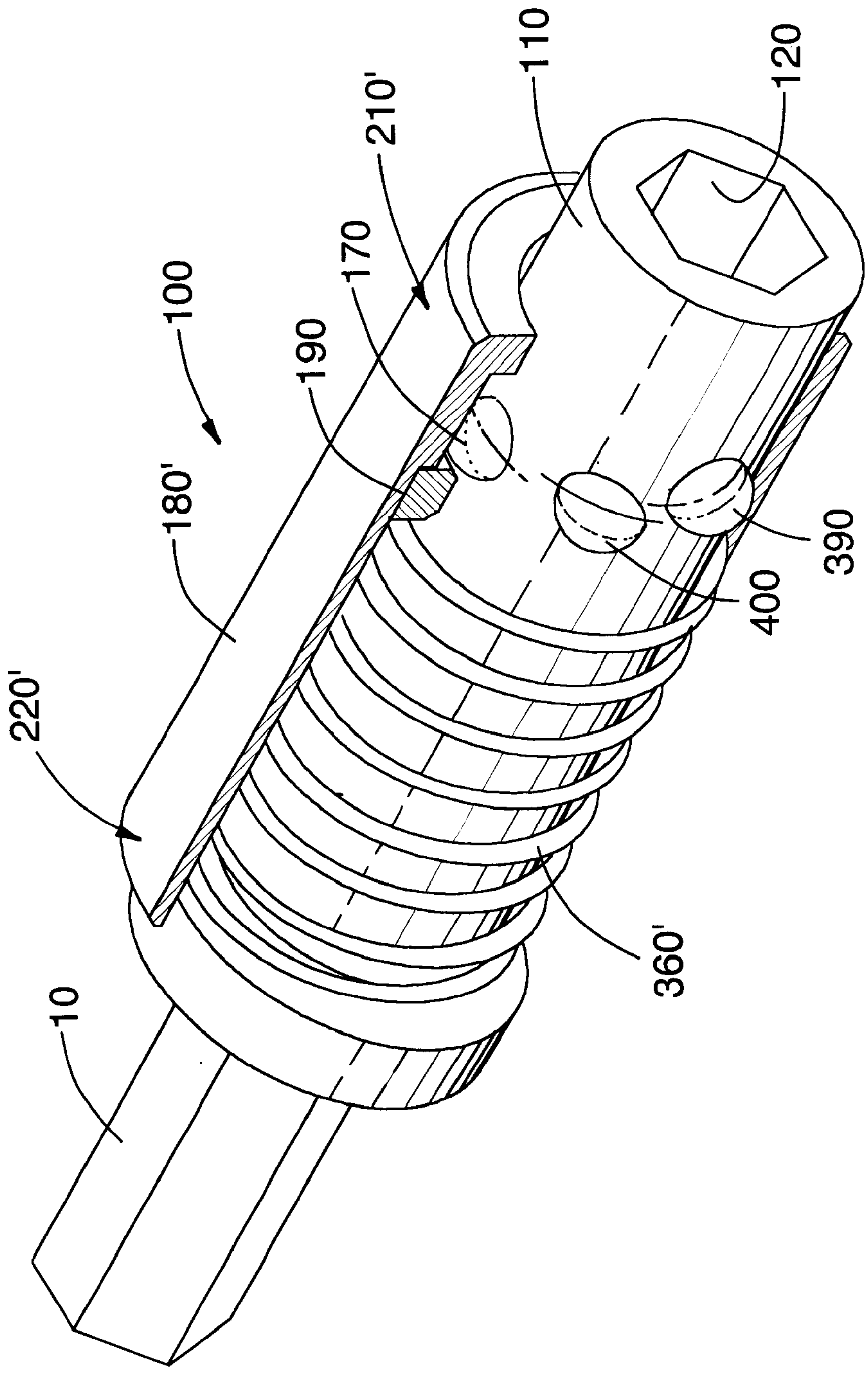
FIG. 10 is an elevational perspective view of a device according to a second embodiment of the invention, showing the device in a position without an inserted tool bit.

In FIGS. 9A and 9B, the guiding bar 230 is shown. The guiding bar is advantageously substantially rectangular with rounded short edges. The thickness of the guiding bar corresponds to the width of the guiding bar groove of the outer sleeve (not shown).

A second embodiment of the invention is shown in FIGS. 10 to 17B. In this case, the holder 100 comprises an elongate connector means 110' and an outer sleeve 180'. The connector means is attachable to the handle (not shown) of a power tool or a hand tool via a tool mount 10. The connector means 110' has a longitudinal hole 120, which has a cross-section corresponding to the cross-section of the mounting portion of the tool bit. The mounting portion of the tool bit may thus be inserted into the longitudinal hole of the connector means. The connector means includes a first radial hole 130, which cooperates with a substantially spherical locking ball 170 movably arranged in the radial hole, as has been described in connection with the first embodiment of the invention. The locking ball 170 cooperates with a circumferential groove in the tool bit to lock the tool bit in place when the tool bit is fully inserted into the holder 100. The outer sleeve 180' is arranged to reciprocally slide over the connector means 110' between two end positions. The outer sleeve has a first end 210' facing the tool bit and a second end 220' facing the hand tool 10.

The sleeve 180' has three inside portions of different diameters, ranging from a large diameter portion 410 at the second end 210' of the sleeve, a small diameter portion 430 at the first end 210' of the sleeve and a medium diameter portion 420 arranged between the large diameter portion and the small diameter portion of the sleeve. A locking ball depressor 190 is arranged to reciprocally slide inside the large diameter portion of the sleeve. The depressor preferably is formed as a ring having an inner diameter which is slightly larger than the outer diameter of the connector means 110' and an outer diameter which is slightly smaller than the diameter of the large diameter portion 410 of the sleeve 180'. A depressor biasing means 360', for example a coil spring, is arranged to bias the depressor against the step between the large diameter portion and the medium diameter portion of the sleeve.

A first depressor displacement ball 390 is arranged in a second radial hole 395. The second radial hole has a geometry corresponding to the first radial hole 130, restricting the movement of the first depressor displacement ball to a movement corresponding to that of the locking ball 170. A second depressor displacement ball 400 is arranged in a third radial hole 405. The third radial hole has a geometry corresponding to the first radial hole 130, restricting the movement of the second depressor displacement ball to a movement corresponding to that of the locking ball 170. The respective radii of the first, second and third radial holes are substantially the same. The second radial hole 395 is arranged at a distance, in the longitudinal direction of the elongate connector means 110', from the first radial hole 130 corresponding to approximately half the radius of the radial holes and the third radial hole 405 is arranged at a distance, in the longitudinal direction of the elongate connector means 110', from the second radial hole 395 corresponding to approximately half the radius of the radial holes. The radial holes are thus circumferentially disposed along the outside of the elongate connector means 110' with a certain staggering corresponding to half the radius of the radial holes. Advantageously, the first and second depressor displacement balls, 390 and 400, respectively, are arranged in diametrically opposed pairs, so that two first depressor displacement balls are used and two second depressor displacement balls are used. In this way, a smoother and more reliable movement of the depressor 190 is achieved.

Figure 11A:
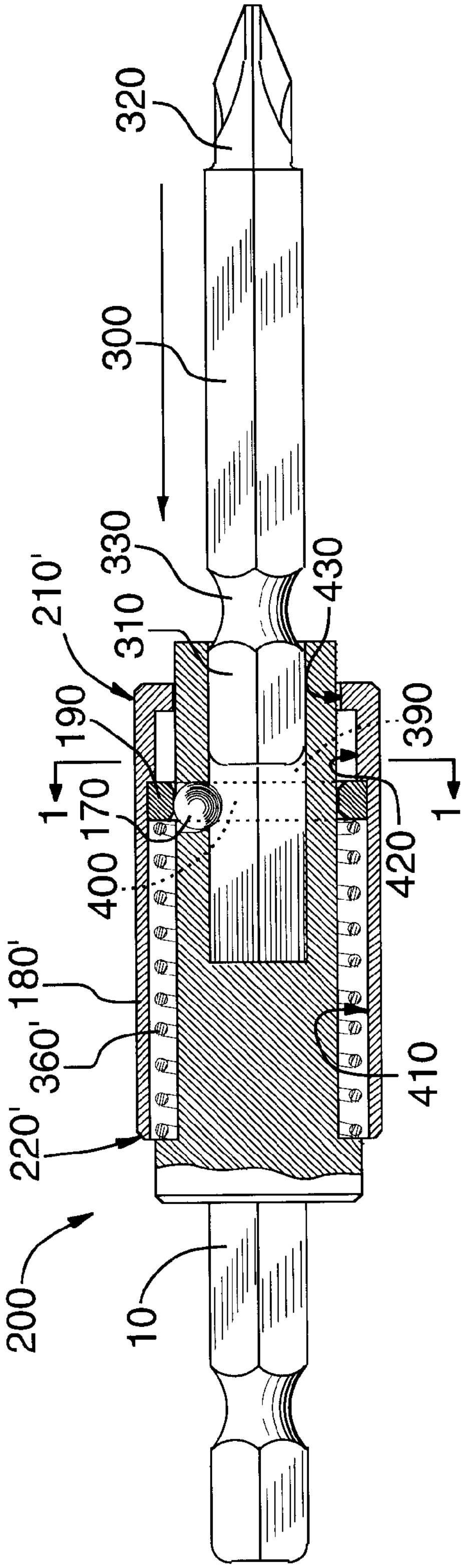
FIG. 11A is a sectional side view of the device according to FIG. 10, showing the device in a position where a tool bit has been inserted to the first collar displacement ball.
Figure 11B:
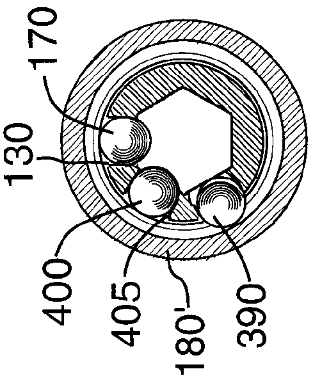
FIG. 11B is a section along line 1—1 of FIG. 11A.

Referring to FIGS. 11A and 11B, when the tool bit 300 is inserted into the elongate connector means 110', the mounting portion 310 of the tool bit hits the first depressor displacement ball 390, which is pressed out of the second radial hole 395. The first depressor displacement ball thus presses against the locking ball depressor 190, forcing the locking ball depressor towards the tool mount 10.

Figure 12A:
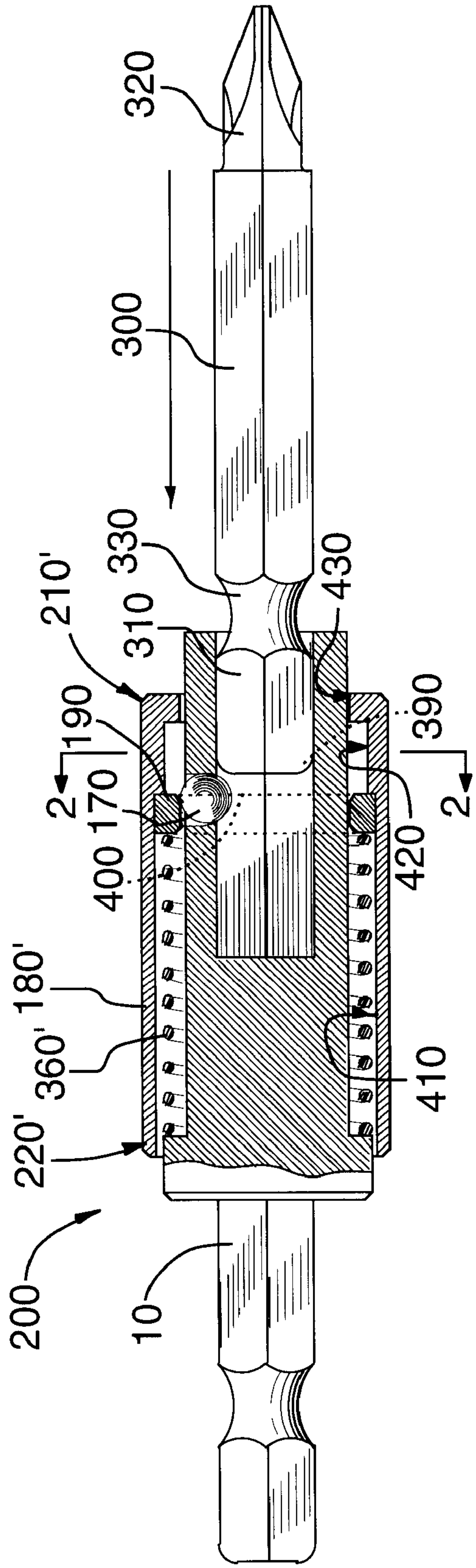
FIG. 12A is a sectional side view of the device according to FIG. 10, showing the device in a position where a tool bit has been inserted to the second collar displacement ball.
Figure 12B:
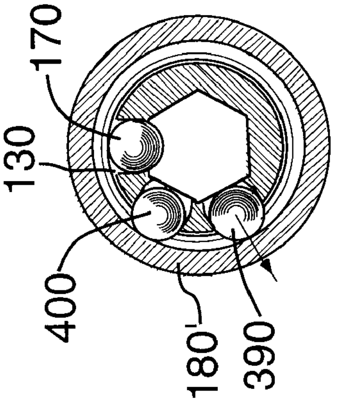
FIG. 12B is a section along line 2—2 of FIG. 12B.
Figure 13A:
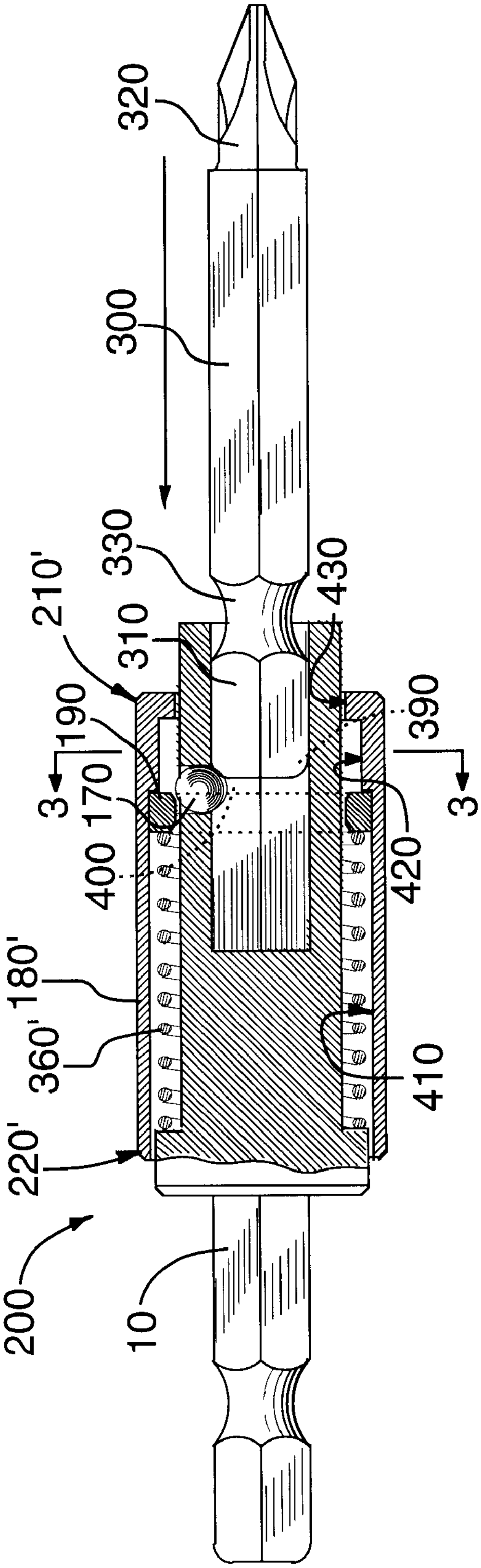
FIG. 13A is a sectional side view of the device according to FIG. 10, showing the device in a position where a tool bit has been inserted to the locking ball.
Figure 13B:
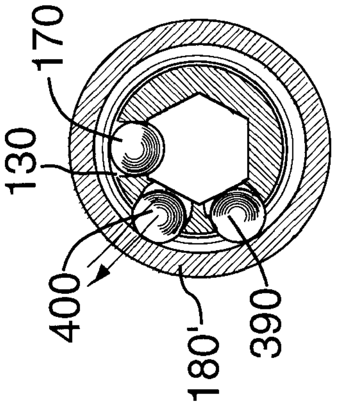
FIG. 13B is a section along line 3—3 of FIG. 13A.

When the tool bit 300 is pressed down further, as shown in FIGS. 12A and 12B, the mounting portion 310 of the tool bit hits the second depressor displacement ball 400, which is pressed out of the third radial hole 405. The second depressor displacement ball thus presses against the locking ball depressor 190, forcing the locking ball depressor further towards the tool mount 10.

Figure 14A:
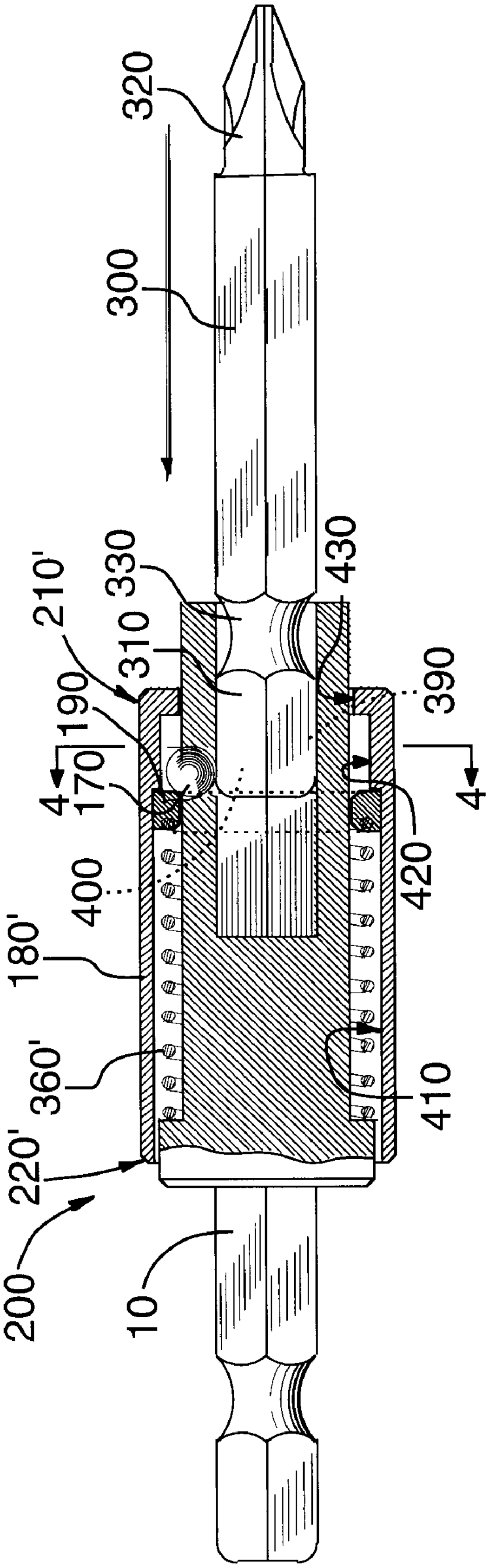
FIG. 14A is a sectional side view of the device according to FIG. 10, showing the device in a position where a tool bit has been inserted past the locking ball.
Figure 14B:
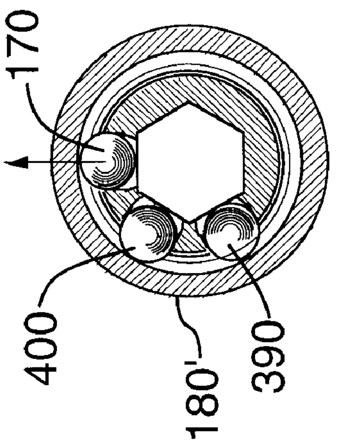
FIG. 14B is a section along line 4—4 of FIG. 14A.

The locking ball depressor 190 is now in a position over the locking ball 170. Further movement downwards of the tool bit 300 will cause the mounting portion 310 of the tool bit to hit the locking ball, which will be pressed out of the first radial hole 130, as shown FIGS. 13A and 13B. The locking ball 170 will thus press against the locking ball depressor 190, forcing the locking ball depressor still further towards the tool mount 10, to a position of the locking ball depressor which allows the locking ball to completely exit the longitudinal hole 120 as the tool bit 300 is pressed further down, as shown in FIGS. 14A and 14B.

Figure 15A:
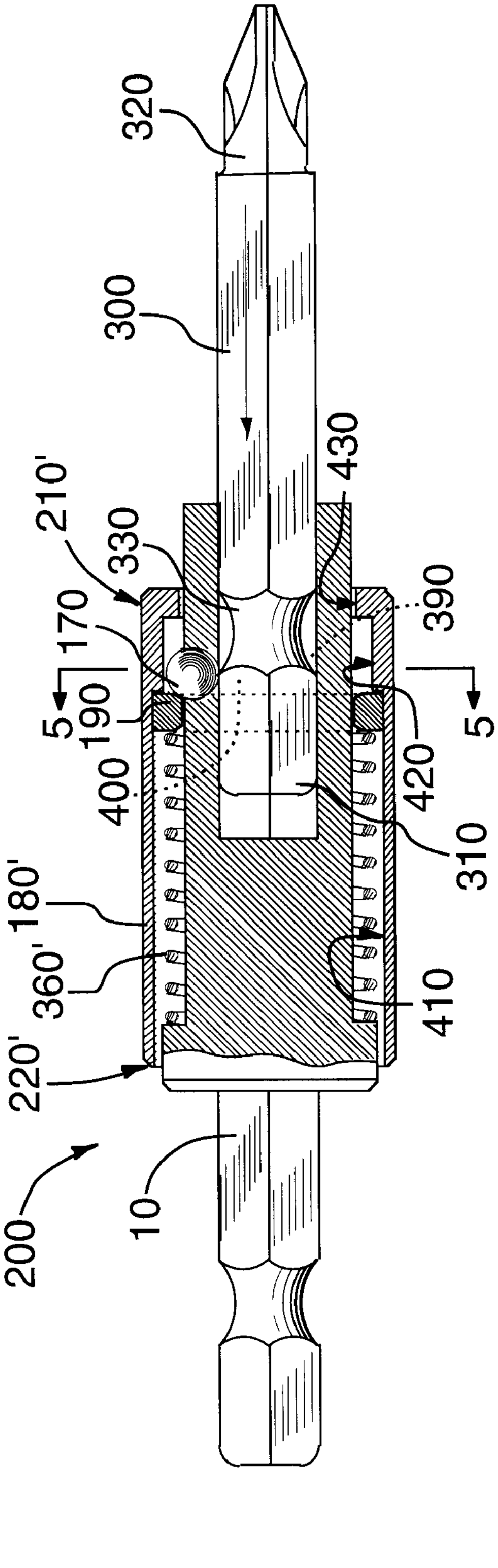
FIG. 15A is a sectional side view of the device according to FIG. 10, showing the device in a position where a tool bit has been inserted further past the locking ball compared to FIG. 14A.
Figure 15B:
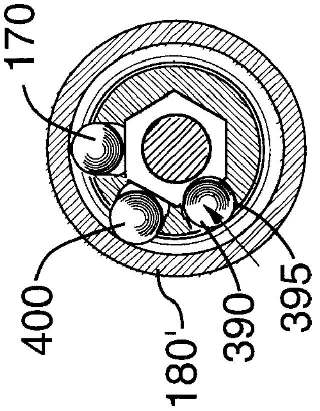
FIG. 15B is a section along line 5—5 of FIG. 15A.

In FIGS. 15A and 15B, the position of the device just before the locking ball 170 enters the circumferential groove 330 in the tool bit 300 is shown.

Figure 16A:
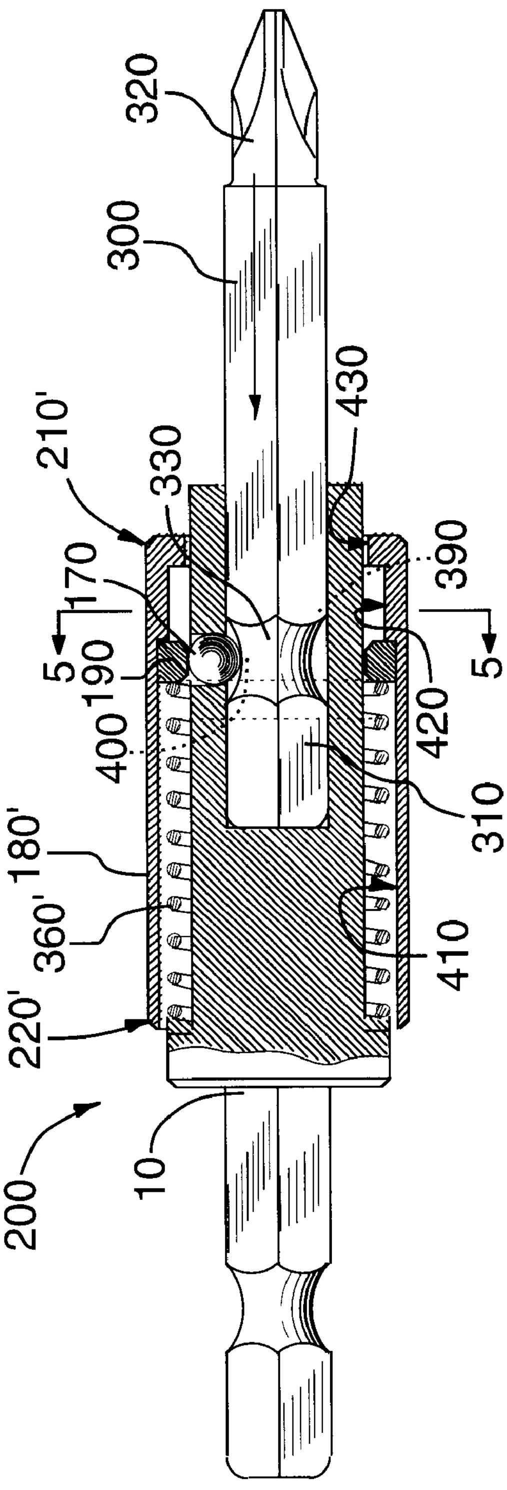
FIG. 16A is a sectional side view of the device according to FIG. 10, showing the device in a position where a tool bit has been inserted so the locking ball engages the groove in the tool bit.
Figure 16B:
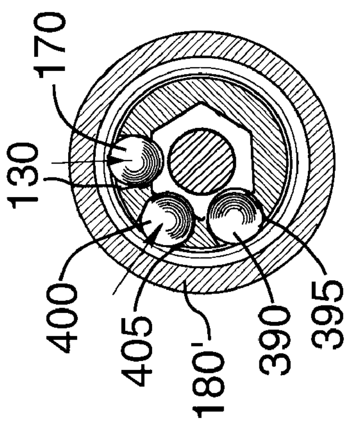
FIG. 16B is a section along line 6—6 of FIG. 16A.

In FIGS. 16A and 16B, the tool bit 300 is fully inserted and the locking ball 170 is fully seated into the circumferential groove 330 in the tool bit 300. The locking ball depressor 190 is now in a position over the locking ball 170, which effectively locks the locking ball in place. The tool bit is thus held in the holder.

Figure 17A:
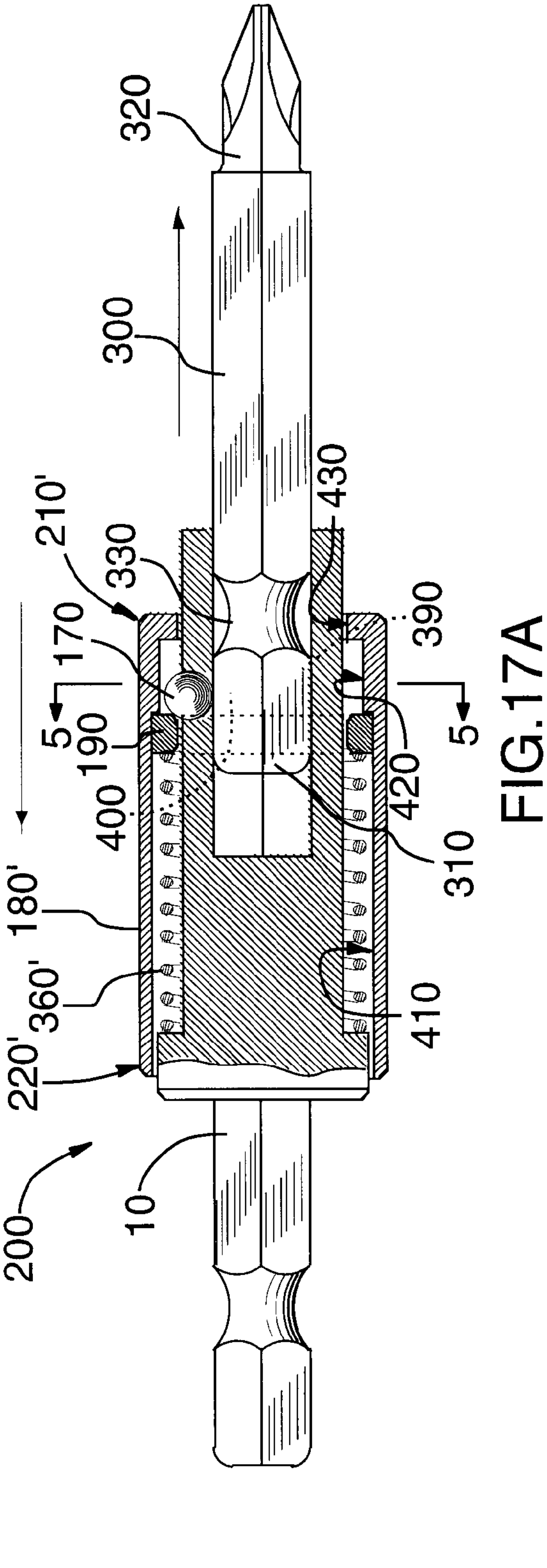
FIG. 17A is a sectional side view of the device according to FIG. 10, showing the device in a position where the sleeve is pushed back to allow the removal of the tool bit.
Figure 17C:
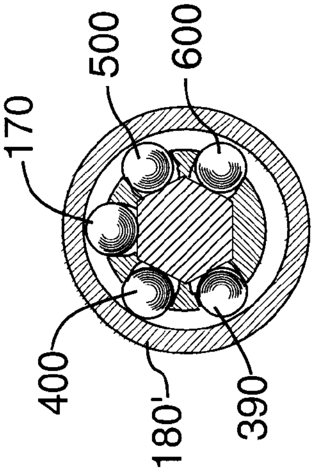
FIG. 17C is a section along line 7—7 of FIG. 17A, showing pairs of depressor displacement balls used in a preferred embodiment of the embodiment shown in FIG. 10.
Figure 17B:
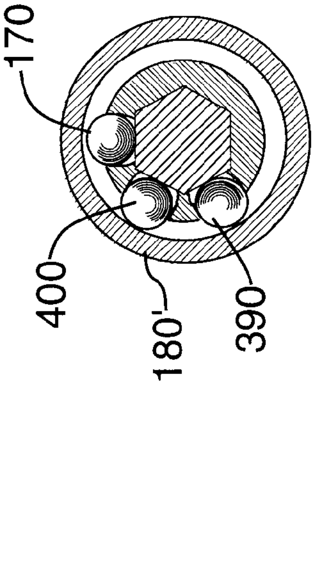
FIG. 17B is a section along line 7—7 of FIG. 17A.

To release the tool bit 300 from the holder 100, the sleeve 180' is pulled back towards the tool mount 10 to move the locking ball depressor 190 from the position over the locking ball 170, as is shown in FIGS. 17A and 17B. The locking ball is thus free to move outwards in the first radial hole 130, and is not blocking the removal of the tool bit. The tool bit may thus be removed from the holder.

The first depressor displacement ball 390 preferably is arranged opposite a third depressor displacement ball 500 and the second depressor displacement ball 400 preferably is arranged opposite a fourth depressor displacement ball 600, as shown in FIG. 17C. The third depressor displacement ball is arranged in a fourth radial hole (not shown). The fourth radial hole has a geometry corresponding to the first radial hole 130, restricting the movement of the third depressor displacement ball 500 to a movement corresponding to that of the locking ball 170. The fourth radial hole is located 180 degrees opposite the first radial hole 395 in the connecting means 110. The fourth depressor displacement ball 600 is arranged in a fifth radial hole (not shown). The fifth radial hole has a geometry corresponding to the first radial hole 130, restricting the movement of the fourth depressor displacement ball to a movement corresponding to that of the locking ball 170. The fifth radial hole is located 180 degrees opposite the second radial hole 405 in the connecting means 110. By using two opposed pairs of depressor displacement balls, a smoother movement of the depressor 190 is provided and the risk of the depressor tilting inside the sleeve 180', when the depressor displacement balls press the depressor towards the tool mount 10, is minimized.

Figure 18:
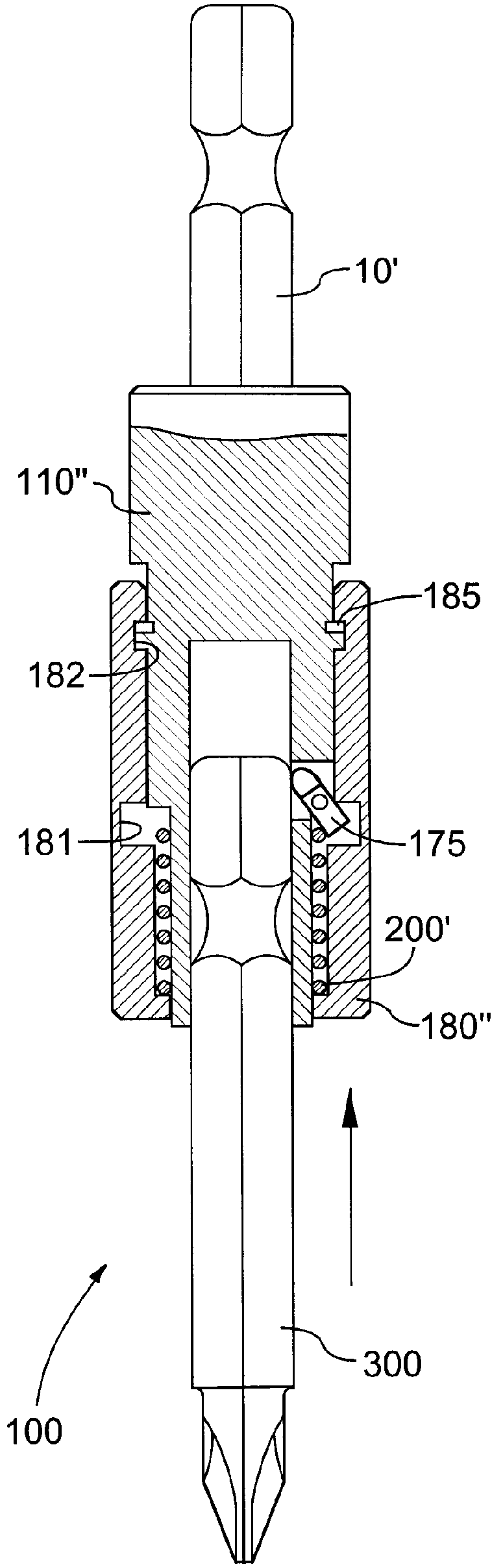
FIG. 18 is a sectional side view of a device according to a third embodiment of the invention, showing the device in a position where a tool bit is being inserted.
Figure 19:
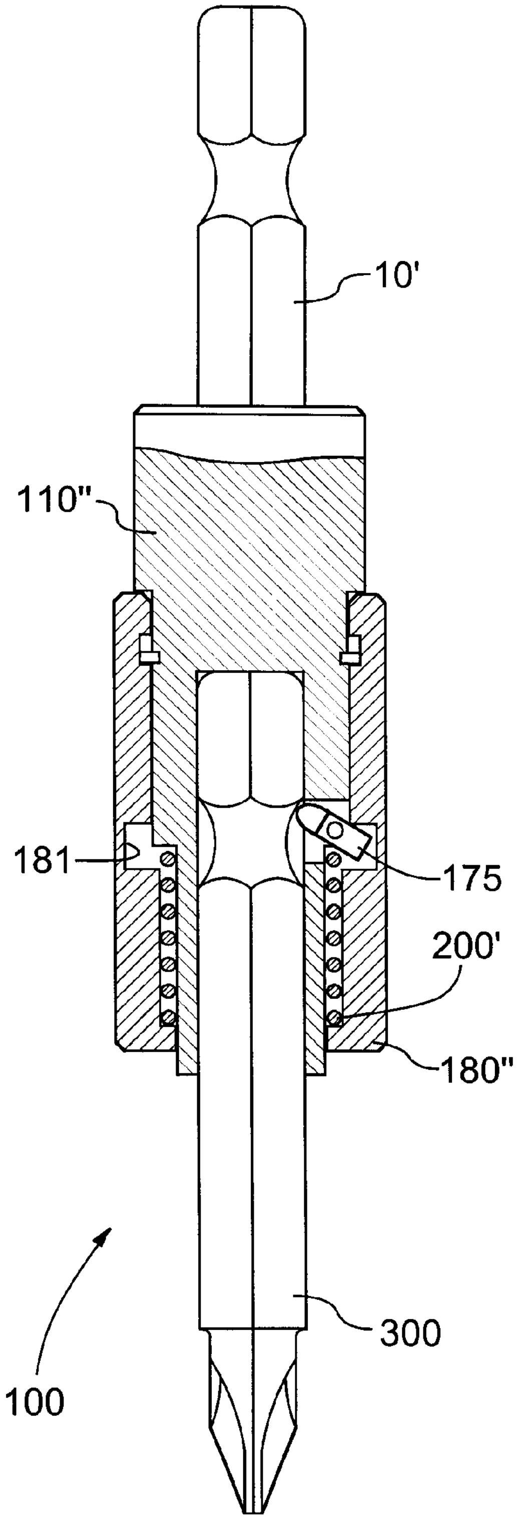
FIG. 19 is a sectional side view of the device according to FIG. 18, showing the device in a position where a tool bit is fully inserted.
Figure 20:
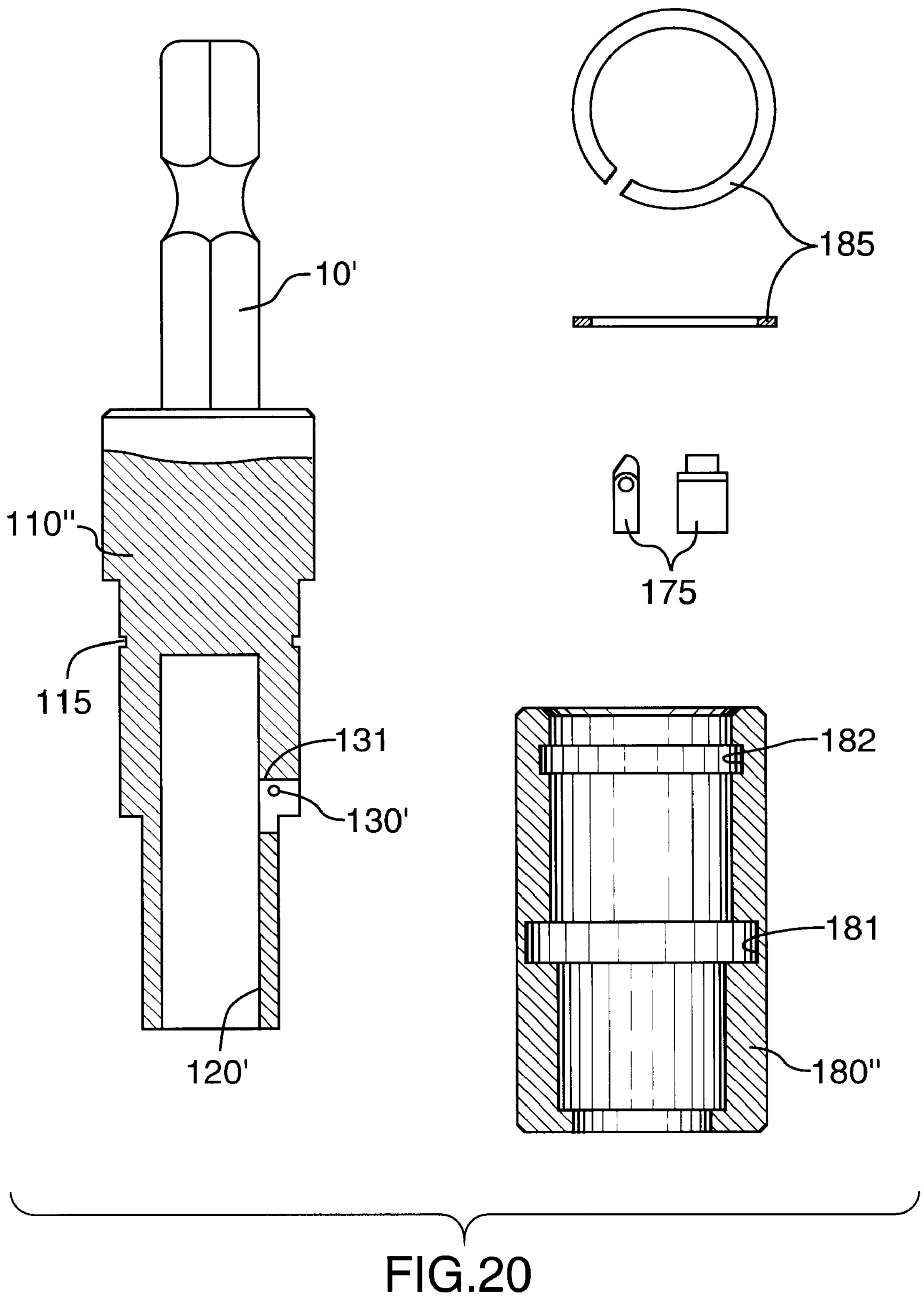
FIG. 20 is an exploded partially sectioned view of the device according to FIG. 18, showing the device in a position where a tool bit is being inserted.

A third embodiment of the invention is shown in FIGS. 18 to 20. In this case, the holder 100 comprises an elongate connector means 110" and an outer sleeve 180". The connector means is attachable to a power tool or hand tool via a tool mount 10'. The connector means 110" has a longitudinal hole 120', which has a cross-section corresponding to the cross-section of the mounting portion of the tool bit. The mounting portion of the tool bit may thus be inserted into the longitudinal hole of the connector means. The connector means includes a fourth radial hole 131, which cooperates with a locking lever 175 arranged to pivot back and forth inside the fourth radial hole. The locking lever pivots around a pivot pin (not shown), which is arranged in pivot holes 130' in the connecting means 110". The locking lever 175 cooperates with the circumferential groove in the tool bit to lock the tool bit in place when the tool bit is fully inserted into the holder 100. The outer sleeve 180" is arranged to reciprocally slide over the connector means 110" between two end positions.

The sleeve 180" has a first inner circumferential recess 181 and a second inner circumferential recess 182. The first circumferential recess cooperates with and manoeuvres the locking lever between two end positions inside the fourth radial hole 131, when the sleeve slides between its two end positions. The second circumferential recess 182 cooperates with a sleeve stop 185 in a way which will be described later. A sleeve biasing means 200', for example a coil spring, is arranged to bias the sleeve 180" away from the tool mount 10'.

The connector means 110" further has a circumferential slit 115 for holding the sleeve stop 185 in position. The sleeve stop is preferably a washer-shaped disc with a slit to allow it to be compressed for mounting in the second inner circumferential recess 182. The second inner circumferential recess has a length in the longitudinal direction of the sleeve 180", which defines the throw of the sliding motion of the sleeve relative the connector means. In each end position of the throw, the sleeve stop will contact the respective side surface of the second inner circumferential recess to thereby prevent further movement of the sleeve. When a tool bit 300 is inserted into the longitudinal hole 120', the locking lever 175 end which contacts the tool bit is pushed towards the sleeve 180". After the tool bit is fully seated into the longitudinal hole, the locking lever 175 end which contacts the tool bit is free to pivot into the circumferential groove 330 in the tool bit. The sleeve biasing means 200' is arranged to transmit its spring force to the sleeve via the end of the locking lever 175 which contacts the first inner circumferential recess 181, thereby further facilitating the pivoting of the lever into the circumferential groove.

To release the tool bit 300, the sleeve 180" is manually slid away from the tool mount, whereby the locking lever 175 is forced to pivot out of the circumferential groove 330. The tool bit is now free to be removed from the longitudinal hole 120'.

Figure 21:
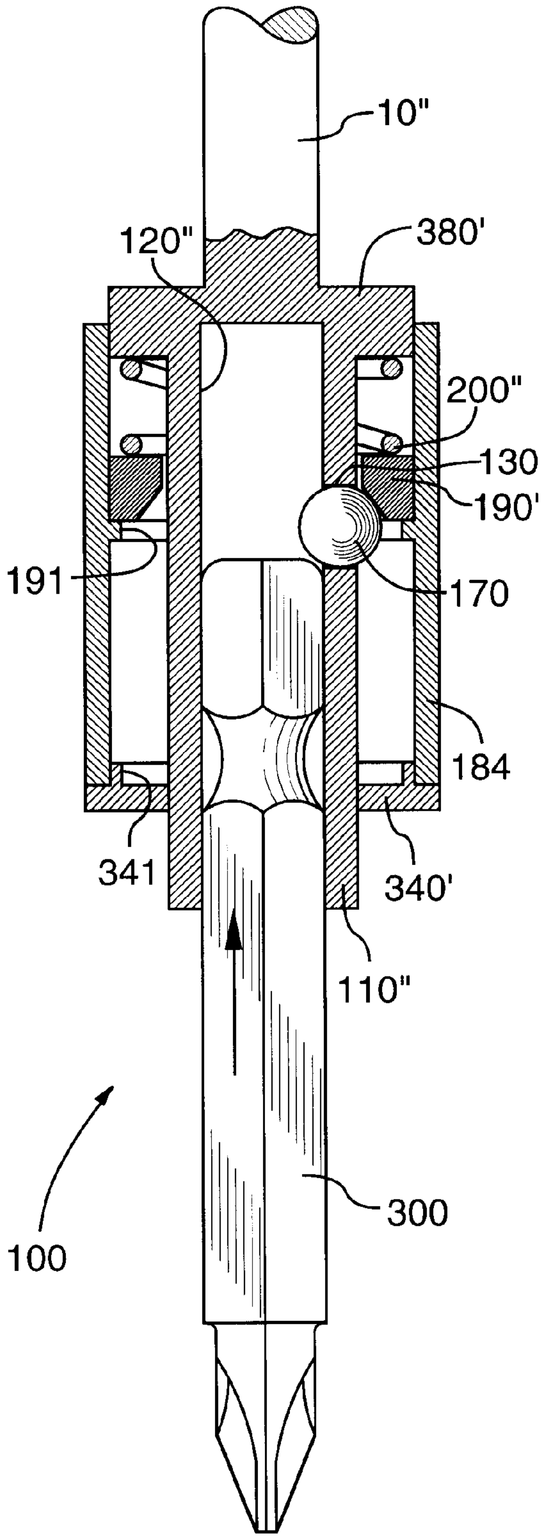
FIG. 21 is a sectional side view of a device according to a fourth embodiment of the invention, showing the device in a position where a tool bit is being inserted.
Figure 22:
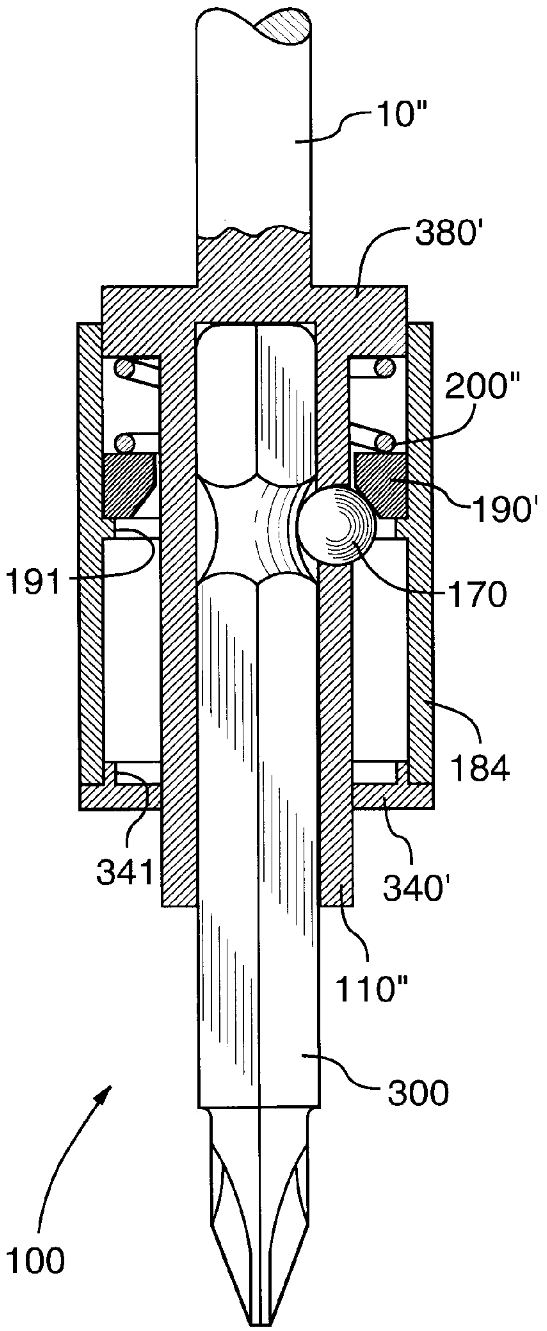
FIG. 22 is a sectional side view of the device according to FIG. 21, showing the device in a position where a tool bit is fully inserted.
Figure 23:
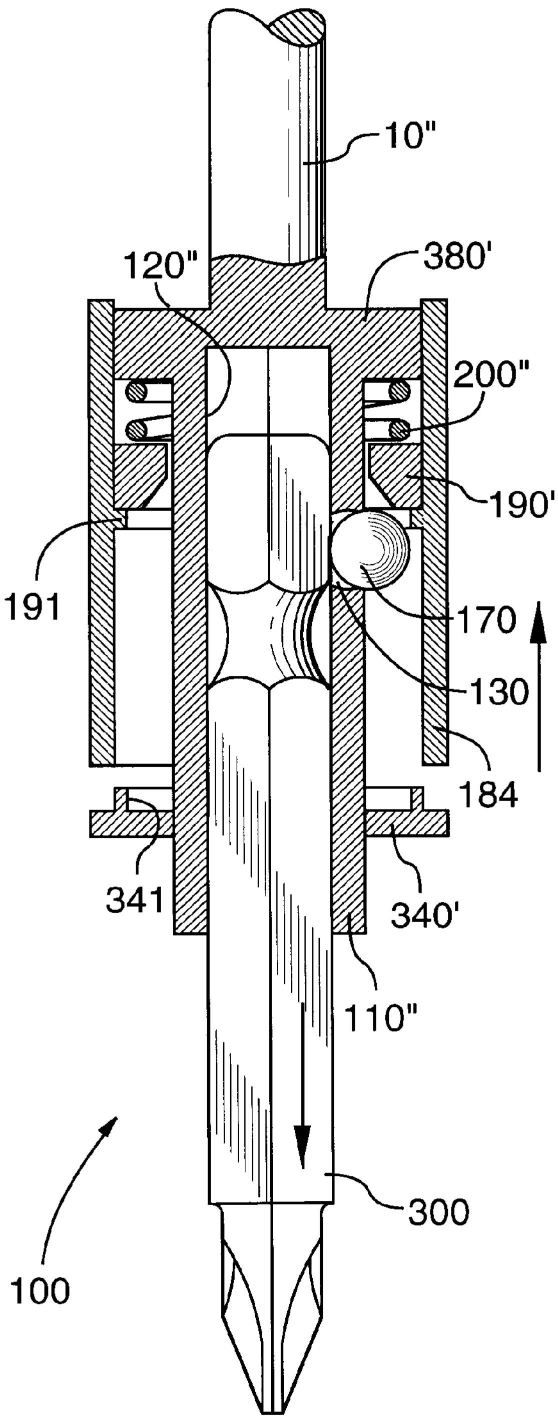
FIG. 23 is a sectional side view of the device according to FIG. 21, showing the device in a position where a tool bit is being removed.

A fourth embodiment of the invention is shown in FIGS. 21 to 23. In this case, the holder 100 comprises an elongate connector means 110''' and an outer sleeve 184. The connector means is attachable to a power tool or hand tool via a tool mount 10''. The connector means 110''' has a longitudinal hole 120'', which has a cross-section corresponding to the cross-section of the mounting portion of the tool bit. The connector means includes a first radial hole 130, which cooperates with a substantially spherical locking ball 170 movably arranged in the radial hole, as has been described in connection with the first embodiment of the invention. The locking ball 170 cooperates with the circumferential groove in the tool bit to lock the tool bit in place when the tool bit is fully inserted into the holder 100. The outer sleeve 184 is arranged to reciprocally slide over the connector means 110''' between two end positions, and has a uniform inner diameter, except for a depressor stop 191 arranged on the inside of the sleeve and protruding from the sleeve. A locking ball depressor 190' is arranged to reciprocally slide inside the sleeve. The depressor preferably is formed as a ring having an inner diameter which is slightly larger than the outer diameter of the connector means 110''' and an outer diameter which is slightly smaller than the inner diameter of the sleeve. A depressor biasing means 200'', for example a coil spring, is arranged to bias the depressor away from the handle. A third end cap 340' is arranged at the end of the outer sleeve 184 which faces the tool bit 300, to seal the inside of the sleeve during normal use. The third end cap is preferably ring formed, having an outer diameter which is substantially the same as the outer diameter of the sleeve, and an inside diameter which is slightly larger than the outer diameter of the connector means 110'', thus enabling the connector means to protrude through the first end cap. The third end cap further has an annular protrusion 341, arranged on the side of the third end cap which faces the sleeve. The annular protrusion is arranged to fit inside the sleeve 184, when the sleeve is pressed against the third end cap. The depressor 190' is pressed against the locking ball depressor stop 191 by the depressor biasing means 200''.

In FIG. 21, a tool bit 300 is being inserted into the longitudinal hole 120''. The inserted end of the tool bit will push the locking ball 170 radially outwards from the longitudinal hole in its radial hole (as has been described in connection with FIGS. 1 and 6). The locking ball will then push the depressor 190' towards the handle, because of the bevelled edge of the depressor facing the locking ball. This allows the locking ball 170 to protrude sufficiently out of the radial hole so that the tool bit 300 may be fully inserted into the longitudinal hole 120''. As the tool bit is fully inserted, the locking ball is free to be seated in the circumferential groove of the tool bit by the depressor 190' and the sleeve 184 being biased away from the handle by the sleeve biasing means 200''. Thus, the tool bit will be securely locked in position, as shown in FIG. 22.

To release the tool bit 300, the sleeve 184 is slid towards the tool mount (not shown), whereby the depressor 190' is made to slide in the same direction by the locking ball depressor stop 191. The locking ball 170 is thus free to move in the radial hole, thus freeing the tool bit which may be removed from the longitudinal hole 120'', as shown in FIG. 23.

Figure 24:
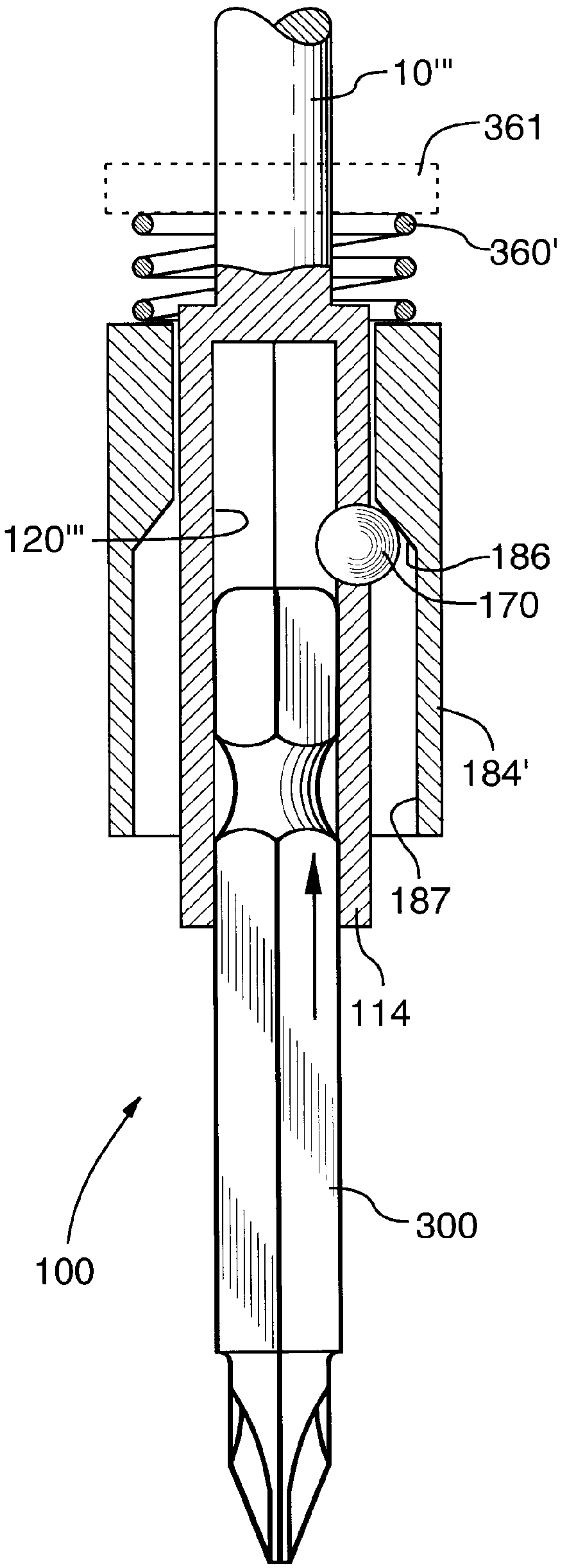
FIG. 24 is a sectional side view of a device according to a fifth embodiment of the invention, showing the device in a position where a tool bit is being inserted.
Figure 25:
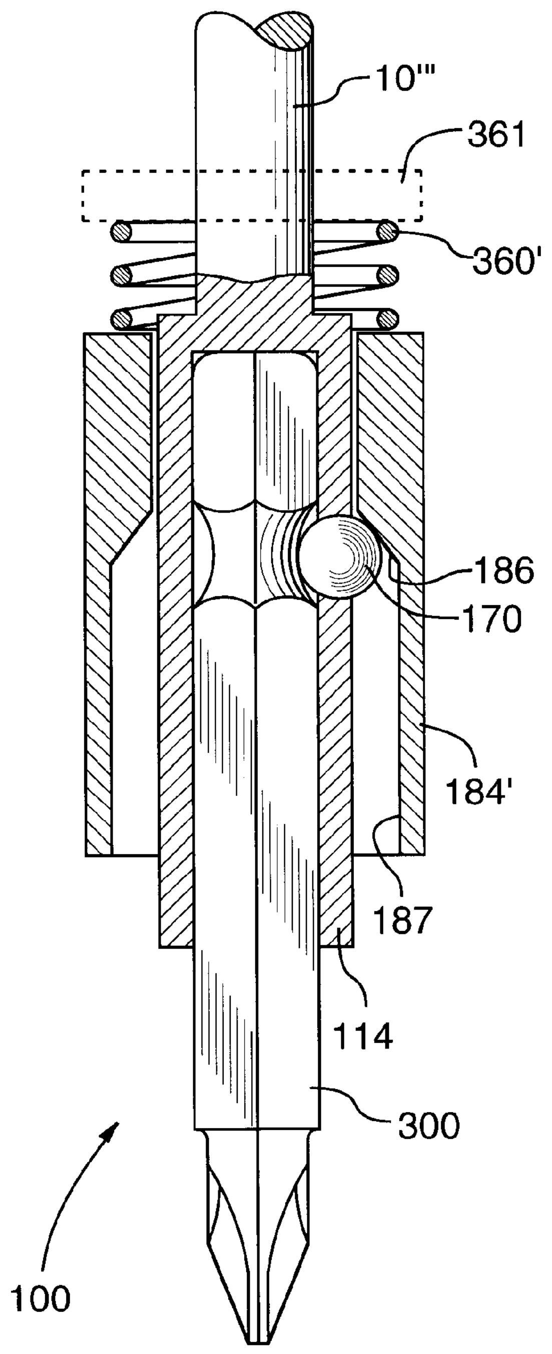
FIG. 25 is a sectional side view of the device according to FIG. 24, showing the device in a position where a tool bit is fully inserted.
Figure 26:
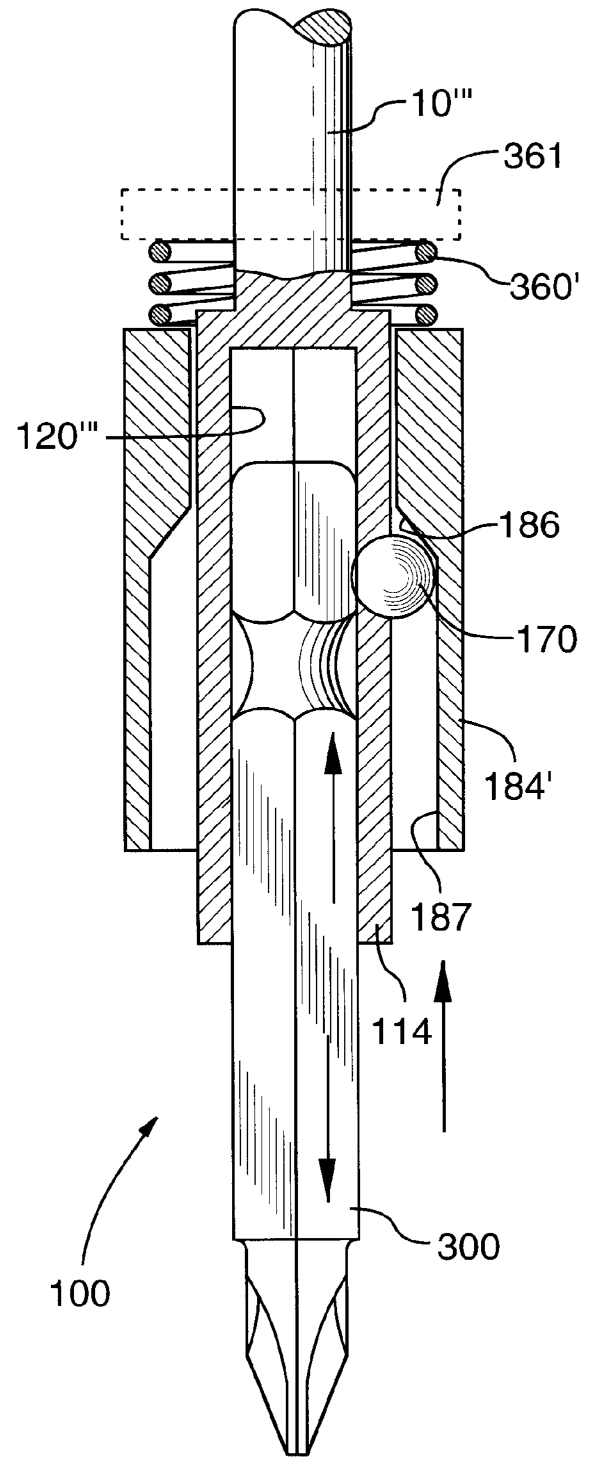
FIG. 26 is a sectional side view of the device according to FIG. 24, showing the device in a position where a tool bit is being removed.

A fifth embodiment of the invention is shown in FIGS. 24 to 26. In this case, the holder 100 comprises an elongate connector means 114 and an outer sleeve 184'. The connector means is attachable to a power tool or hand tool (not shown) via a tool mount 10'''. The connector means 114 has a longitudinal hole 120''', which has a cross-section corresponding to the cross-section of the mounting portion of the tool bit. The connector means includes a first radial hole 130, which cooperates with a substantially spherical locking ball 170 movably arranged in the radial hole, as has been described in connection with the first embodiment of the invention. The locking ball 170 cooperates with the circumferential groove in the tool bit to lock the tool bit in place when the tool bit is fully inserted into the holder 100. The outer sleeve 184' is arranged to reciprocally slide over the connector means 114 between two end positions, and has a stepped inside diameter, having a smaller diameter part facing the tool mount and a larger diameter part facing the tool bit. A bevelled transition 186 is arranged between the two diameter parts. The bevelled transition functions similarly to the depressor described for earlier embodiments. A sleeve biasing means 360', for example a coil spring, is arranged to bias the sleeve 184' away from the tool mount. The bevelled transition 186 is pressed against the locking ball 170 by the sleeve biasing means 360'. The sleeve biasing means is held in place by a biasing means stop 361 fastened on the tool mount 10'''.

In FIG. 24, a tool bit 300 is being inserted into the longitudinal hole 120'''. The inserted end of the tool bit will push the locking ball 170 radially outwards from the longitudinal hole in its radial hole (as has been described in connection with FIGS. 1 and 6). The locking ball will then push the bevelled transition 186 towards the tool mount, and thus the whole sleeve 184'. This allows the locking ball 170 to protrude sufficiently out of the radial hole so that the tool bit 300 may be fully inserted into the longitudinal hole 120'''. As the tool bit is fully inserted, the locking ball is free to be seated in the circumferential groove of the tool bit by the sleeve 184' being biased away from the handle by the sleeve biasing means 360'. Thus, the tool bit will be securely locked in position, as shown in FIG. 25.

To release the tool bit 300, the sleeve 184' is slid towards the tool mount (not shown), whereby the bevelled transition 186 no longer blocks the locking ball 170 from moving in the radial hole. The tool bit may thus be removed from the longitudinal hole 120''', as shown in FIG. 26.

Figure 27:
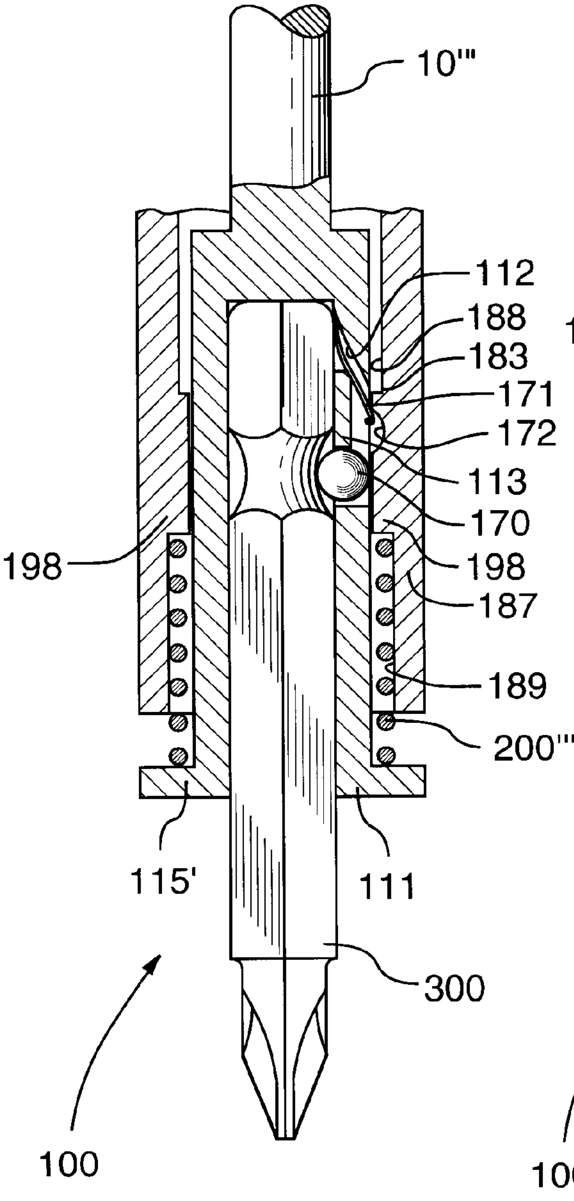
FIG. 27 is a sectional side view of a device according to a sixth embodiment of the invention, showing the device in a position where a tool bit is fully inserted.
Figure 28:
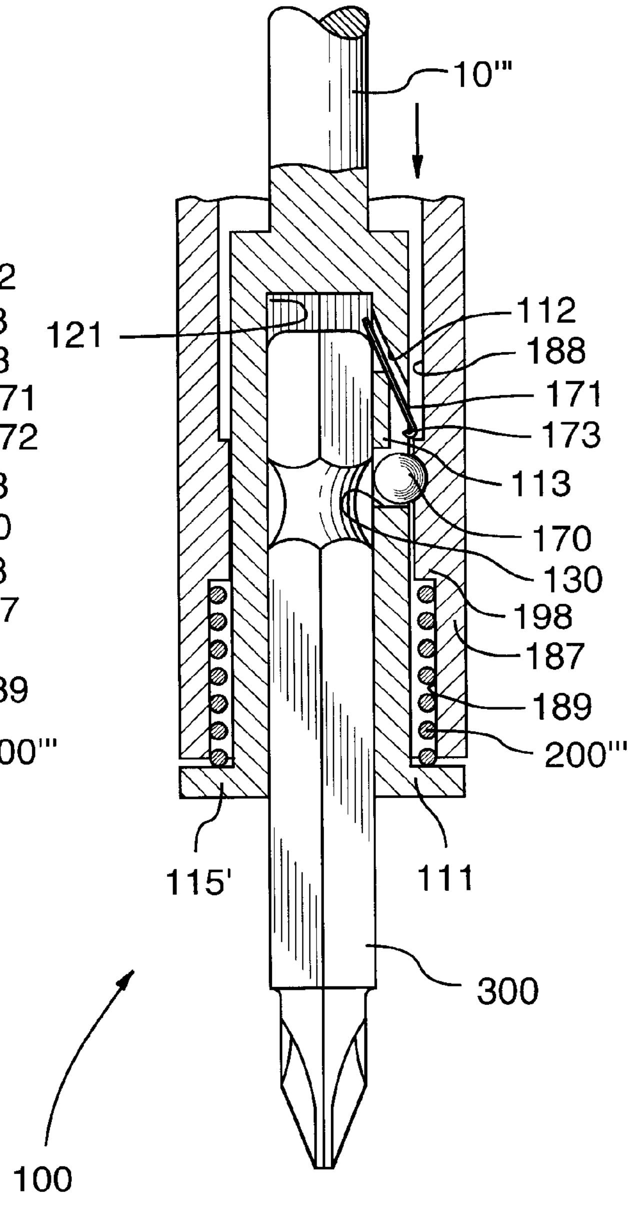
FIG. 28 is a sectional side view of the device according to FIG. 27, showing the device in a position where a tool bit is being removed.

A sixth embodiment of the invention is shown in FIGS. 27 and 28. In this case, the holder 100 comprises an elongate connector means 111 and an outer sleeve 187. The connector means is attachable to a power tool or hand tool (not shown) via a tool mount 10'''. The connector means 111 has a longitudinal hole 121, which has a cross-section corresponding to the cross-section of the mounting portion of the tool bit. The connector means includes a first radial hole 130, which cooperates with a substantially spherical locking ball 170 movably arranged in the radial hole, as has been described in connection with the first embodiment of the invention. The locking ball 170 cooperates with the circumferential groove in the tool bit to lock the tool bit in place when the tool bit is fully inserted into the holder 100. The outer sleeve 187 is arranged to reciprocally slide over the connector means 111 between two end positions, and has a stepped inside diameter, having a medium diameter part 188 facing the handle and a larger diameter part 189 facing the tool bit with a smaller diameter part between them. A spherical recess 172 is arranged in the smaller diameter part, having a shape corresponding to the spherical shape of the locking ball 170. A sleeve biasing means 200''', for example a coil spring, is arranged in the larger diameter part, to bias the sleeve 187 away from the tool mount and thereby to slide the spherical recess away from the locking ball. An annular biasing means stop 115' is arranged at the end of the connecting means 111 which faces the tool bit 300, to prevent the sleeve biasing means from falling out of the sleeve and to provide a support surface for the biasing means. An angled channel 112 is arranged in the connecting means 111 between the radial hole 130 and the end of the connecting means which faces the handle. The angled channel and the radial hole are connected by a connecting channel 113, arranged on the side of the connecting means which faces the sleeve. An elongate rigid arm 171 is arranged in the angled channel 112 so that a rounded end 173 of the rigid arm protrudes into the connecting channel. When no tool bit is inserted into the longitudinal hole 121 and the sleeve 187 is biased to its position closest to the tool mount, the rigid arm 171 is free to move in the angled channel, but cannot move out of the angled channel because the sleeve 187 and the bottom of the longitudinal hole 121 blocks its movement. The rounded end 173 is lodged in or near the spherical recess 172, in this position of the sleeve. When a tool bit 300 is to be inserted into the holder 100, the sleeve 187 is in a position as shown in FIG. 28, with the rounded end 173 of the rigid arm 171 blocking further movement of the sleeve towards the tool mount 10'''. When the inserted end of the tool bit 300 contacts the rigid arm 171, the arm is tilted away from a stop ridge 183 arranged on the inside of the sleeve 187, so that the sleeve no longer is blocked in its biased movement away from the tool bit by the rigid arm locking against the stop ridge. Thus, the sleeve will slide away from the tool bit 300 and the locking ball 170 will be pressed into the circumferential groove of the tool bit and the tool bit will be securely locked in position, as shown in FIG. 28. As the tool bit is fully inserted, the locking ball is free to be seated in the circumferential groove of the tool bit by the sleeve 187 being biased away from the tool mount by the sleeve biasing means 200'''.

To release the tool bit 300, the sleeve 187 is slid away from the tool mount 10''', whereby a smaller diameter part 198 of the sleeve 187 no longer blocks the locking ball 170 from moving in the radial hole. The rounded end 173 of the rigid arm 171 is tilted against the stop ridge 183 arranged on the inside of the sleeve 187, so that the sleeve is blocked in its biased movement away from the tool bit by the rigid arm locking against the stop ridge. The spherical recess 172 is thus located directly above the locking ball 170. The tool bit may thus be removed from the longitudinal hole 120''', as shown in FIG. 28.

Figure 29:
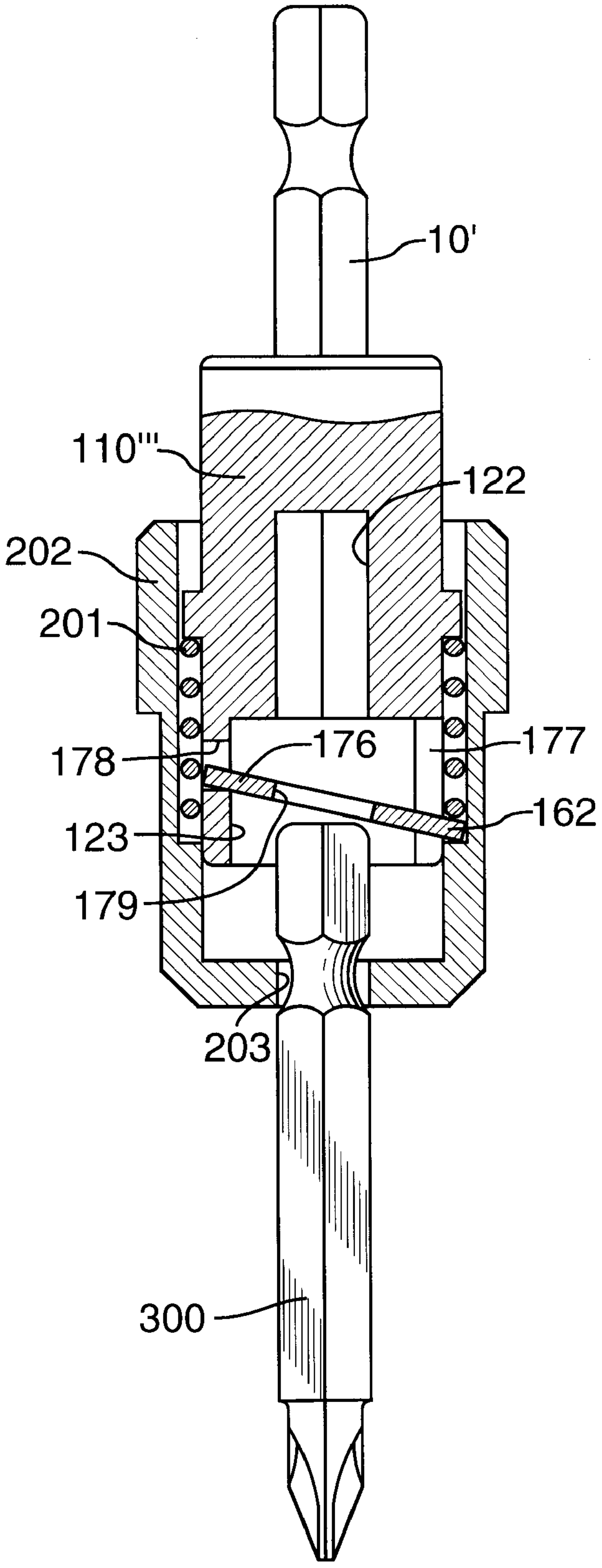
FIG. 29 is a sectional side view of a device according to a seventh embodiment of the invention, showing the device in a position where a tool bit is being inserted.

A seventh embodiment of the invention is shown in FIGS. 29 to 34B. The connector means 110'''' comprises a longitudinal hole 122 and an opposite tool mount 10'. The connector means further has a substantially cylindrical enlargement 123 of the longitudinal hole at the mouth of the longitudinal hole, a longitudinal slit 177 arranged along the enlargement of the longitudinal hole and a through hole 178 arranged opposite the longitudinal slit. A washer 176, having a substantially circular circumference, a short radial protrusion 161 and a long radial protrusion 162 opposite to the first protrusion, is arranged to reciprocally slide or tilt in the enlargement 123 of the longitudinal hole 122. The washer further has a central hole 179, which may be hexagonal, oval or any other cross-section which corresponds to or can accommodate the cross-section of the actual tool bit 300. The cross-section of the central hole is preferably somewhat elongate in comparison to the cross-section of the tool bit. The first protrusion is inserted into the through hole 178 and the second protrusion is inserted into the slit 177 when the device is assembled. The outer sleeve 202 is biased away from the tool mount 10' by a sleeve biasing means 201, which presses on the sleeve via the second protrusion 162 of the washer 176. The outside diameter of the washer is smaller than the inside diameter of the enlargement 123 of the longitudinal hole 122, allowing the washer to tilt inside the enlargement. The washer 176 is prevented from tilting excessively by the first protrusion 161 cooperating with the through hole 178 and the second protrusion 162 cooperating with the slit 177. The sleeve 202 has a profiled entry hole 203 in its end which faces away from the tool mount 10'. The entry hole aligns the inserted tool bit 300, which has a cross-section corresponding to the cross-section of the entry hole, the longitudinal hole 122 and the central hole 179 of the washer, with the central hole of the washer and the longitudinal hole, as is shown in FIG. 29.

Figure 30:
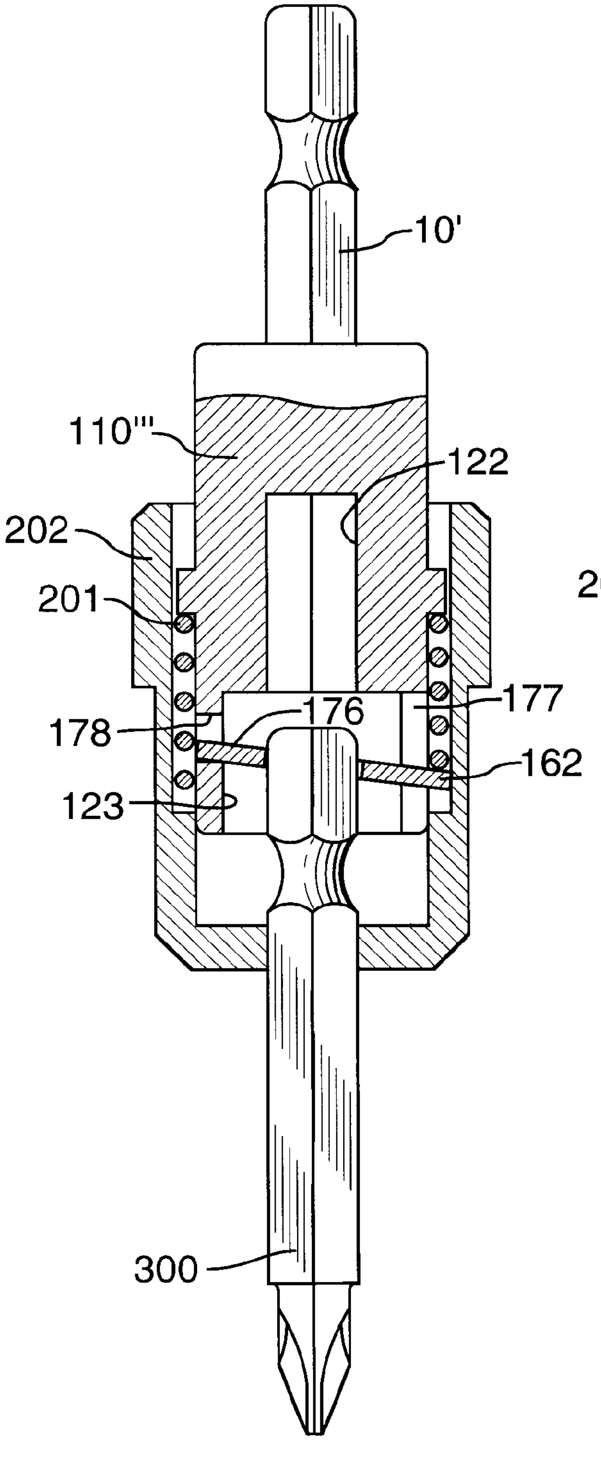
FIG. 30 is a sectional side view of the device according to FIG. 29, showing the device in a position where a tool bit contacts the tilting washer.
Figure 31:
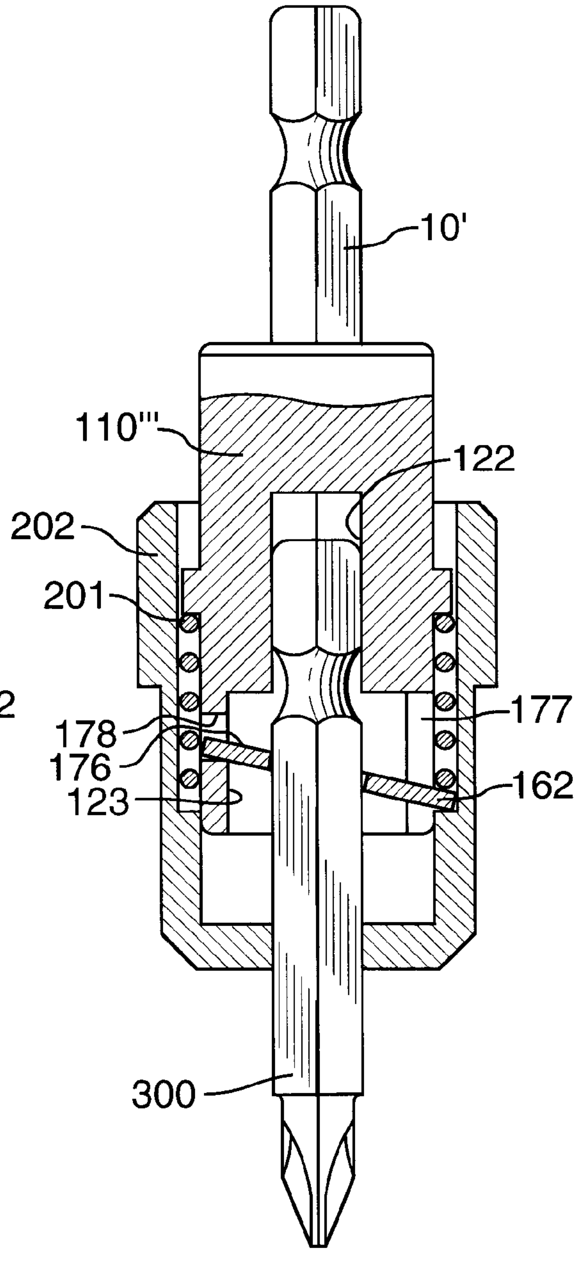
FIG. 31 is a sectional side view of the device according to FIG. 29, showing the device in a position where a tool bit is fully inserted.
Figure 32:
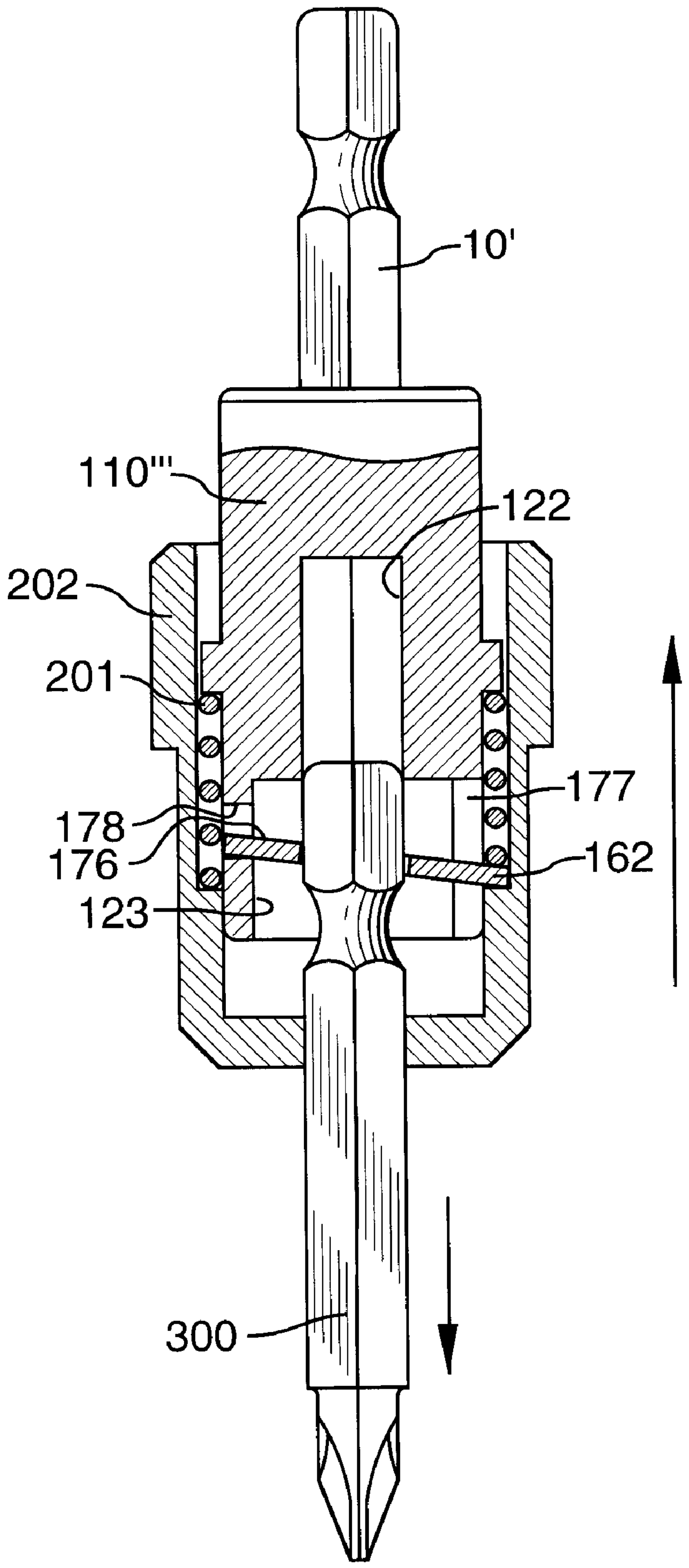
FIG. 32 is a sectional side view of the device according to FIG. 29, showing the device in a position where a tool bit is being removed.

In FIG. 30, the tool bit 300 has contacted the washer 176, making the washer align itself with the outside profile of the tool bit. The washer is thus forced to tilt less, to accommodate the tool bit inside the central hole 179 of the washer, during the insertion of the tool bit. The sleeve biasing means 201 is also compressed somewhat during the insertion. When the tool bit 300 is fully inserted into the longitudinal hole 122, as is shown in FIG. 31, the sleeve biasing means will press the second protrusion 162 of the washer 176 away from the tool holder 10', thus making the washer tilt as much as possible around the tool bit 300. The tool bit is, in this way, held by the inside circumference of the central hole 179 of the washer to prevent the tool bit from being removed from the longitudinal hole 122.

To remove the tool bit 300, the sleeve 202 will have to be pressed towards the tool holder 10'. The second protrusion 162 of the washer 176 will then be pressed in the same direction, making the washer tilt less. The gripping of the washer on the tool bit is thus lessened, and the tool bit may be removed.

Figure 59:
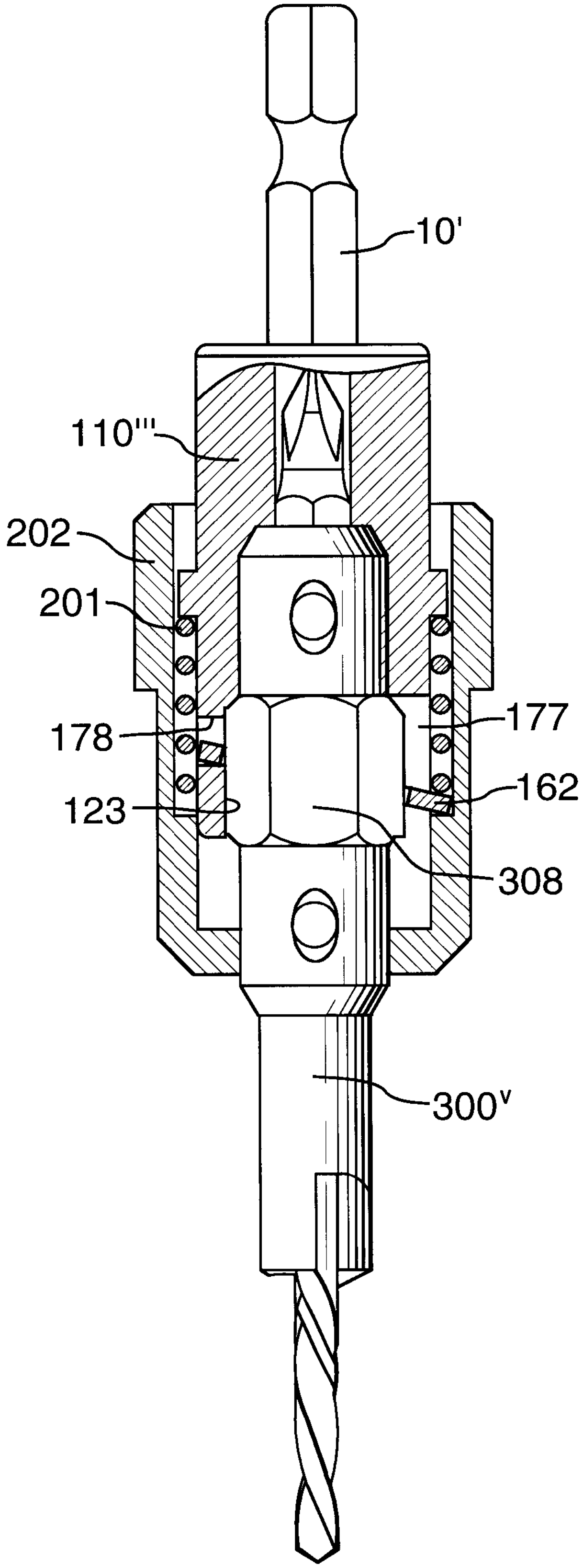
FIG. 59 is a partially sectioned side view of a device according to a variation of the seventh embodiment of the invention, showing the device in a position where a double-ended tool bit is fully inserted in the holder.
Figure 60A:
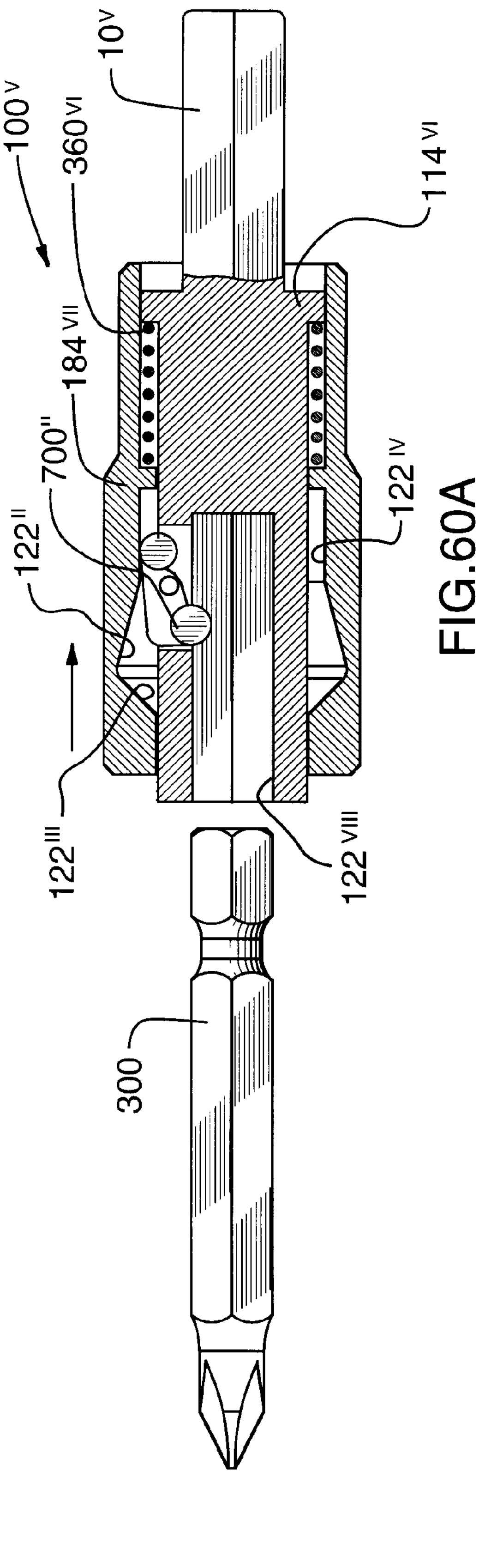
FIG. 60A is a partially sectioned side view of a device according to a variation of the fourteenth embodiment of the invention, showing the device in a position where a single-ended tool bit is being inserted.
Figure 60B:
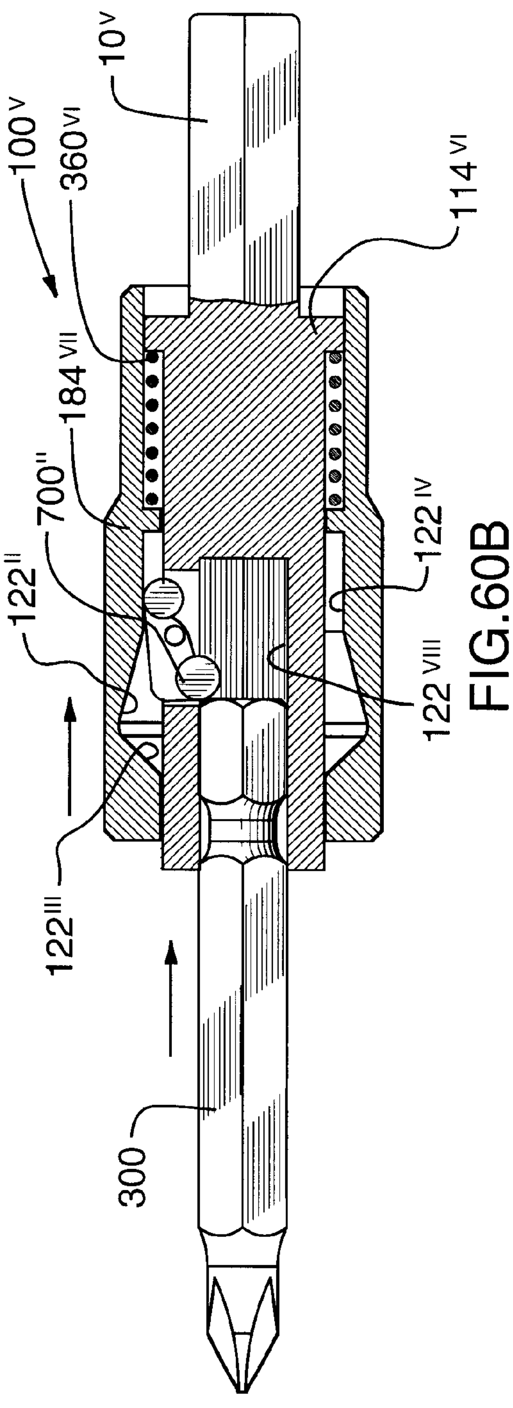
FIG. 60B is a partially sectioned side view of the device of FIG. 60A, showing the device in a position where a single-ended tool bit is being inserted and contacts the rocker arm.
Figure 60C:
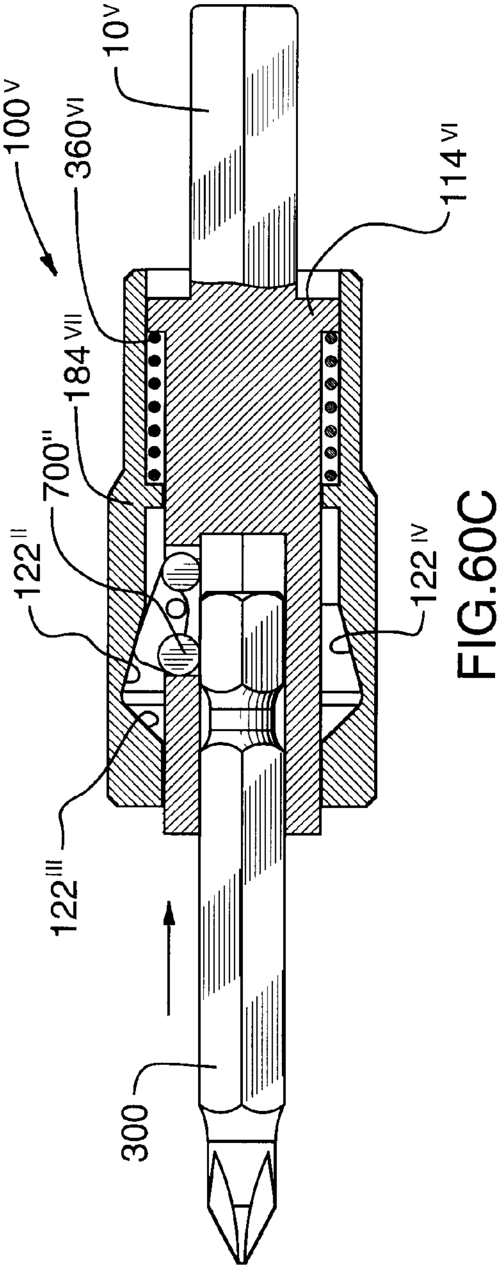
FIG. 60C is a partially sectioned side view of the device of FIG. 60A, showing the device in a position where a single-ended tool bit is being inserted has pivoted the rocker arm.
Figure 60D:
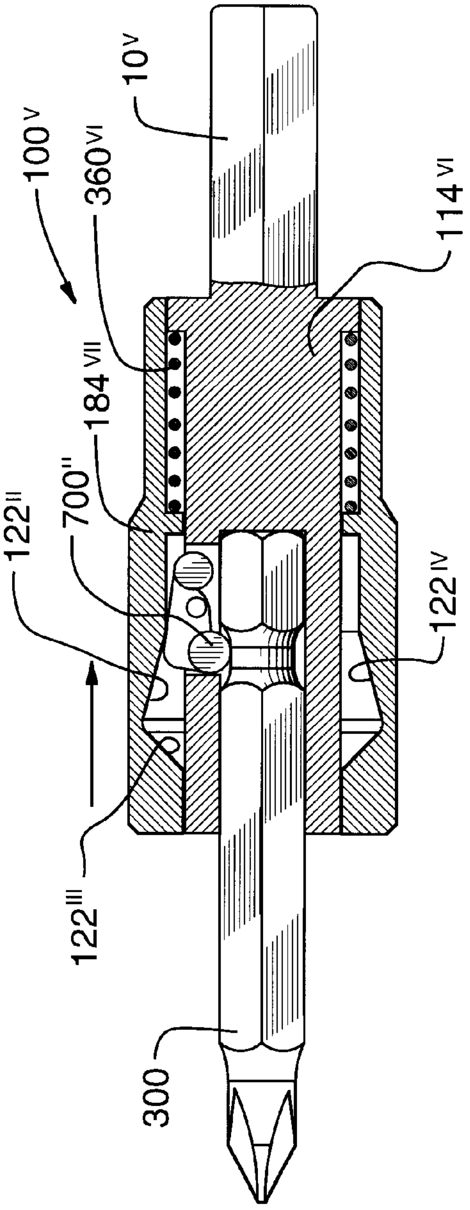
FIG. 60D is a partially sectioned side view of the device of FIG. 60A, showing the device in a position where a single-ended tool bit is fully inserted and the rocker arm locks into the groove of the tool bit.
Figure 60E:
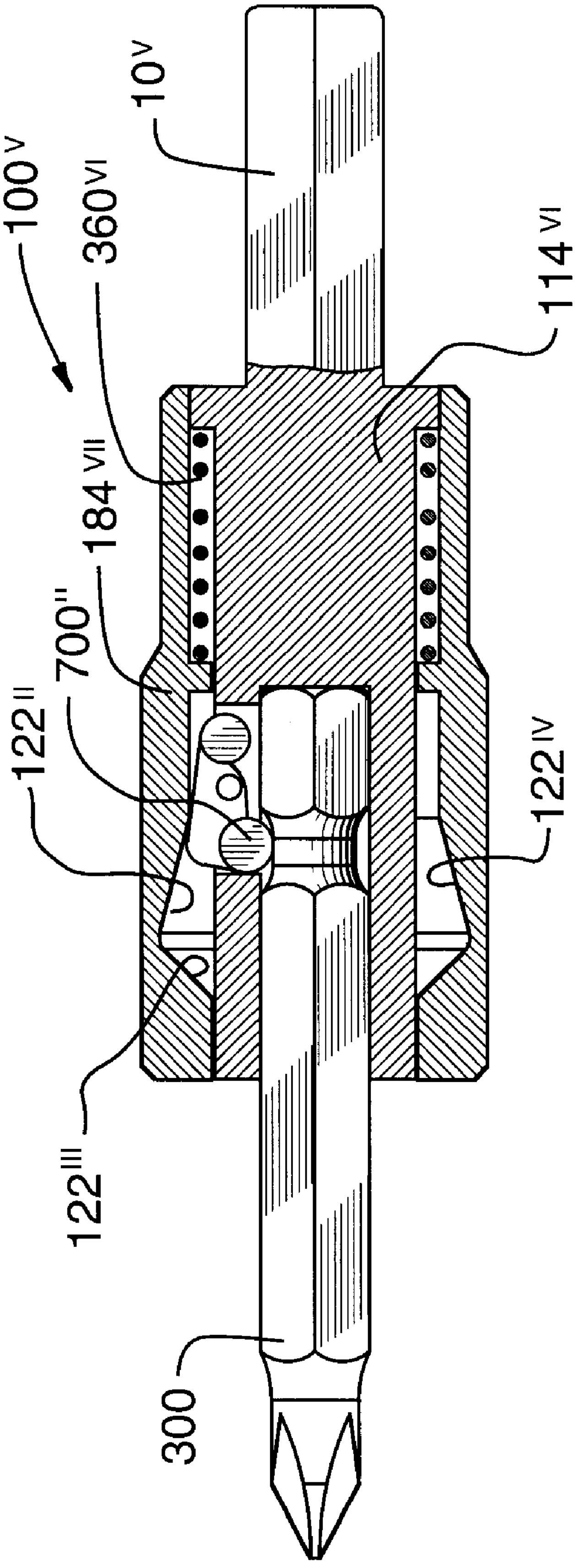
FIG. 60E is a partially sectioned side view of the device of FIG. 60A, showing the device in a position where a single-ended tool bit is fully inserted and the sleeve is moved towards the tool bit insertion end of the holder.
Figure 61A:
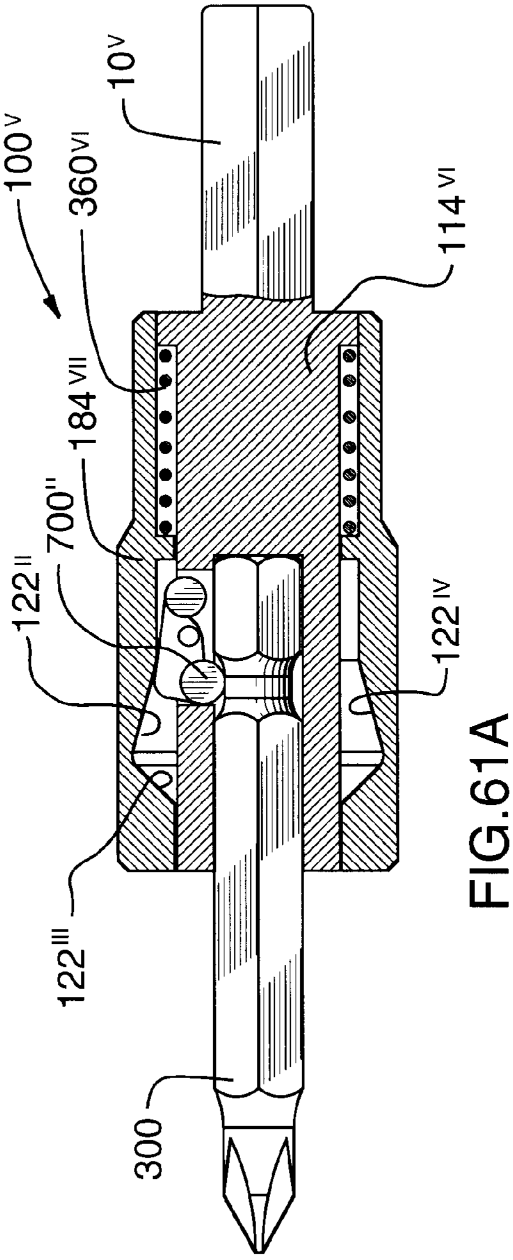
FIG. 61A is a partially sectioned side view of the device of FIG. 60A, showing the device in a position where a single-ended tool bit is fully inserted in the holder.
Figure 61B:
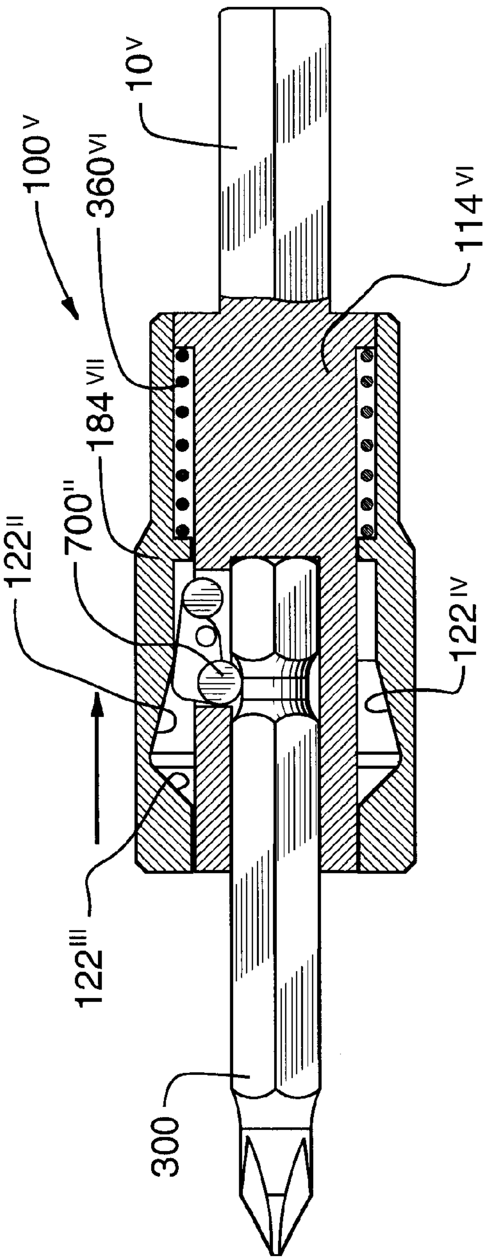
FIG. 61B is a partially sectioned side view of the device of FIG. 60A, showing the device in a position where a single-ended tool bit is fully inserted and the sleeve is moved towards the tool holder end of the holder, releasing the rocker arm from the tool bit groove.
Figure 61C:
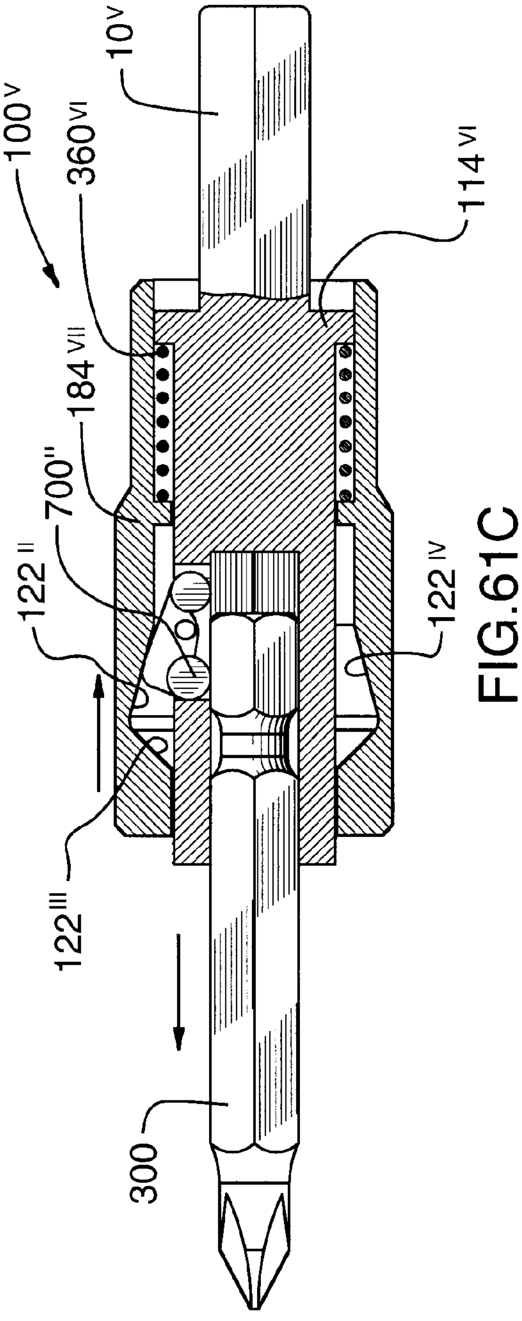
FIG. 61C is a partially sectioned side view of the device of FIG. 60A, showing the device in a position where a single-ended tool bit is being removed and the rocker arm is sliding on the tool bit.
Figure 61D:
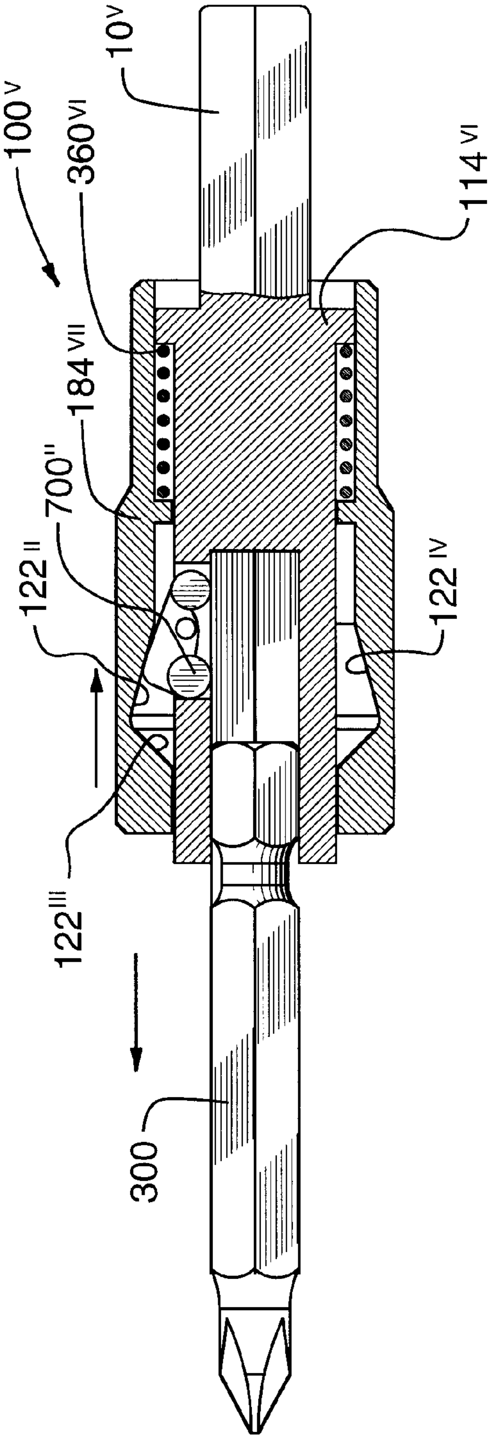
FIG. 61D is a partially sectioned side view of the device of FIG. 60A, showing the device in a position where a single-ended tool bit is fully removed from the holder.
Figure 61E:
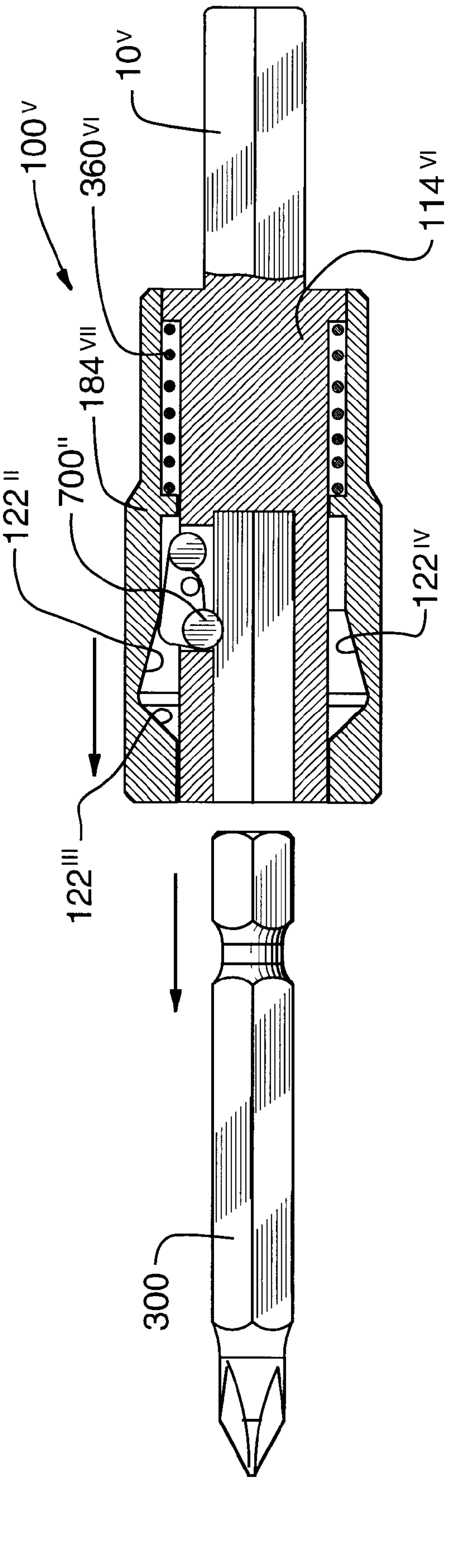
FIG. 61E is a partially sectioned side view of the device of FIG. 60A, showing the device in a position where a single-ended tool bit is fully removed from the holder, and the sleeve is moved to its fully biased position towards the tool bit end of the holder.
Figure 62A:
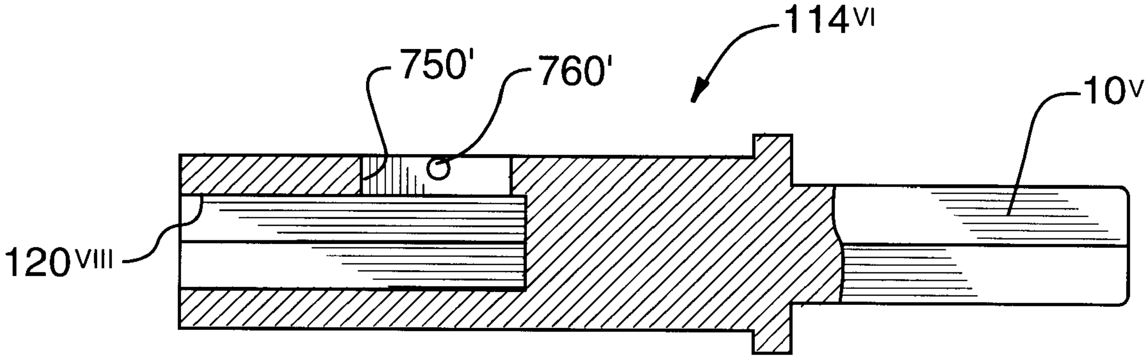
FIG. 62A is a partially sectioned side view of a connector means of the device of FIG. 60A.
Figure 62B:
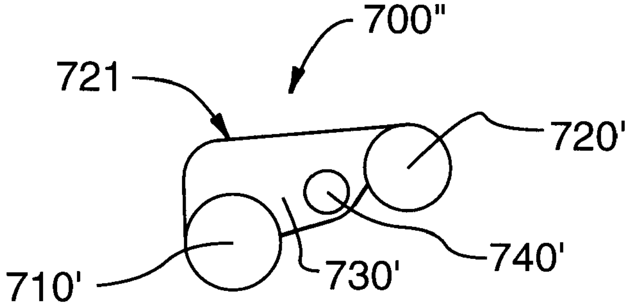
FIG. 62B is a side view of a rocker arm of the device of FIG. 60A.
Figure 62C:
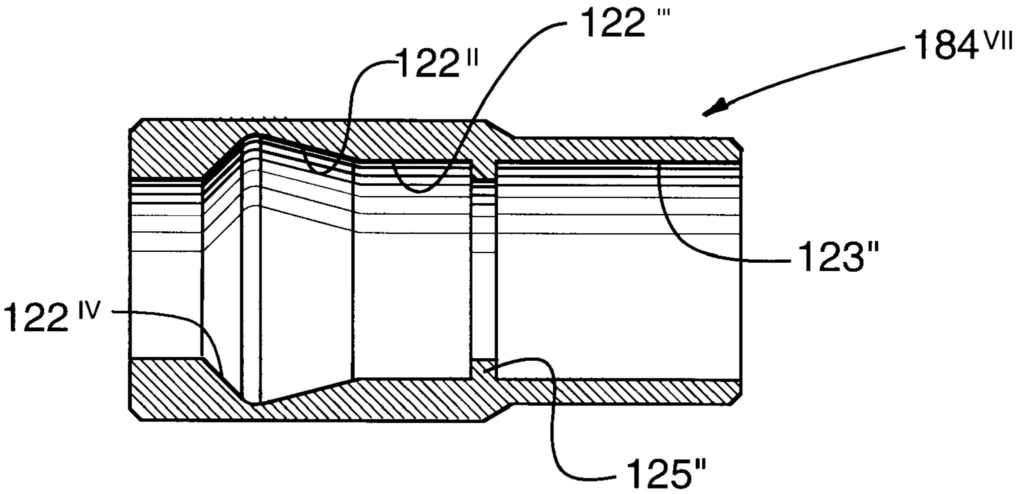
FIG. 62C is a sectioned side view of a sleeve of the device of FIG. 60A.

An variation of the seventh embodiment of the invention is shown in FIG. 59. The central washer hole, the profiled entry hole of the sleeve and the longitudinal hole of the connector means all have to be dimensioned to accommodate the larger double-ended tool bit 300$^{V}$. All reference numerals are the same for FIG. 59 as for FIG. 29.

Figure 33A:
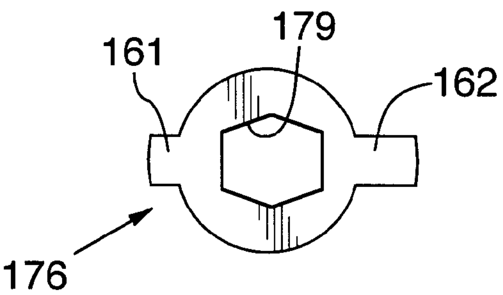
FIG. 33A shows a top view of a first embodiment of the tilting washer according to FIG. 29.
Figure 33B:
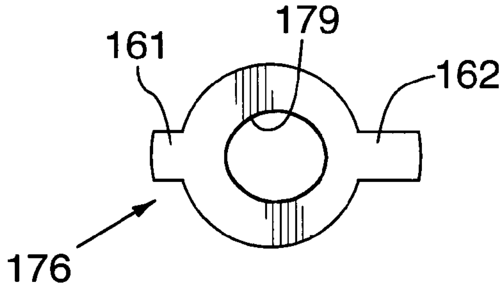
FIG. 33B shows a top view of a second embodiment of the tilting washer according to FIG. 29.
Figure 34B:
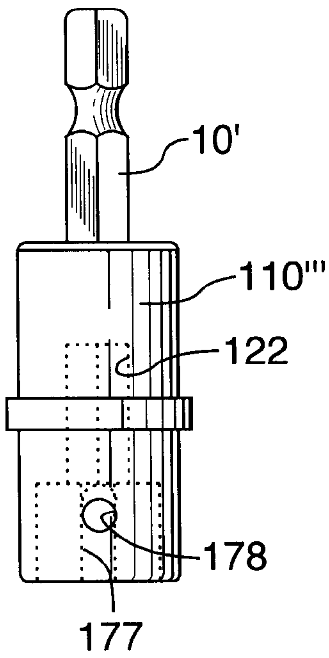
FIG. 34B is a side view of the connector means according to FIG. 29.
Figure 34A:
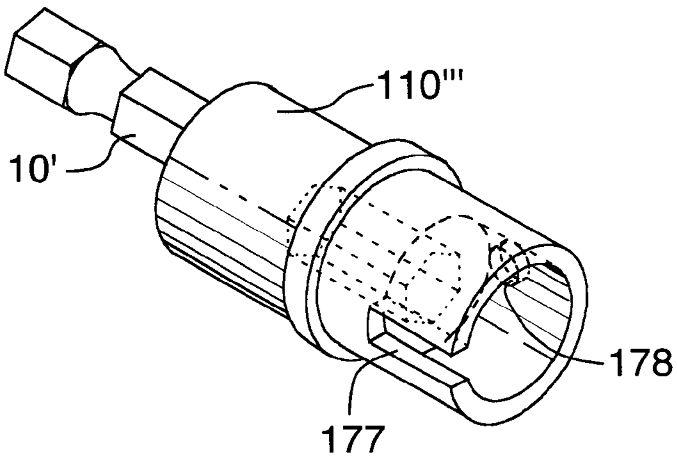
FIG. 34A is a perspective elevational side view of the connector means according to FIG. 29.
Figure 35:
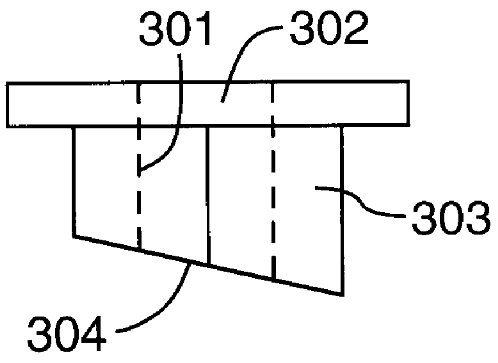
FIG. 35 is a sectional side view of a device according to an alternative to the seventh embodiment of the invention.
Figure 35:
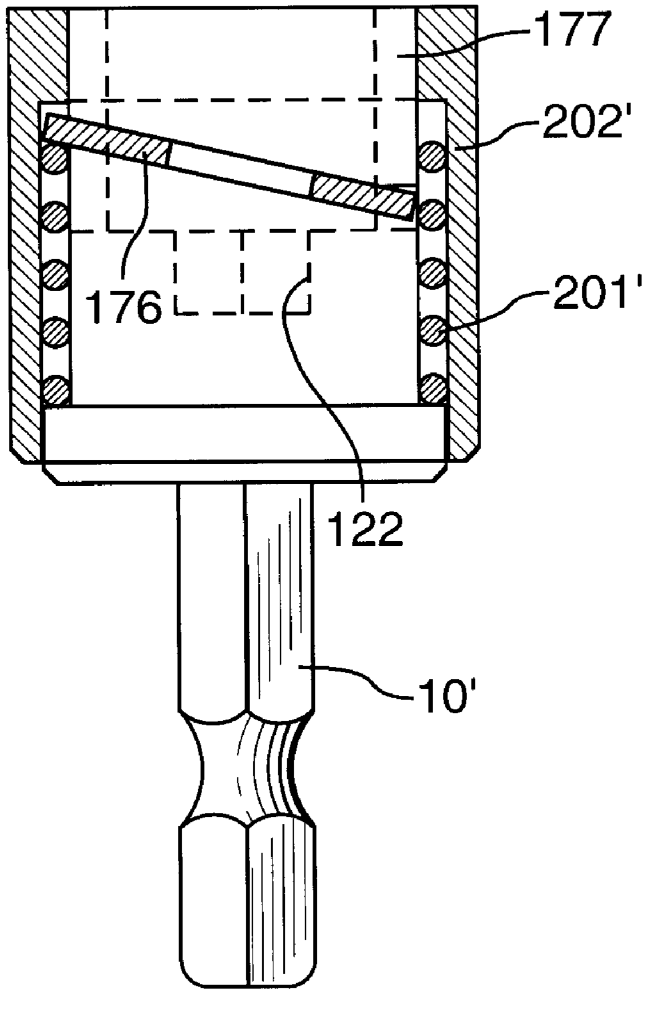
Figure 36A:
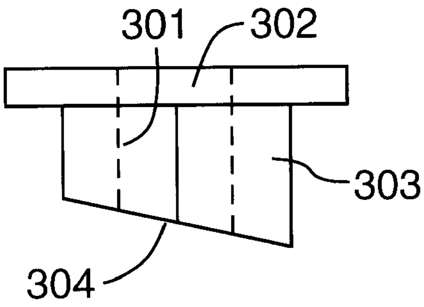
FIG. 36A is a side view of a washer hold down means according to FIG. 35.
Figure 36B:
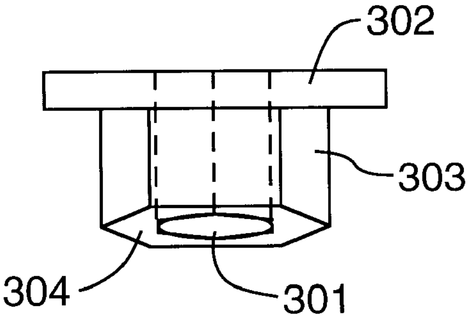
FIG. 36B is another side view of a washer hold down means according to FIG. 35.

In FIG. 33B, the tilting washer 176 is shown having an oval central hole 179, the first protrusion 161 and the second protrusion 162. In FIG. 33A, the tilting washer 176' is shown having an elongate hexagonal central hole 179', the first protrusion 161 and the second protrusion 162. The second protrusion is preferably somewhat curved (not shown) to fit better between the sleeve biasing means 201 and the sleeve 202. By selecting an appropriate central hole shape, the washer can cooperate with basically any cross-section shape tool. Thus, one holder can accommodate and securely hold tools of different shapes, for example both hex and round cross-section tools.

Figure 37A:
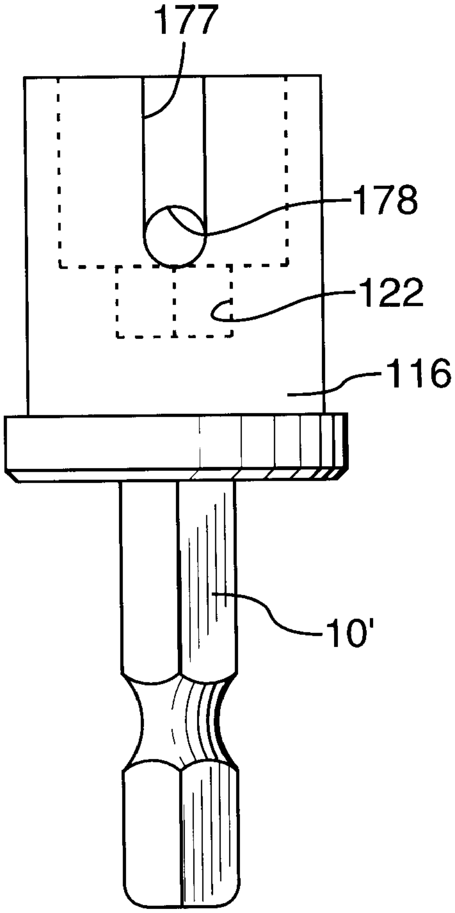
FIG. 37A is a side view of a connecting means according to FIG. 35.
Figure 37B:
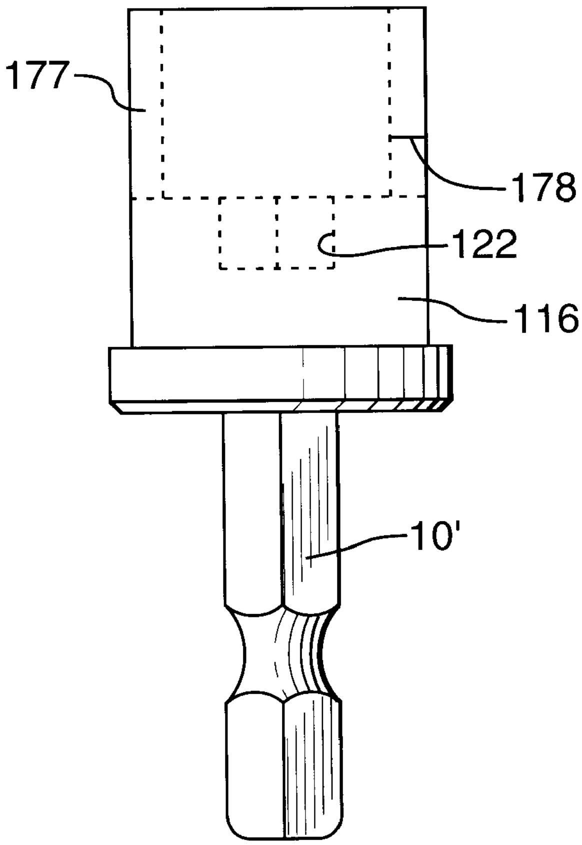
FIG. 37B is another side view of a connecting means according to FIG. 35.

In FIGS. 35 to 37B, an alternative embodiment to the embodiment described in FIGS. 29 to 34B is shown. An outer sleeve 202' is biased away from the tool holder 10' by the sleeve biasing means 201'. A washer 176, as described above, is held in place by a washer biasing means 302. The washer biasing means is preferably an end cap, having a protruding part 303, which cooperates with the washer via a slanted end surface 304. The washer biasing means 302 further has a tool bit accommodating longitudinal centre hole 301. In FIGS. 36A and 36B, the washer biasing means is shown in two side views. The connecting means 116 and tool holder 10' are shown in FIGS. 37A and 37B, also in two side views. The longitudinal hole 122 of the connecting means is shown, together with the through hole 178 and the slit 177.

Figure 38A:
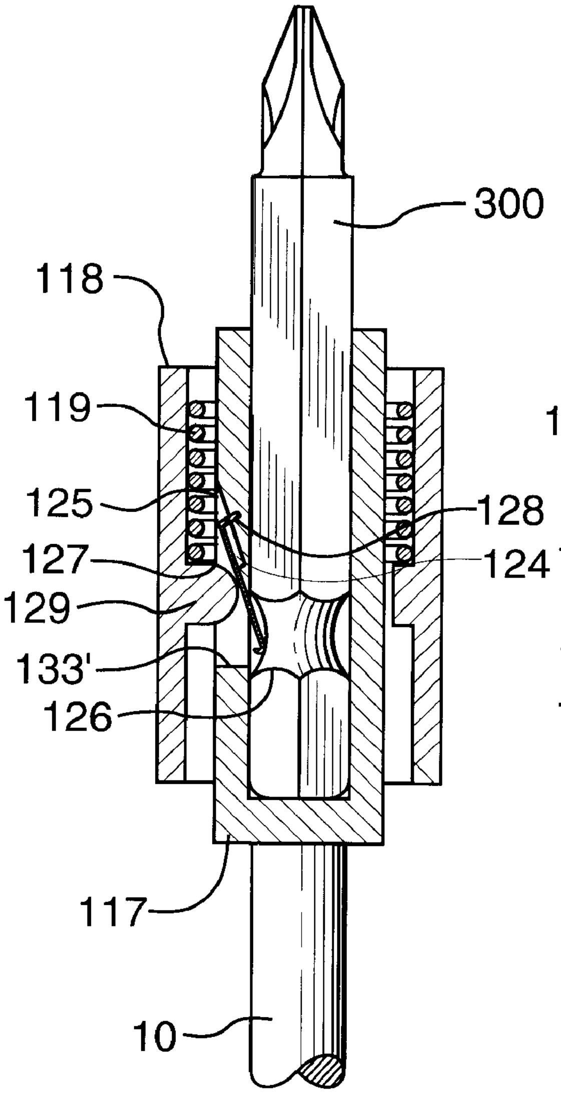
FIG. 38A is a sectional side view of an eight embodiment of the invention, showing the device with an inserted tool bit.
Figure 38B:
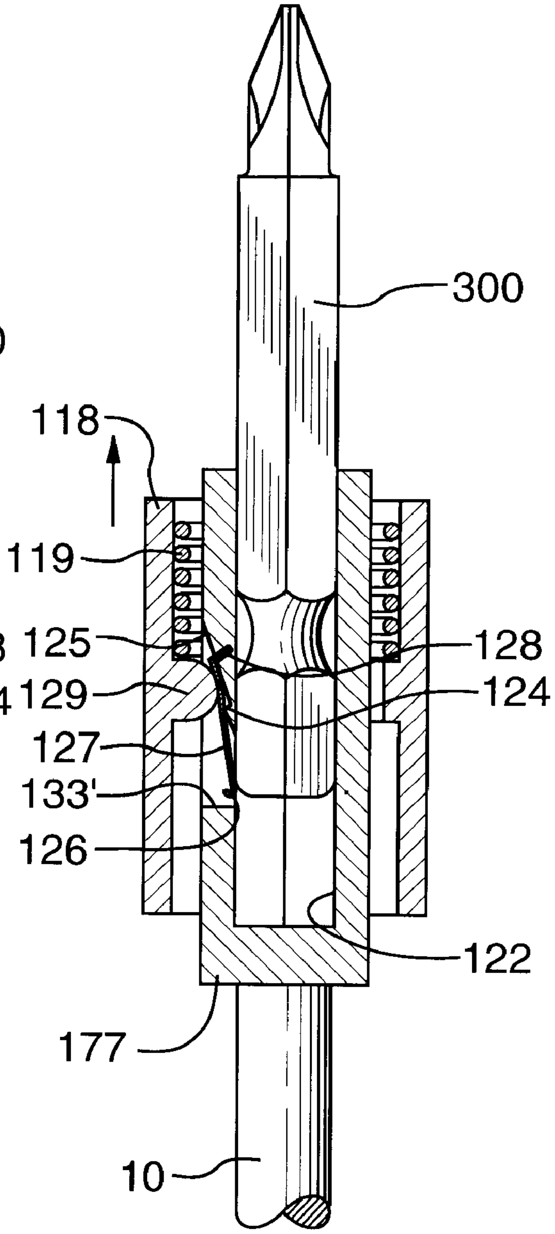
FIG. 38B is a sectional side view of the device according to FIG. 38A, showing the device when the tool bit is released.
Figure 39A:
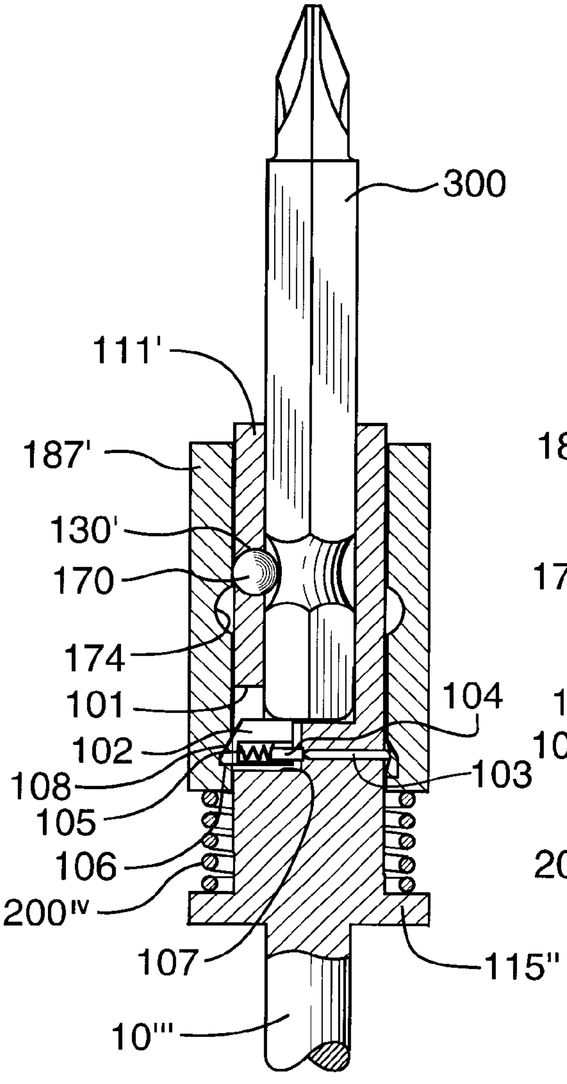
FIG. 39A is a sectional side view of a ninth embodiment of the invention, showing the device with an inserted tool bit.
Figure 39B:
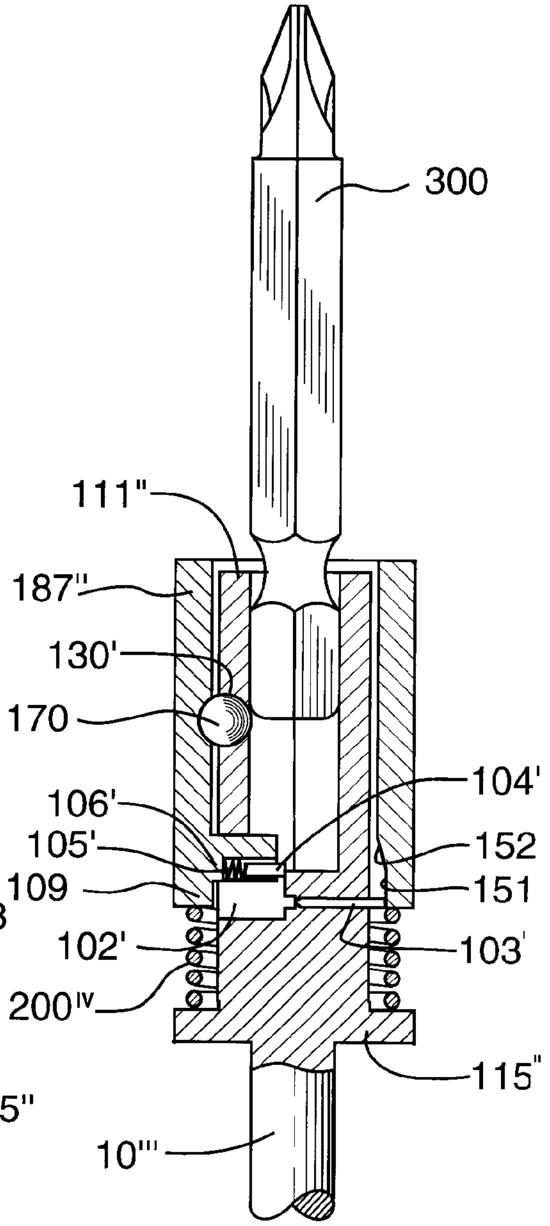
FIG. 39B is a sectional side view of the device according to FIG. 39A, showing the device when the tool bit is released.
Figure 39C:
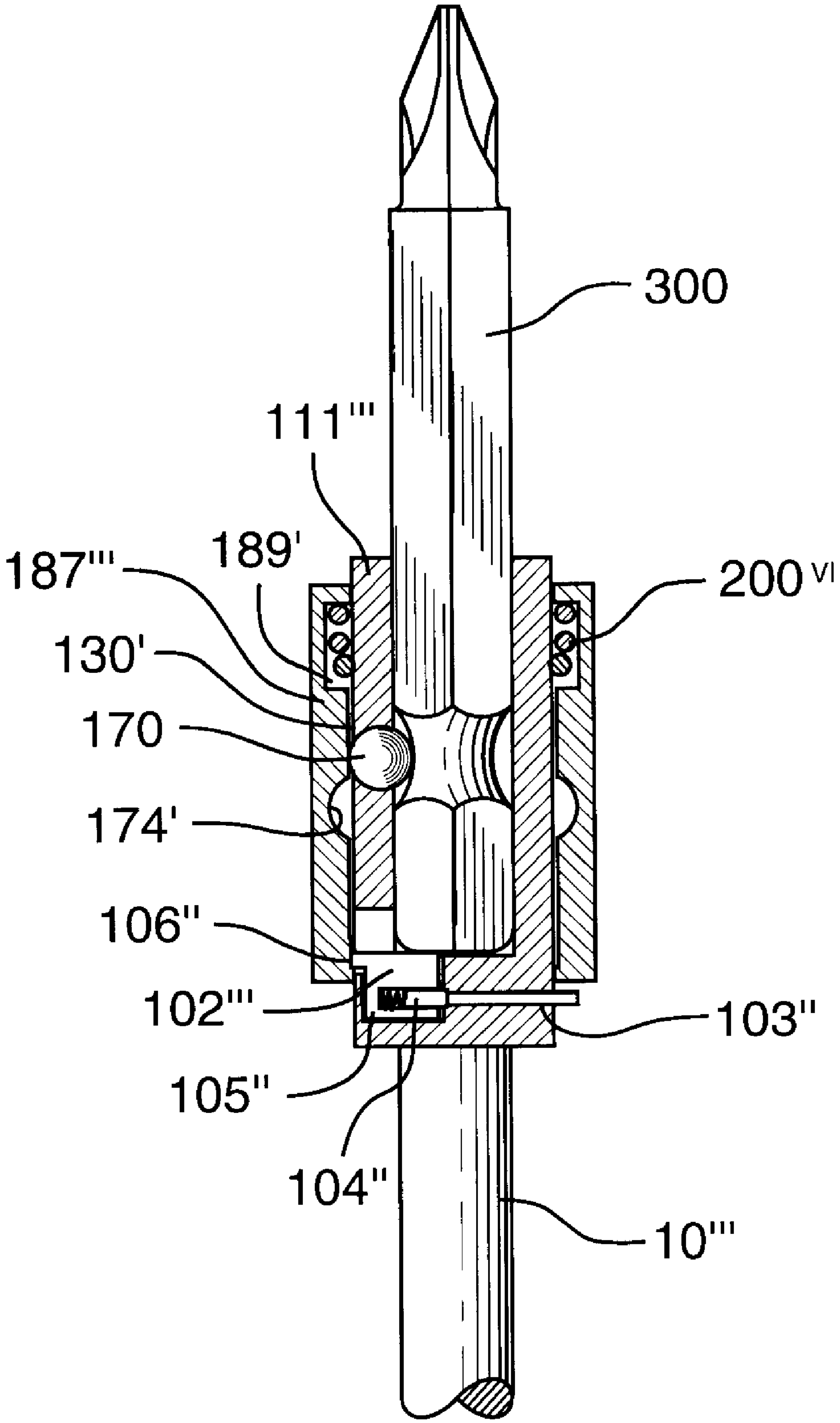
FIG. 39C is a sectional side view of a tenth embodiment of the invention, showing the device with an inserted tool bit.
Figures 40A, 40B, 40C:
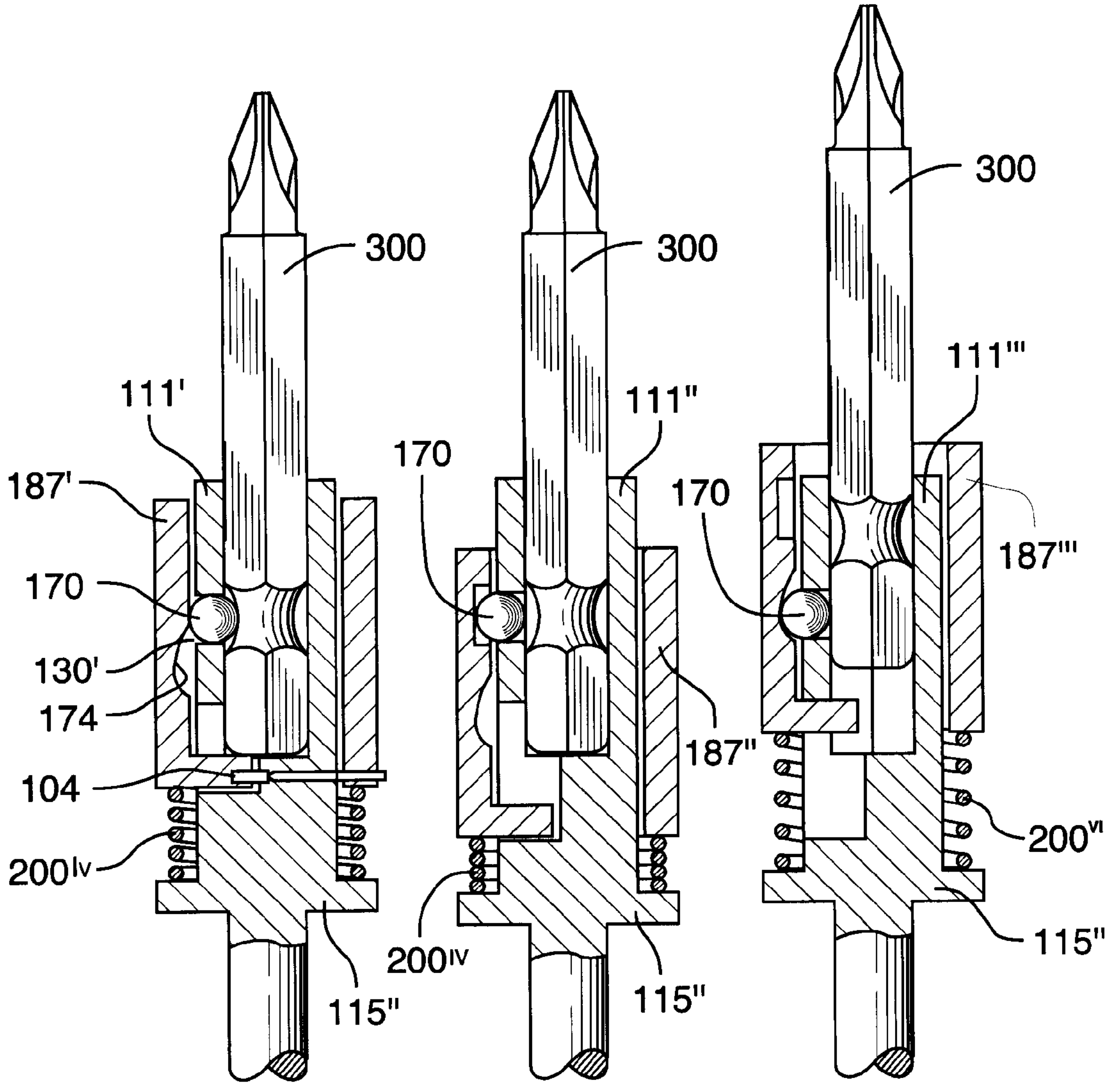
FIG. 40A is a sectional side view of an eleventh embodiment of the invention, showing the device with an inserted tool bit.
FIG. 40B is a sectional side view of the device according to FIG. 40A, showing the device when the tool bit is released.
FIG. 40C is a sectional side view of the device according to FIG. 40A, showing the device when the tool bit is inserted.

In FIGS. 38A and 38B, a twelfth embodiment of the invention is shown. The tool bit 300 cooperates with a connecting means 117, which has a longitudinal hole 122 in one side. The longitudinal opening cooperates with a sleeve protrusion 129 arranged on the outer sleeve 118. The sleeve is biased towards the tool holder 10 by a sleeve biasing means 119. The longitudinal hole 122 has a slanting side wall 125 on the side of the opening which faces away from the tool holder. The slanting side wall has a step 124 arranged in it to cooperate with an oblong resilient means 127. The resilient means has a first end 128 and a second end 126, and the resilient means is tiltingly arranged adjacent the slanting side wall 125, so that the second end is movable between one position in which the second end has entered a distance into the longitudinal hole 122 and another position in which the second end is located entirely outside the longitudinal hole. The second end is preferably bent into a rounded shape, whilst the first end is sharply bent and fixedly secured in a hole (not shown) in the slanting side wall 125. The rounded second end 126 cooperates with the groove on the tool bit 300 to hold the tool bit in place when the tool bit is inserted into the longitudinal hole 122 of the connecting means 117. To release the tool bit, the sleeve 118 is pushed away from the tool holder 10, causing the protrusion 129 to press the oblong resilient means 127 away from the tool bit 300. The tool bit is thus free to be removed.

In FIGS. 39A to 40C, different additional embodiments of the invention are shown, where a release pin mechanism is used to release the sleeve in order to align a recess in the sleeve with the locking ball, so that the tool bit may be removed.

A thirteenth and preferred embodiment of the invention is shown in FIGS. 41A to 41G. In this case, the holder 100' comprises an elongate connector means 114' and an outer sleeve 184". The connector means is attachable to a power tool or hand tool (not shown) via a tool mount 10". The connector means 114' has a longitudinal hole 120$^{IV}$, which has a cross-section corresponding to the cross-section of the mounting portion of the tool bit. The connector means includes a first radial hole 130", which cooperates with a substantially spherical locking ball 170' movably arranged in the radial hole, as has been described in connection with the first embodiment of the invention. The locking ball 170' cooperates with the circumferential groove in the tool bit to lock the tool bit in place when the tool bit is fully inserted into the holder 100'. The outer sleeve 184" is arranged to reciprocally slide over the connector means 114' between two end positions, and has a stepped inside diameter, having a smaller diameter part facing the tool mount and a larger diameter part 193 facing the tool bit. A bevelled transition 186' is arranged between the two different diameter parts. The bevelled transition functions similarly to the depressor described for earlier embodiments in cooperation with a transition ball 194, which will be described in detail later. A sleeve biasing means 360", for example a coil spring, is arranged to bias the sleeve 184" away from the tool mount. The transition ball 194 is arranged in a transition hole 195 in the connector means 114'. The transition hole is substantially radial, and preferably angled so that the bottom 195' of the transition hole is arranged further from the tool mount 10$^{IV}$ than the top 195" of the transition hole. Alternatively, the transition hole is substantially perpendicular to the longitudinal hole 120$^{IV}$. Thus, the transition ball 194, which has a diameter substantially corresponding to the diameter of the transition hole 195, is slidable between a first position at the bottom of the transition hole, to a second position protruding from the top of the transition hole. The bevelled transition 186' is pressed against the transition ball 194 by the sleeve biasing means 360".

Figure 41A:
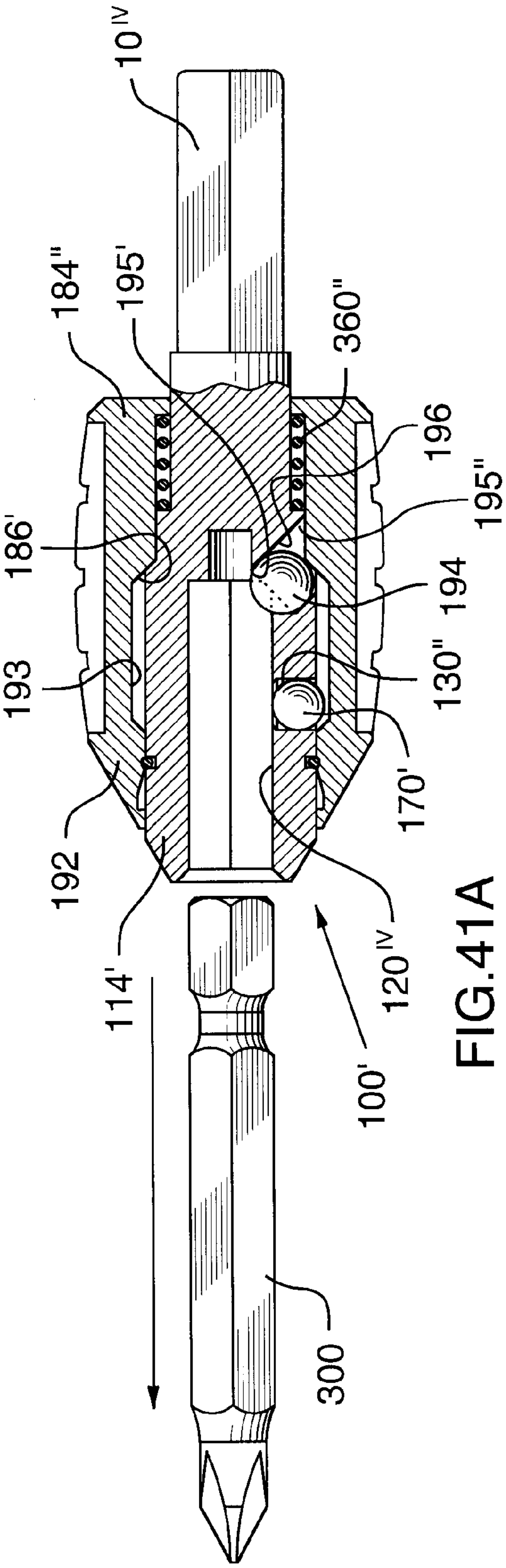
FIG. 41A is a sectional side view of a device according to a twelfth embodiment of the invention, showing the device in a position where a tool bit is in a position to be inserted the holder.

In FIG. 41A, a tool bit 300 is held in position to be inserted into the holder 100'. The locking ball 170' is free to slide in the radial hole 130", because the larger diameter part 193 of the sleeve 184" is located adjacent the locking ball. The sleeve biasing means 360" is pressing the sleeve and the bevelled transition 186' against the transition ball 194, which is thus forced to the bottom 195' of the transition hole 195. The sleeve is held in this position by a mechanism comprising a locking cavity 364, which cooperates with a locking ring 362 arranged in a locking ring groove 363 arranged on the elongate connector means 114', to limit the stroke of the sliding movement of the sleeve along the elongate connector means 114' in the direction towards the tool mount by the locking ring 362 blocking further movement because the locking ring contacts the edge of the locking cavity 364 (as shown in FIG. 41D), and in the direction towards the tool bit by the bevelled transition 186' contacting the transition ball 194 in its position at the bottom of the transition hole, which protrudes enough to block the movement of the sleeve 184" when the bevelled transition contacts the larger diameter portion of the elongate connector means (see FIGS. 41A, 41B, 41C, 41E, 41F and 41G). In the latter position, the sleeve is prevented from sliding towards the tool mount, under the biasing influence of the biasing means 360", by the frictional forces present between the inside of the sleeve and the locking ring 362.

Figure 41B:
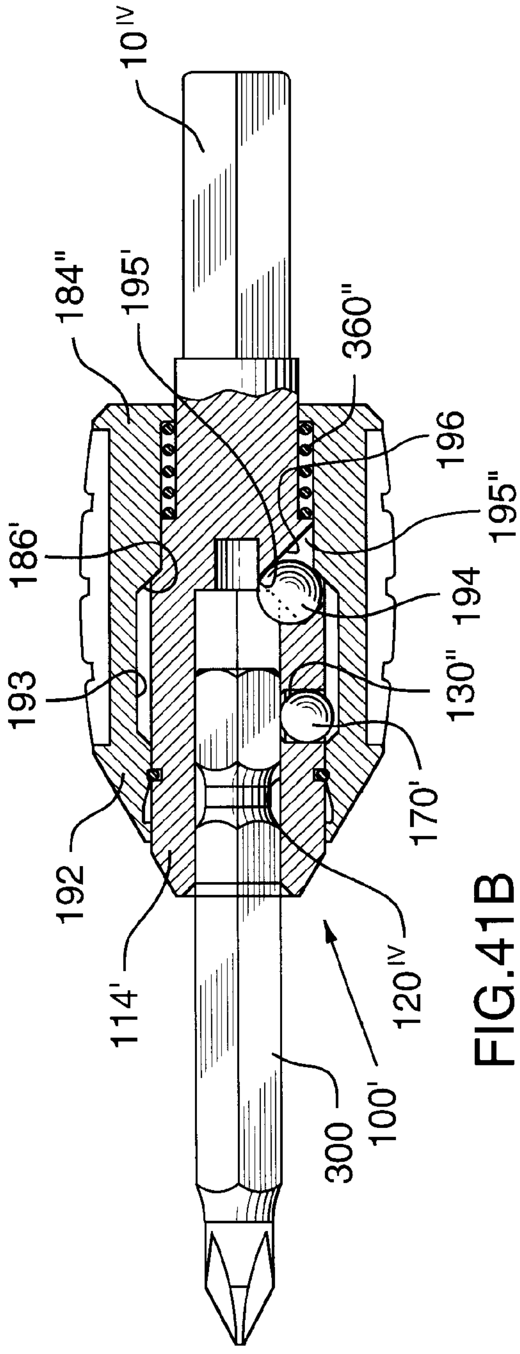
FIG. 41B is a sectional side view of the device according to FIG. 41A, showing the device when the tool bit is in an intermediate position during insertion.
Figure 41C:
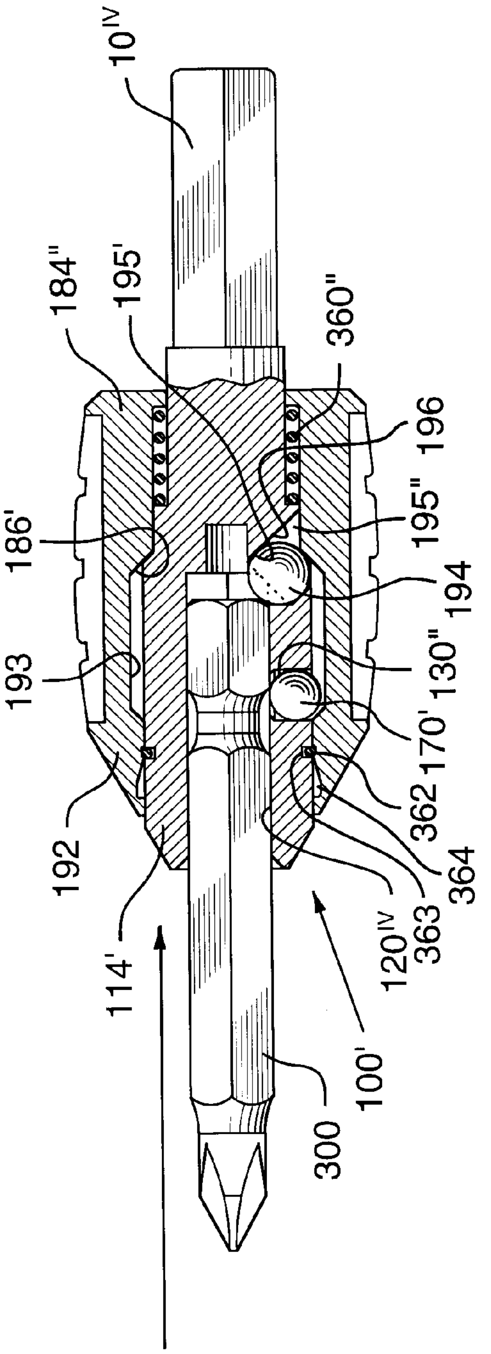
FIG. 41C is a sectional side view of the device according to FIG. 41A, showing the device when the tool bit makes contact with the transition ball.
Figure 41D:
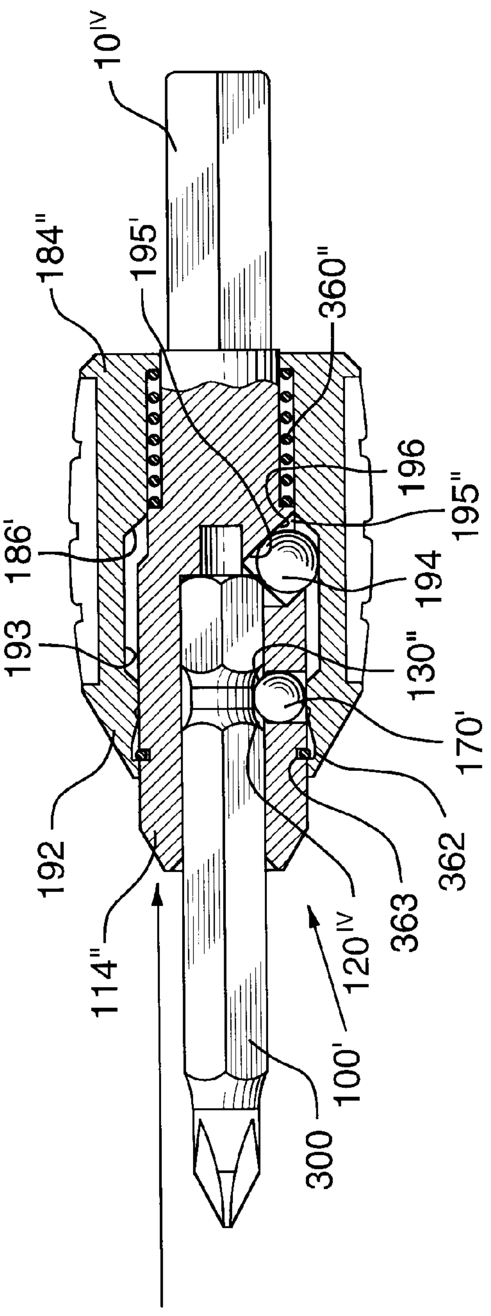
FIG. 41D is a sectional side view of the device according to FIG. 41A, showing the device when the tool bit is fully seated in the holder.

As is shown in FIG. 41B, the tool bit 300 is inserted into the longitudinal hole 120$^{IV}$. The inserted end of the tool bit will push the transition ball 194 radially outwards in the transition hole 195, as shown in FIG. 41C. The transition ball 194 is pressed by the inserted end of the tool bit, from its position at the bottom of the transition hole 195 towards the sleeve and the bevelled transition 186', thus pressing the sleeve towards the tool mount. A locking portion 192 of the sleeve 184" effectively blocks the locking ball 170' from movement in the first radial hole 130", locking the tool bit 300 in the longitudinal hole 120$^{IV}$, see FIG. 41D.

Figure 41E:
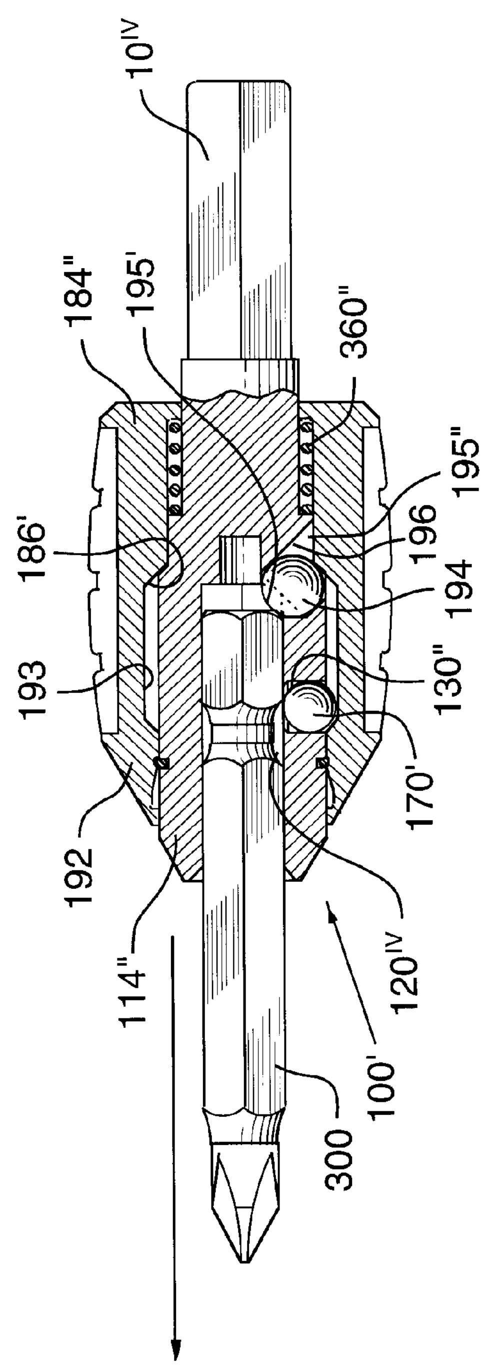
FIG. 41E is a sectional side view of the device according to FIG. 41A, showing the device when the tool bit is beginning to be removed from the holder by releasing the locking ball when the sleeve is pressed towards the tool bit.
Figure 41F:
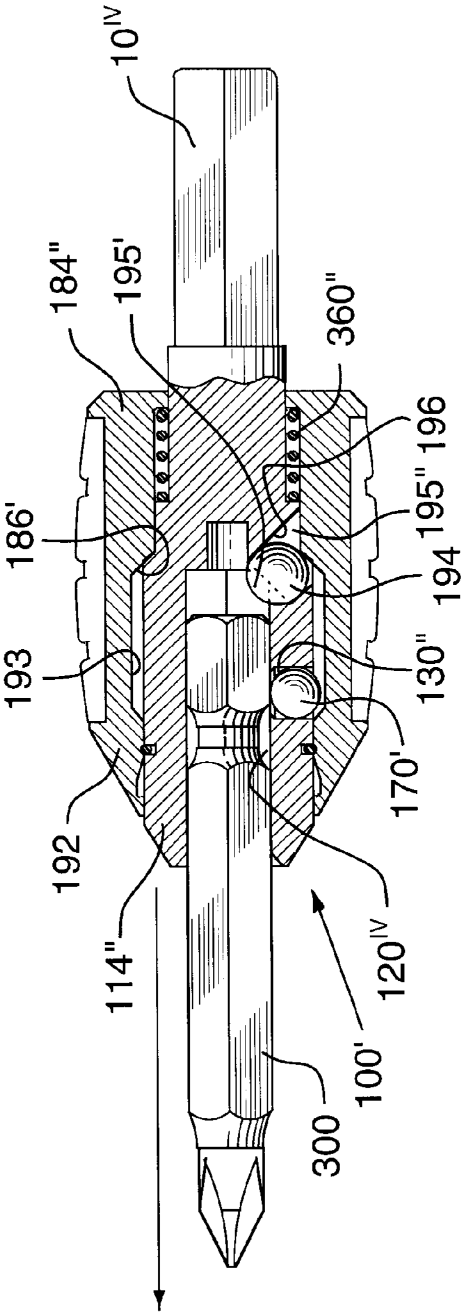
FIG. 41F is a sectional side view of the device according to FIG. 41A, showing the device when the tool bit is further removed from the holder and loses contact with the transition ball.
Figure 41G:
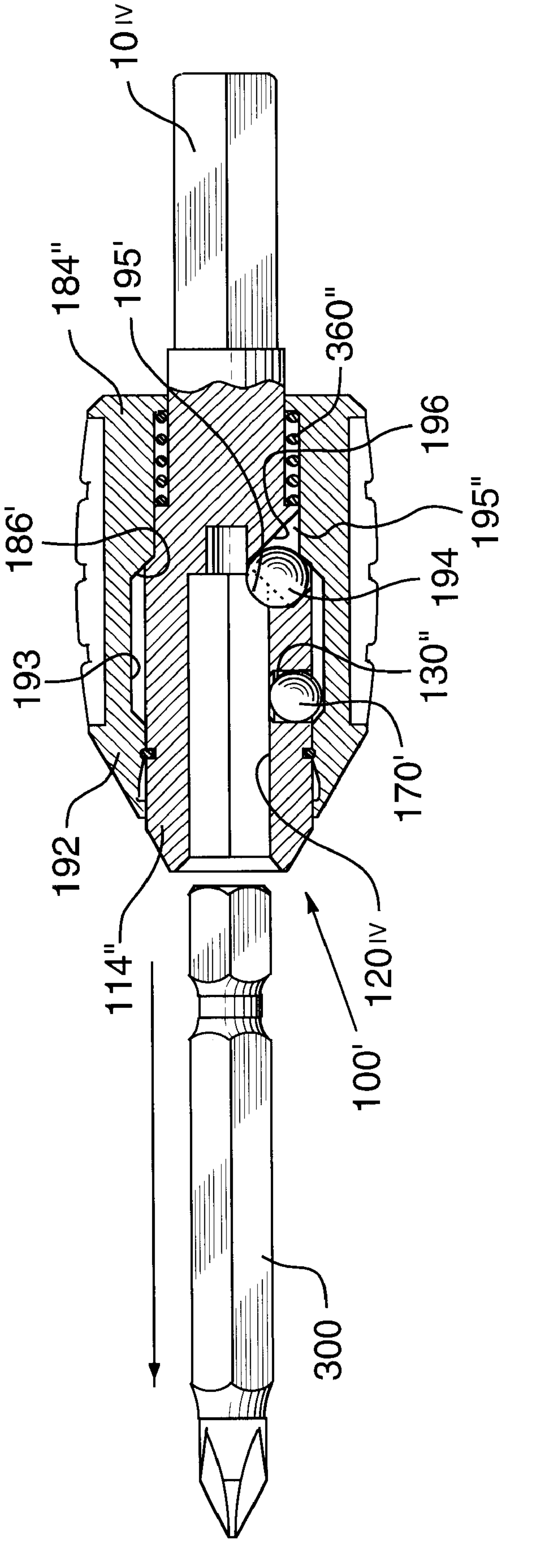
FIG. 41G is a sectional side view of the device according to FIG. 41A, showing the device when the tool bit is fully removed from the holder.

FIG. 41E shows the situation when the sleeve 184" is pressed towards the tool bit 300, starting to release the locking ball 170' by sliding the locking portion 192 of the sleeve forwards. The bevelled transition 186' will push the transition ball 194 towards the tool bit, to thereby start pushing the tool bit out of the longitudinal hole 120$^{IV}$. As is shown in FIGS. 41E to 41G, the locking portion 192 of the sleeve has fully cleared the locking ball, allowing the locking ball to slide up in the first radial hole 130" sufficiently to not protrude into the longitudinal hole 120$^{IV}$. This allows the tool bit 300 to be fully removed from the longitudinal hole. The transition ball 194 is seated in the first position in the transition hole 195, blocking any further movement of the sleeve 186" in the direction towards the tool bit insertion hole. As soon as the tool bit has left the longitudinal hole, the locking ball can enter the longitudinal hole, as described for earlier embodiments, and thus release the sleeve 186" for sliding towards the tool mount 10$^{IV}$, but the sleeve is prevented from sliding by the frictional forces between the sleeve and the locking ring, as described above. Thus, when inserting a tool bit into the holder, these frictional forces will have to be overcome by the user pushing the tool bit into the holder with a sufficient force to release the sleeve.

FIGS. 42A to 44D show a preferred fourteenth embodiment of a tool holder 100" according to the invention. The tool holder is similar to the tool holder according to the twelfth embodiment, but incorporates an elongate connector means 114", for accommodating double ended tools, i.e. tools having working tool tips at both ends (for instance a drill bit in combination with a screwdriving bit). The holder functions in an identical way to the holder described in conjunction with FIGS. 41A to 41G, except that the sleeve 184''' has a locking cavity 364', which cooperates with a locking ring 362' arranged in a locking ring groove 363' arranged on the elongate connector means to limit the stroke of the sliding movement of the sleeve along the elongate connector means 114", by either edge of the locking cavity contacting the sides of the locking ring to provide the blocking of the sleeve. Thus, the holder 100" comprises the elongate connector means 114" and the outer sleeve 184'''. The connector means is attachable to a power tool or hand tool (not shown) via a tool mount 10$^V$. The connector means 114" has a longitudinal hole 120$^V$, which has a cross-section corresponding to the cross-section of the mounting portion of the tool bit. The connector means includes a first radial hole 130''', which cooperates with a substantially spherical locking ball 170" movably arranged in the first radial hole, as has been described in connection with the first embodiment of the invention. The locking ball 170" cooperates with the circumferential groove 305 in the tool bit to lock the tool bit in place when the tool bit is fully inserted into the holder 100". The outer sleeve 184''' is arranged to reciprocally slide over the connector means 114" between two end positions, and has a stepped inside diameter, having a smaller diameter part 125' facing the handle and a larger diameter part 122' facing the tool bit. A middle diameter part 123' is arranged between the smaller and the larger diameter parts, having a diameter which is larger than the diameter of the small diameter part but smaller than the diameter of the large diameter part. The middle diameter part is arranged to house a sleeve biasing means 360'''. A bevelled transition 186" is arranged between the large and middle diameter parts. The bevelled transition functions similarly to the depressor described for earlier embodiments in cooperation with a transition ball 194', which will be described in detail later. The sleeve 184''' has a first end 210" facing a tool bit insertion hole (longitudinal hole) 120$^V$, and a second end 220" facing the tool mount 10$^V$, when the sleeve is mounted on the tool holder 100". The sleeve biasing means 360''', for example a coil spring, is arranged to bias the sleeve 184''' away from the handle. The transition ball 194' is arranged in a transition hole 197 in the connector means 114'. The transition hole is substantially radial. Thus, the transition ball 194, which has a diameter substantially corresponding to the diameter of the transition hole 195, is slidable between a first position at the bottom of the transition hole, to a second position protruding from the top of the transition hole. The bevelled transition 186" is pressed against the transition ball 194' by the sleeve biasing means 360'''. The longitudinal hole 120$^V$ has a large diameter portion 121' adjacent the tool bit insertion end.

Figure 42A:
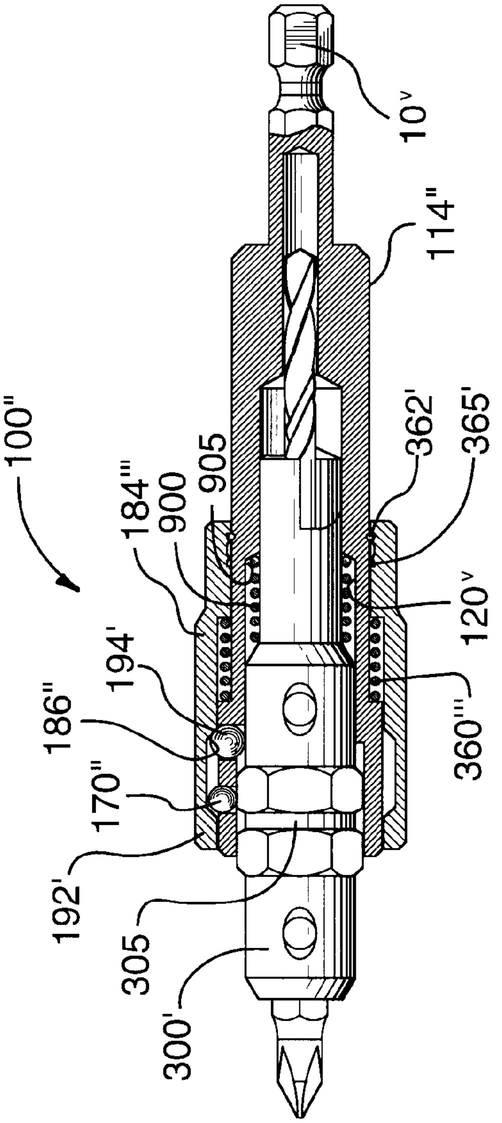
FIG. 42A is a sectional side view of a device according to a thirteenth embodiment of the invention, showing the device in a position where a tool bit is being inserted into the holder.
Figure 42B:
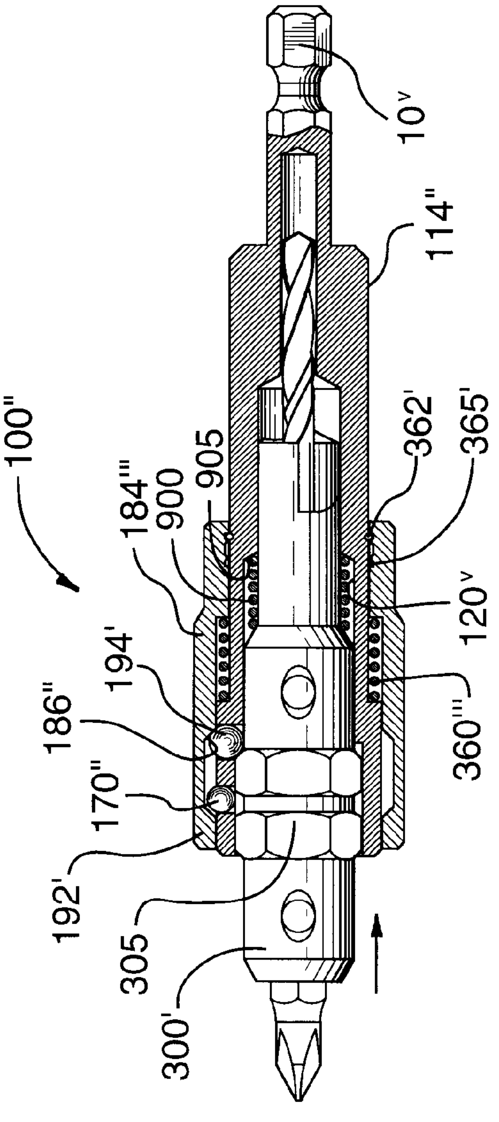
FIG. 42B is a sectional side view of the device according to FIG. 42A, showing the device when the tool bit is further pressed into the holder.
Figure 42C:
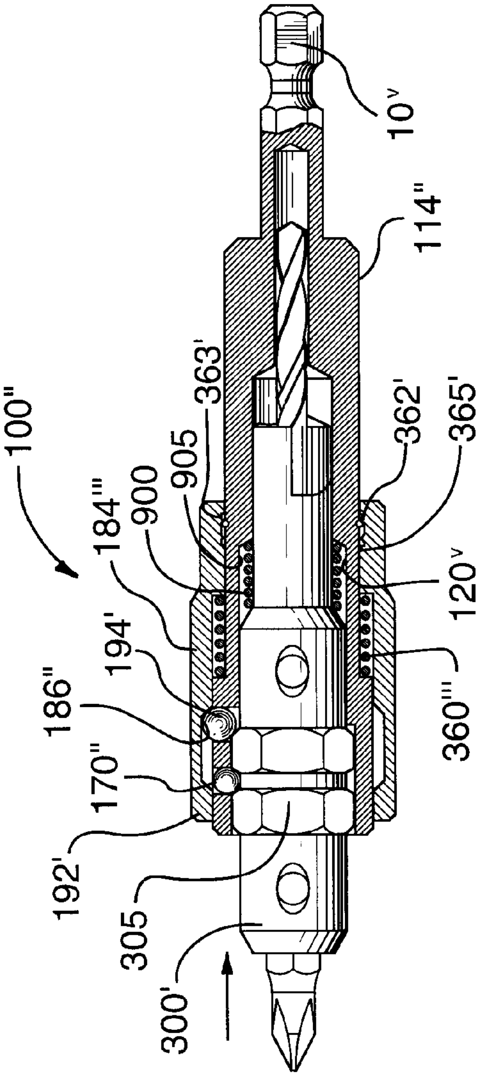
FIG. 42C is a sectional side view of the device according to FIG. 42A, showing the device when the tool bit is locked by the locking ball.
Figure 42D:
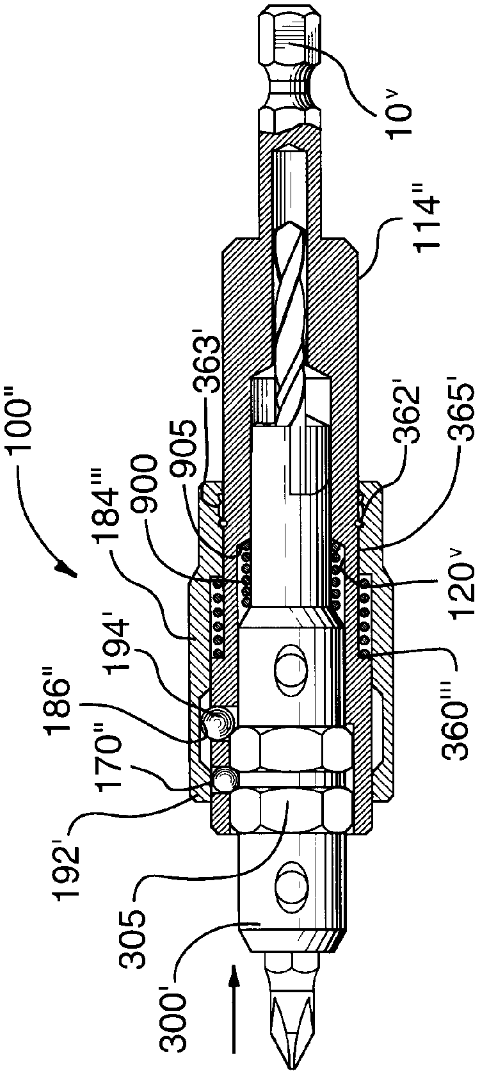
FIG. 42D is a sectional side view of the device according to FIG. 42A, showing the device when the sleeve is in its locking position, to block the movement of the locking ball.
Figure 43A:
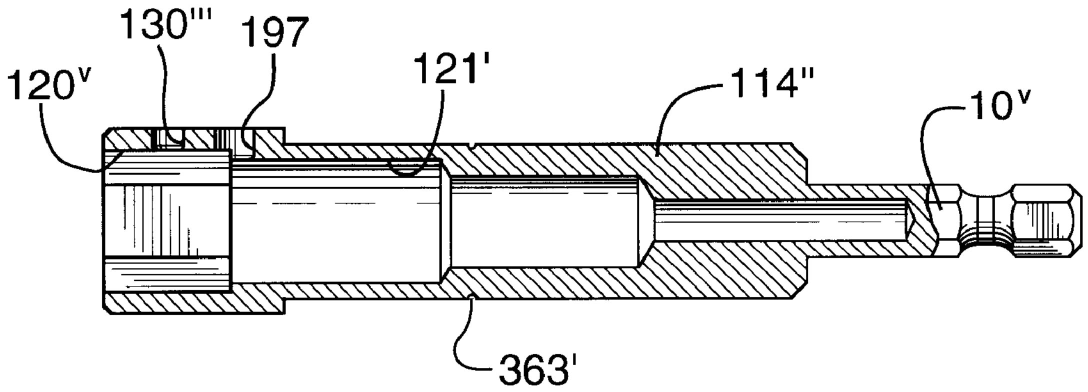
FIG. 43A is a sectional side view of the main body of the device according to FIG. 42A.
Figure 43B:
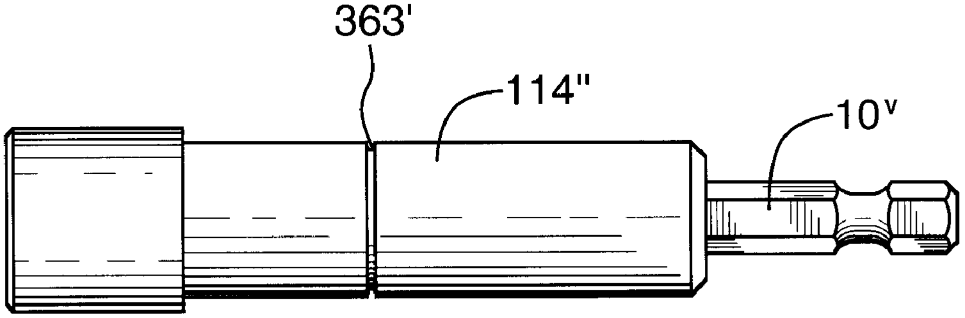
FIG. 43B is a side view of the main body of the device according to FIG. 43A.
Figure 43C:
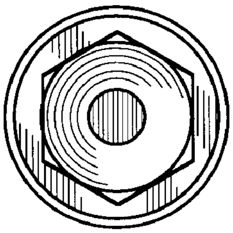
FIG. 43C is a front view from the tool bit insertion side of the main body of the device according to FIG. 43A.
Figure 43D:
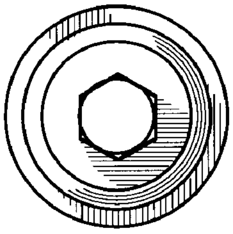
FIG. 43D is a rear view from the device mounting side of the main body of the device according to FIG. 43A.
Figure 44A:
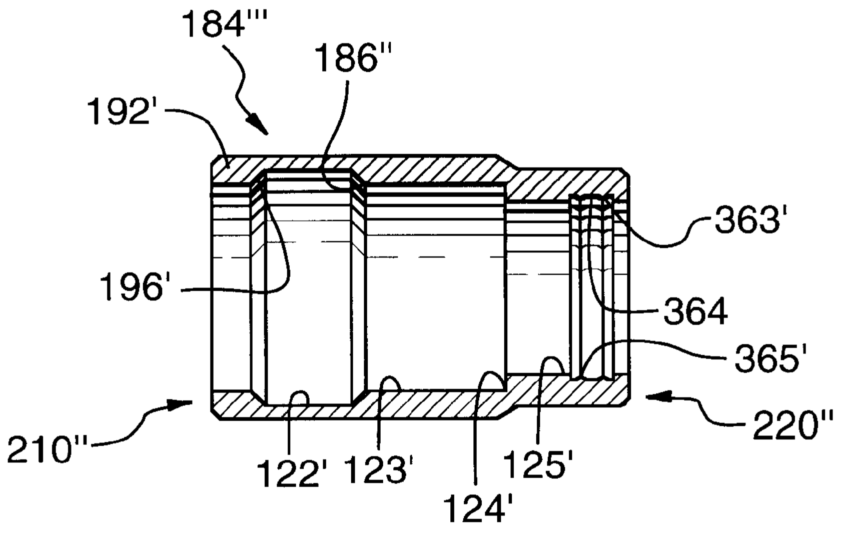
FIG. 44A is a sectional side view of the sleeve of the device according to FIG. 42A.
Figure 44B:
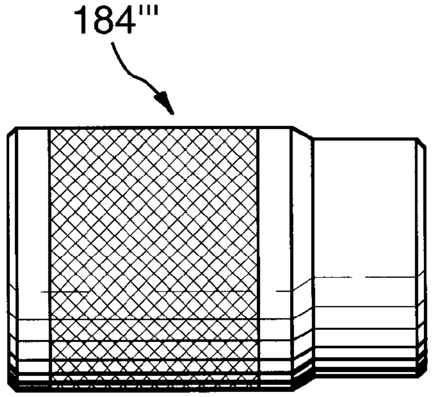
FIG. 44B is a side view of the sleeve of the device according to FIG. 44A.
Figure 44C:
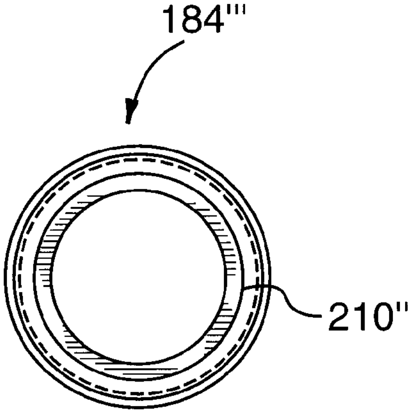
FIG. 44C is a front view from the tool bit insertion side of the sleeve of the device according to FIG. 44A.
Figure 44D:
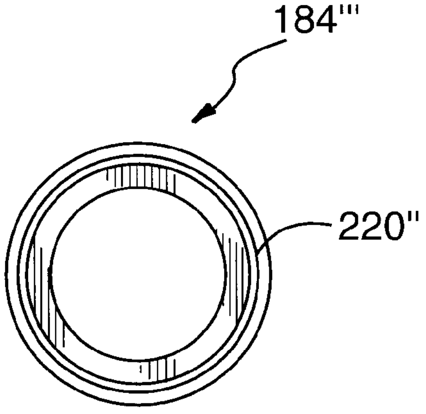
FIG. 44D is a rear view from the tool bit insertion side of the sleeve of the device according to FIG. 44A.
Figure 47A:
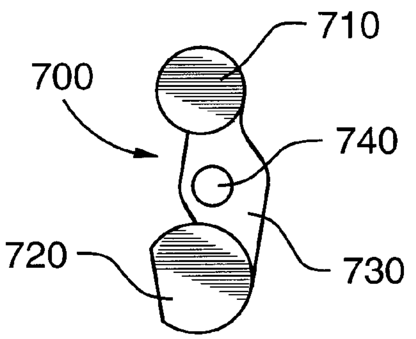
FIG. 47A is a side view of the rocking arm according to FIG. 45.
Figure 47B:
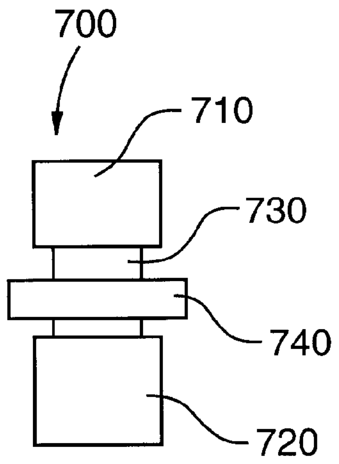
FIG. 47B is a bottom view of the rocking arm according to FIG. 45.

In FIG. 42D, a tool bit 300' is held in the longitudinal hole 120$^V$. The inserted end of the tool bit will push the transition ball 194' radially outwards in the transition hole 197. A locking portion 192' of the sleeve 184''' effectively blocks the locking ball 170" from movement in the first radial hole 130''', locking the tool bit 300' in the longitudinal hole 120$^V$.

FIG. 42C shows the situation when the sleeve 184''' is pressed towards the tool bit 300', starting to release the locking ball 170" by sliding the locking portion 192' of the sleeve forwards. The bevelled transition 186" will push the transition ball 194' towards the tool bit, to thereby start pushing the tool bit out of the longitudinal hole 120$^V$. As is shown in FIGS. 42C and 42B, the locking portion 192' of the sleeve has fully cleared the locking ball, allowing the locking ball to slide up in the first radial hole 130''' sufficiently to not protrude into the longitudinal hole 120$^V$. This allows the tool bit 300' to be fully removed from the longitudinal hole. The transition ball 194' is seated in the first position in the transition hole 195, blocking any further movement of the sleeve 186''' in the direction towards the tool bit insertion hole. As soon as the tool bit has left the longitudinal hole, the locking ball can enter the longitudinal hole, as described for earlier embodiments, and thus release the sleeve 186''' for sliding towards the tool mount 10$^V$ (not shown).

To insert the tool bit 300', it is inserted into the longitudinal hole 120$^V$ and pressed down until it is seated at the bottom of the longitudinal hole, simultaneously as the sleeve 184''' is pressed towards the tool bit side of the holder 100". The bottom portion of the tool bit will then first press the locking ball 170" up in the first radial hole 130'''. The sleeve is blocked from sliding towards the tool mount 10$^V$ by the transition ball pressing against the bevelled transition 186". The situation is identical to what is shown in FIG. 42A, but the tool bit is inserted instead of removed. By inserting the tool bit further, the groove of the tool bit will align with the locking ball 170", allowing the locking ball to slide into the groove, whereby the sleeve 184''' will be slid towards the tool mount 10$^V$ as described earlier. The locking portion 192' of the sleeve 184''' will block the locking ball and the tool bit is ready for use in the holder 100".

An alternative embodiment to the fourteenth embodiment is shown in FIGS. 48A to 51D. The locking ball is replaced in function with a substantially cylindrical locking bar 800, and the transition ball is replaced in function with a substantially cylindrical transition bar 810, having a flat side 820. The locking bar is arranged to slide in a radial first hole 830, in the same way as described earlier regarding the locking ball. The transition bar 810 is arranged to slide in a second hole 840, in the same way as described earlier regarding the transition ball. Thus, the functioning of the holder according to FIGS. 48A to 51D is identical to the fourteenth embodiment, described earlier. The flat side 820 of the transition bar 810 facilitates the proper orientation of the transition bar but is not essential to the functioning of the holder.

FIGS. 45 to 47E show a preferred fifteenth embodiment of a tool holder 100''' according to the invention. The tool holder is similar to the tool holder according to the fourteenth embodiment described earlier. The holder functions in an identical way to the holder described in conjunction with FIGS. 48A to 51D, except that a rocker arm 700, having a substantially cylindrical locking end 710, a substantially cylindrical transition end 720, a connecting bar 730, fixedly connecting the locking end and the transition end, and a pivot shaft 740 fixedly and perpendicularly arranged in the connecting bar, is pivotably arranged in a rocking arm hole 750 arranged in a connector means 114", pivoting on the pivot shaft, which is held by a first rocking arm hole extension 760 and a second rocking arm hole extension 761. Thus, the holder 100" comprises the elongate connector means 114" and an outer sleeve 184'''. The connector means is attachable to a power tool or hand tool (not shown) via a tool mount 10$^V$. The connector means 114" has a longitudinal hole 120$^V$, which has a cross-section corresponding to the cross-section of the mounting portion of the tool bit. The locking end 710 cooperates with the circumferential groove 305 in the tool bit to lock the tool bit in place when the tool bit is fully inserted into the holder 100'''. The outer sleeve 184''' is arranged to reciprocally slide over the connector means 114" between two end positions, and has a stepped inside diameter, having a smaller diameter part 125' facing the handle and a larger diameter part 122' facing the tool bit (for reference numerals of the sleeve see FIG. 44A). A middle diameter part 123' is arranged between the smaller and the larger diameter parts, having a diameter which is larger than the diameter of the small diameter part but smaller than the diameter of the large diameter part. The middle diameter part is arranged to house a sleeve biasing means 360'". A bevelled transition 186" is arranged between the large and middle diameter parts. The bevelled transition functions similarly to the depressor described for earlier embodiments in cooperation with the transition end 720, which will be described in detail later. The sleeve 184'" has a first end 210" facing the tool bit insertion hole (longitudinal hole) 120$^{V}$, and a second end 220" facing the tool mount 10$^{V}$, when the sleeve is mounted on the tool holder 100'". The sleeve biasing means 360'", for example a coil spring, is arranged to bias the sleeve 184'" away from the handle. The transition end 720 is pivotable between a first position at the bottom of the rocking arm hole 750, to a second position protruding from the top of the rocking arm hole. The bevelled transition 186" is pressed against the transition end 720 by the sleeve biasing means 360'".

Figure 45:
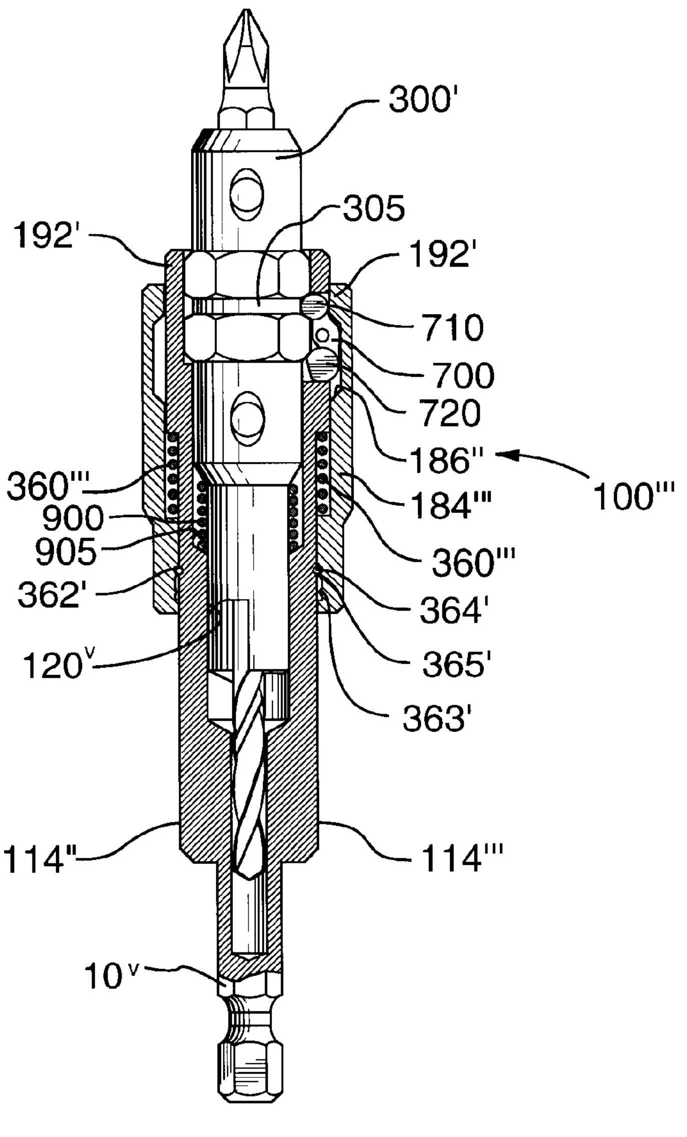
FIG. 45 is a partially sectioned side view of a device according to a fourteenth embodiment of the invention, showing a rocker arm type locking mechanism.

In FIG. 45, a tool bit 300' is held in the longitudinal hole 120$^{V}$. The inserted end of the tool bit will push the transition end 720 radially outwards in the rocker arm hole 750. A locking portion 192' of the sleeve 184'" effectively blocks the locking end 710 from movement in the rocking arm hole 750, locking the tool bit 300' in the longitudinal hole 120$^{V}$.

Figure 46A:
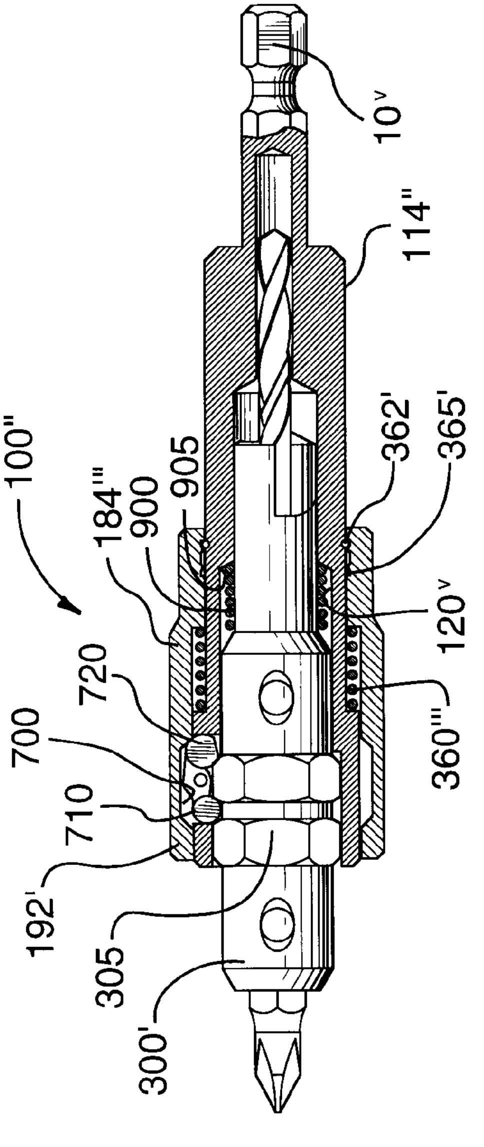
FIG. 46A is a partially sectioned side view of the device according to FIG. 45, showing the sleeve pressed towards the tool bit for release of the tool bit from the holder.
Figure 46B:
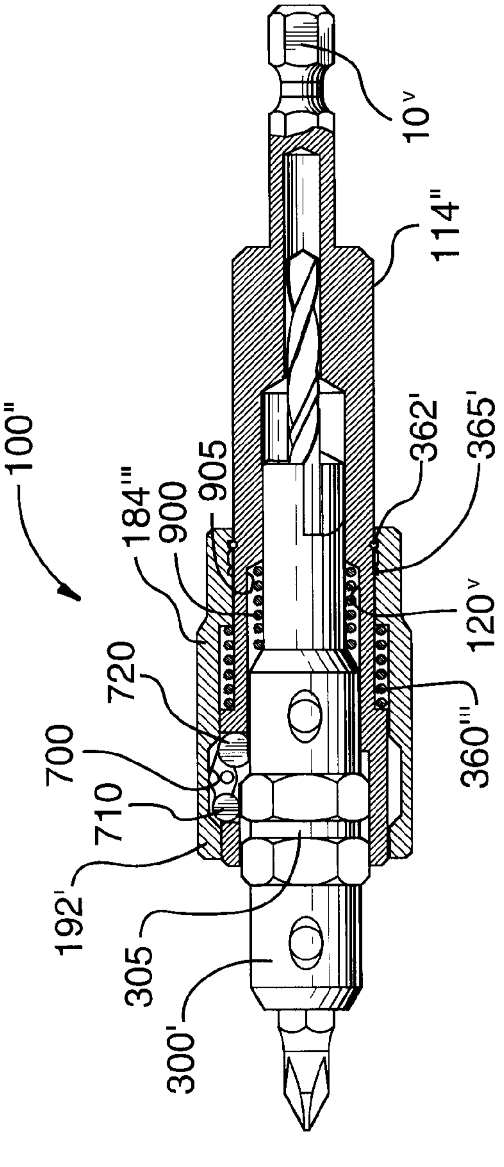
FIG. 46B is a partially sectioned side view of the device according to FIG. 45, showing the sleeve pressed towards the tool bit for release of the tool bit from the holder, and the tool bit being pulled out of the holder.
Figure 47C:
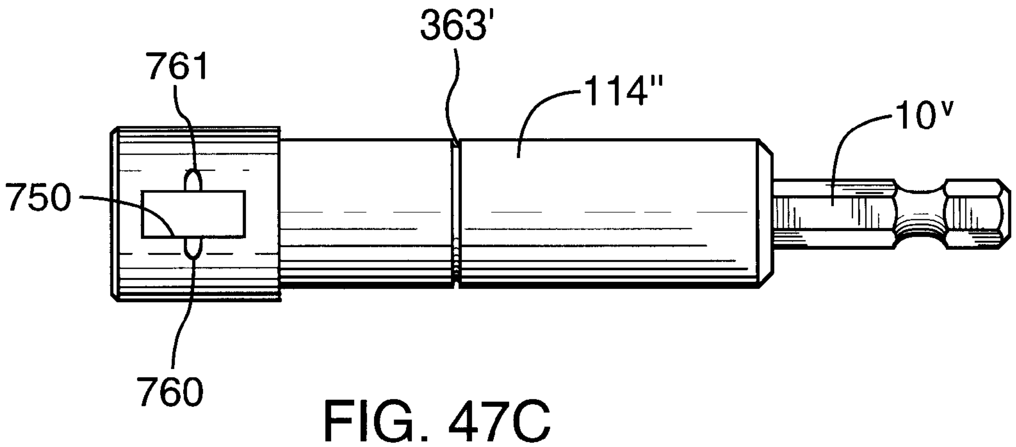
FIG. 47C is a side view of an elongate connector means according to FIG. 45.
Figure 47D:
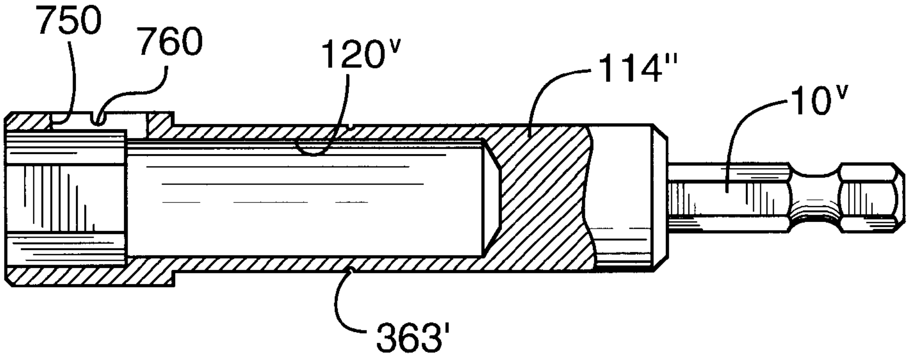
FIG. 47D is a partially sectioned side view of an elongate connector means according to FIG. 45.
Figure 47F:
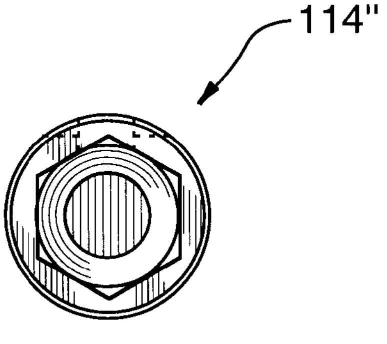
FIG. 47F is a top view of an elongate connector means according to FIG. 45.
Figure 47E:
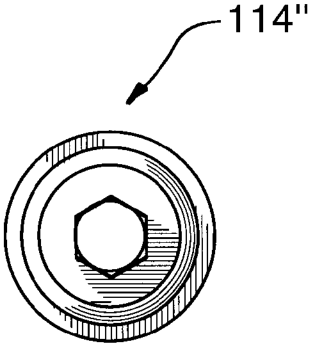
FIG. 47E is a bottom view of an elongate connector means according to FIG. 45.
Figure 48A:
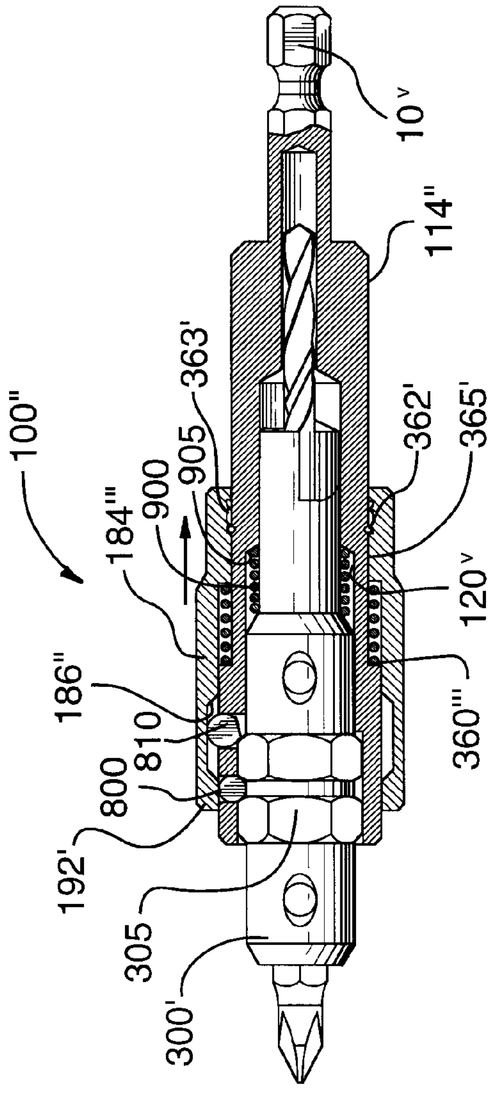
FIG. 48A is a partially sectioned side view of a device according to a fifteenth embodiment of the invention, showing a dual cylinder type locking mechanism.
Figure 48C:
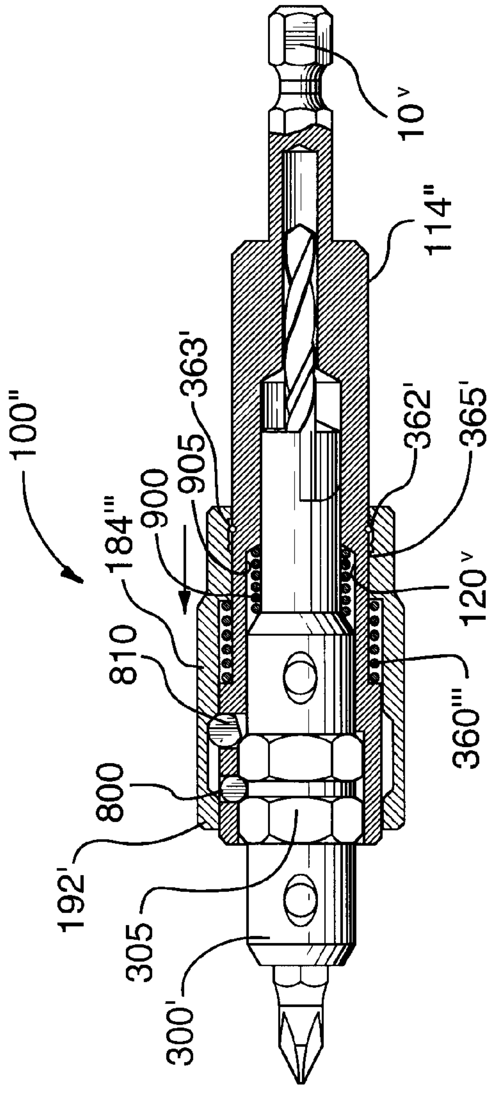
FIG. 48C is a partially sectioned side view of the device according to FIG. 48A, showing the sleeve pressed towards the tool bit for release of the tool bit from the holder, and the tool bit being pulled out of the holder.
Figure 48D:
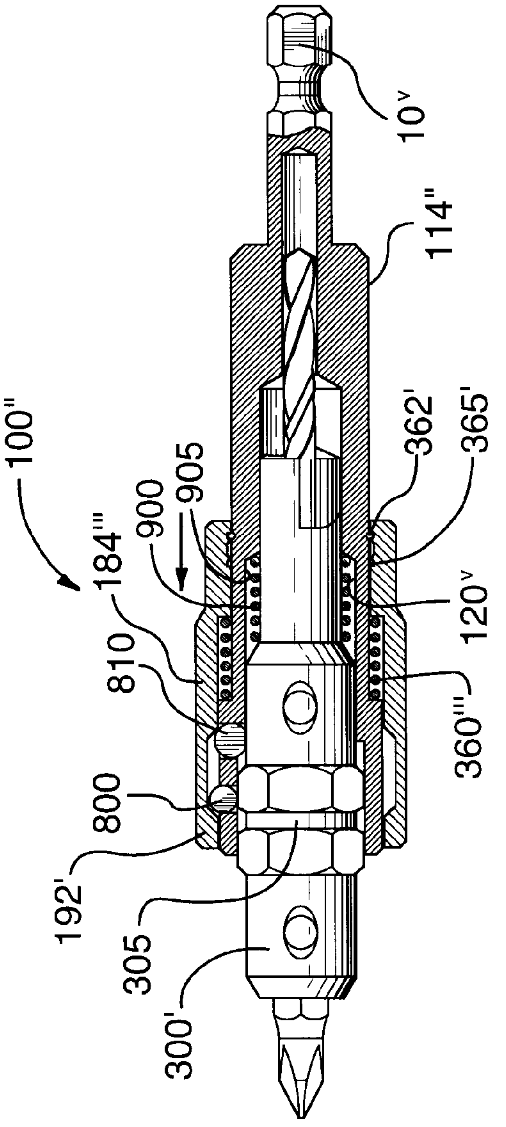
FIG. 48D is a partially sections side view of the device according to FIG. 48A, showing the sleeve pressed towards the tool but for release of the tool bit from the holder.
Figure 48B:
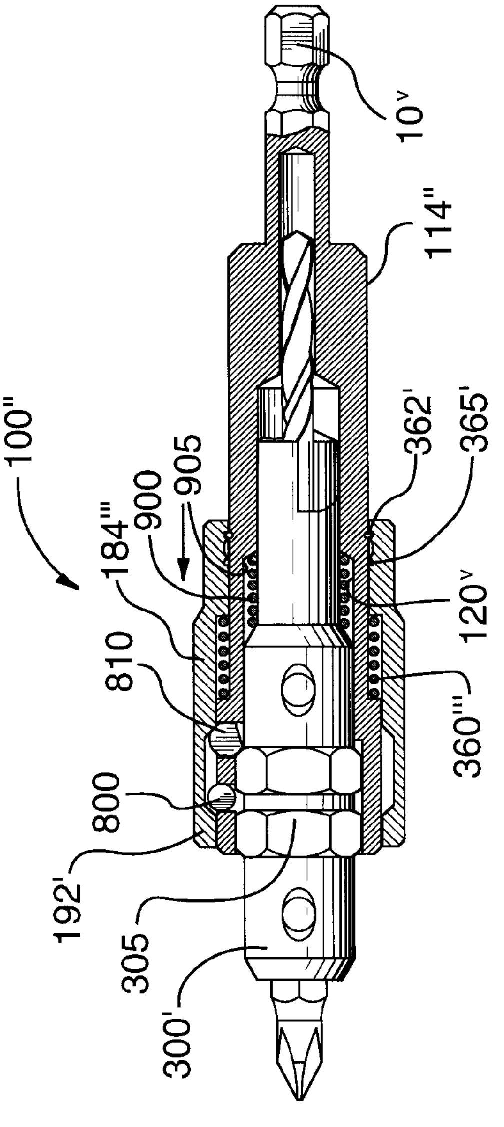
FIG. 48B is a partially sectioned side view of the device according to FIG. 48A, showing the sleeve pressed towards the tool bit for release of the tool bit from the holder.
Figure 49A:
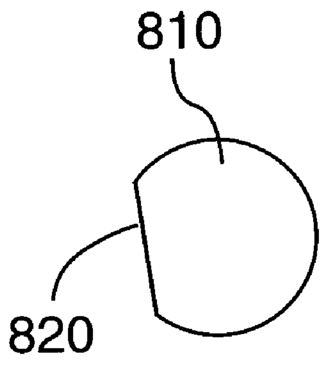
FIG. 49A is a side view of a transition cylinder according to FIG. 48A.
Figure 49B:
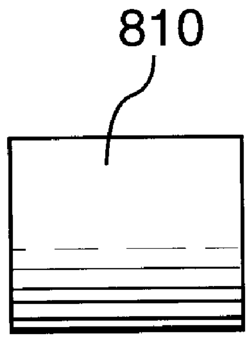
FIG. 49B is a bottom view of the transition cylinder according to FIG. 48A.
Figure 50A:
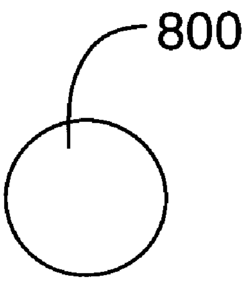
FIG. 50A is a side view of a locking cylinder according to FIG. 48A.
Figure 50B:
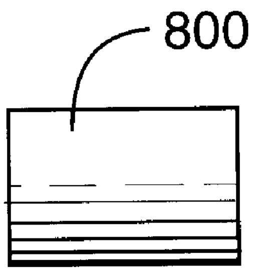
FIG. 50B is a bottom view of the locking cylinder according to FIG. 48A.

FIG. 46A shows the situation when the sleeve 184'" is pressed towards the tool bit 300', starting to release the locking end 710 by sliding the locking portion 192' of the sleeve forwards. The bevelled transition 186" will push the transition end 720 towards the tool bit, to thereby pivot the rocking arm simultaneously as it will start pushing the tool bit out of the longitudinal hole 120$^{V}$. As is shown in FIG. 46B, the locking portion 192' of the sleeve has fully cleared the locking end, allowing the locking end to pivot up in the rocker arm hole 750 sufficiently to not protrude into the longitudinal hole 120$^{V}$. This allows the tool bit 300' to be fully removed from the longitudinal hole. The transition end 720 is seated in the first position, blocking any further movement of the sleeve 186'" in the direction towards the tool bit insertion hole. As soon as the tool bit has left the longitudinal hole, the locking end can enter the longitudinal hole, as described for earlier embodiments, and thus release the sleeve 186'" for sliding towards the tool mount 10$^{V}$ (not shown).

To insert the tool bit 300', it is inserted into the longitudinal hole 120$^{V}$ and pressed down until it is seated at the bottom of the longitudinal hole, simultaneously as the sleeve 184'" is pressed towards the tool bit side of the holder 100'". The bottom portion of the tool bit will then first pivot the locking end 710 up in the rocker arm hole 750. The sleeve is blocked from sliding towards the tool mount 10$^{V}$ by the transition end pressing against the bevelled transition 186". By inserting the tool bit further, the groove of the tool bit will align with the locking end 710, allowing the locking end to pivot into the groove, whereby 204 the sleeve 184'" will be slid towards the tool mount 10$^{V}$ as described earlier. The locking portion 192' of the sleeve 184'" will block the locking end and the tool bit is ready for use in the holder 100'".

An alternative embodiment to the device shown in FIG. 45 (the fifteenth embodiment) is shown in FIGS. 60A to 62C. This embodiment is used for single-ended tool bits 300. A rocker arm 700", having a substantially cylindrical locking end 710', a substantially cylindrical transition end 720', a connecting bar 730', fixedly connecting the locking end and the transition end, and a pivot shaft 740' fixedly and perpendicularly arranged in the connecting bar, is pivotably arranged in a rocking arm hole 750' arranged in a connector means 114$^{VI}$, pivoting on the pivot shaft, which is held by a first rocking arm hole extension 760' and a second rocking arm hole extension (not shown, same as FIG. 47C). Thus, the holder 100$^{V}$ comprises the elongate connector means 114$^{VI}$ and an outer sleeve 184$^{VII}$. The connector means is attachable to a power tool or hand tool (not shown) via a tool mount 10$^{V}$. The connector means 114$^{VI}$ has a longitudinal hole 120$^{VIII}$, which has a cross-section corresponding to the cross-section of the mounting portion of the tool bit. The locking end 710' cooperates with the circumferential groove 330 in the tool bit to lock the tool bit in place when the tool bit is fully inserted into the holder 100$^{V}$. The outer sleeve 184$^{VII}$ is arranged to reciprocally slide over the connector means 114$^{VI}$ between two end positions, and has a slanted inside diameter, having a first slanted part 122" facing the tool mount and a second slanted part 122'" facing the tool bit. A larger diameter part 122$^{IV}$ is arranged to press a transition ridge (or cam) 721 of the rocker arm 700", when the sleeve is slid over the rocker arm. The constant pressure applied by the larger diameter part against the rocker arm transition ridge eliminates any play in the locking of the tool bit in the holder by the locking portion 710' of the rocking arm 700". Thus any unwanted tool bit movement in the holder is eliminated. The second slanted part 122'" can alternatively be shaped as a step (not shown). A sleeve biasing means 360'" is housed in a further larger diameter portion of the sleeve, for pressing the sleeve towards the tool bit insertion side of the holder. The transition end 720' is pivotable between a first position at the bottom of the rocking arm hole 750', to a second position protruding from the top of the rocking arm hole. Insertion of the tool bit, (FIGS. 60A to 60E) and removal of the tool bit (FIGS. 61A to 61E) is performed analogous to what is described above for the fifteenth embodiment.

Figure 52A:
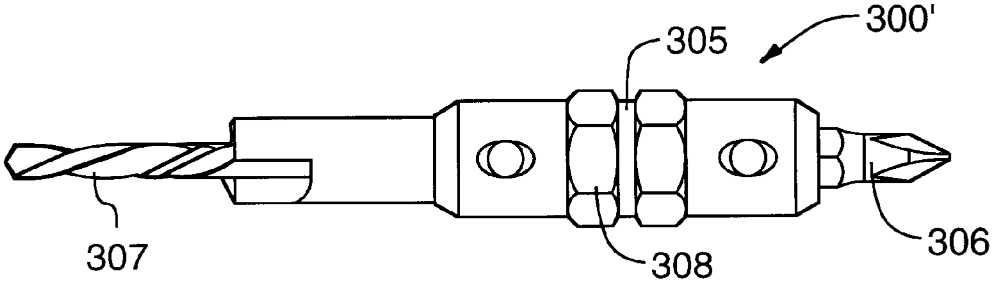
FIG. 52A is a side view of a first embodiment of a double-ended tool bit, having a drill bit at one end and a screwdriving bit at the other end, and having an annular groove retention means.
Figure 52B:
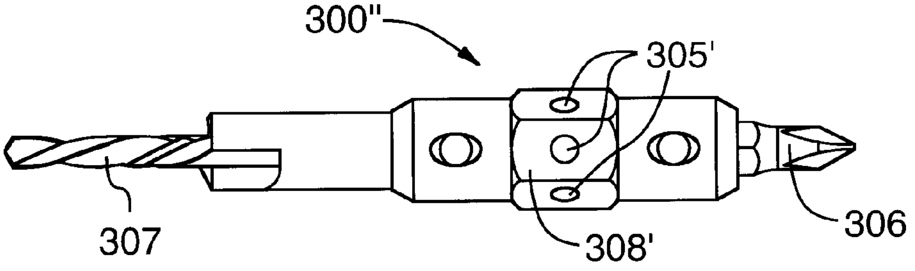
FIG. 52B is a side view of a second embodiment of a double-ended tool bit, having a drill bit at one end and a screwdriving bit at the other end, and having a plurality of circular detents retention means.
Figure 52C:
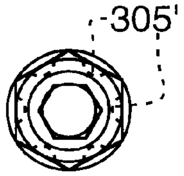
FIG. 52C is an end view of the tool bit of FIG. 52B.
Figure 52D:
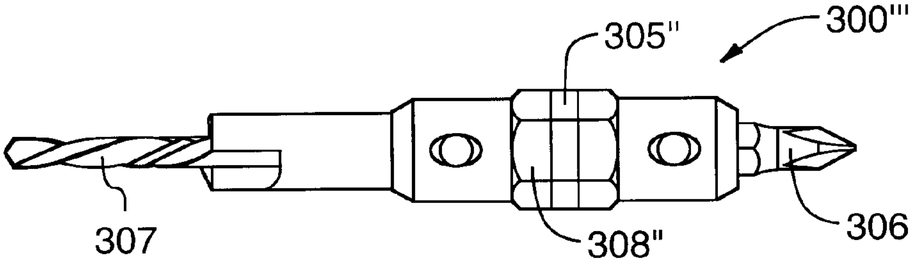
FIG. 52D is a side view of a third embodiment of a double-ended tool bit, having a drill bit at one end and a screwdriving bit at the other end and having a plurality of transversely running elongate recessed retention means.
Figure 52E:
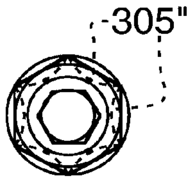
FIG. 52E is an end view of the tool bit of FIG. 52D.
Figure 52F:
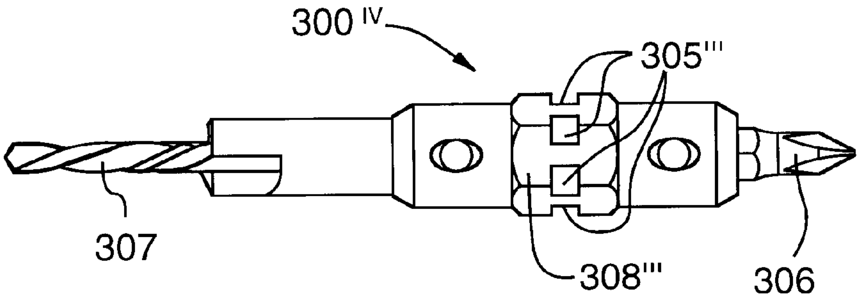
FIG. 52F is a side view of a fourth embodiment of a double-ended tool bit, having a drill bit at one end and a screwdriving bit at the other end, and having a plurality of slotted corner retention means.
Figure 52G:
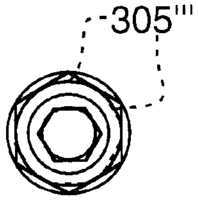
FIG. 52G is an end view of the tool bit of FIG. 52F.
Figure 53A:
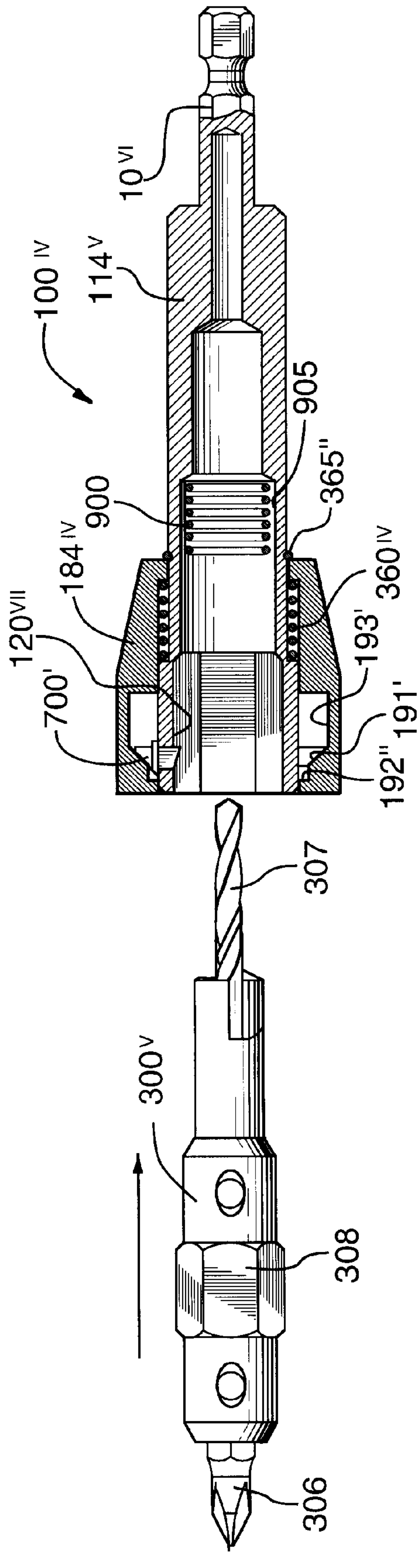
FIG. 53A is a partially sectioned side view of a device according to a sixteenth embodiment according to the invention, showing a pin type locking mechanism, with the double-ended tool bit in a position to be inserted into the holder.
Figure 53B:
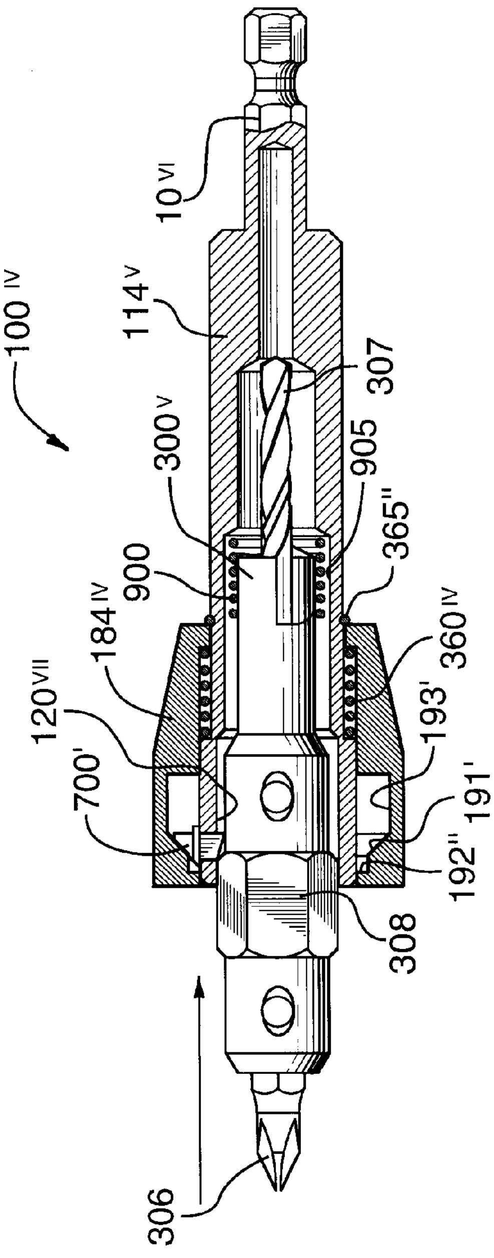
FIG. 53B is a partially sectioned side view of the device of FIG. 53A, showing the double-ended tool bit in a position inserted into the holder up until the collar of the tool bit contacts the locking pin.
Figure 53C:
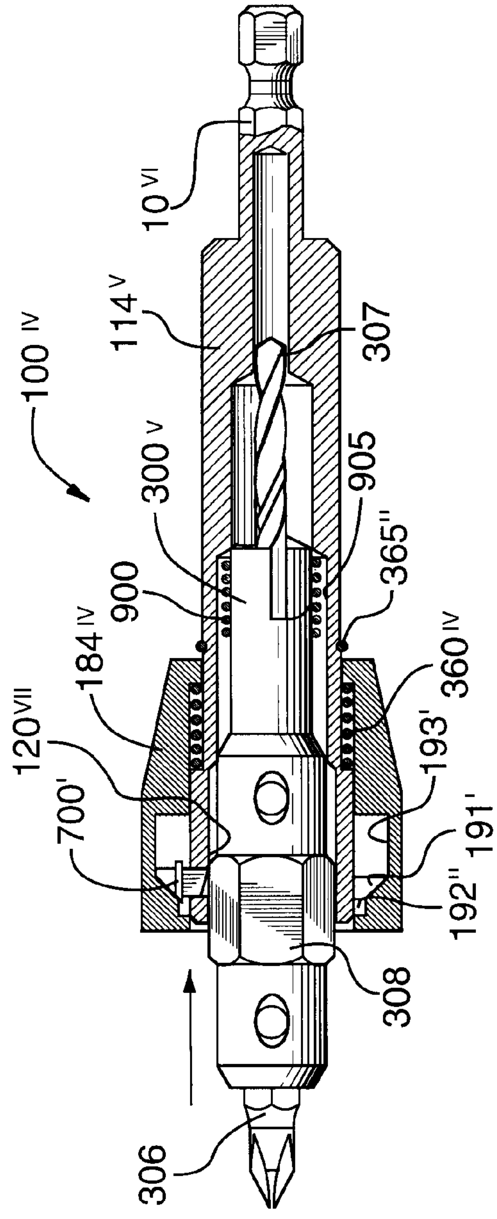
FIG. 53C is a partially sectioned side view of the device of FIG. 53A, showing the double-ended tool bit in a position inserted into the holder so that the locking pin slides on top of the collar of the tool.
Figure 53D:
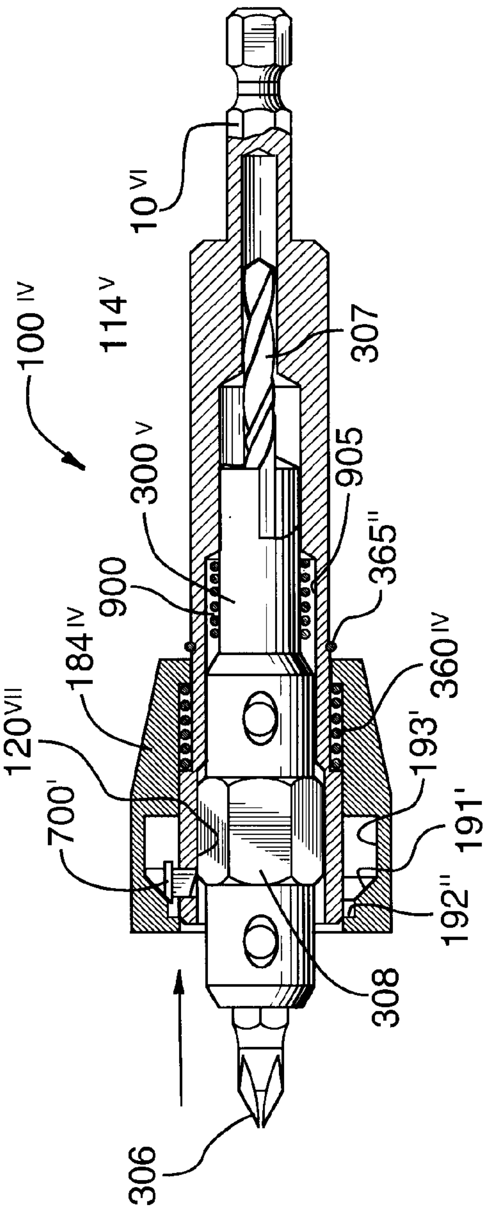
FIG. 53D is a partially sectioned side view of the device of FIG. 53A, showing the double-ended tool bit in a position inserted into the holder and the locking pin is in a position to almost slide off the outer end of the collar of the tool bit.

FIGS. 52A to 52G show different embodiments of double-ended tool bits, which are suitable for use with a holder according to the invention. FIG. 52A shows a double-ended tool holder 300' as earlier described, having a first tool 306 at one end, for example a screwdriving bit, a second tool 307 at the opposite end, for example a drill bit, and a waist portion 308 with a circumferential groove 305. The locking ball/locking end described for different embodiments of the invention, advantageously cooperates with the groove 305 to hold the tool bit 300' in the holder. Alternatively, the locking ball/locking end can cooperate with either end of the waist portion 308, to securely hold the tool bit in place. FIG. 52B shows a further embodiment of a double-ended tool holder 300", having a first tool 306 at one end, for example a screwdriving bit, a second tool 307 at the opposite end, for example a drill bit, and a waist portion 308' with a plurality of circumferentially arranged circular depressions 305'. The locking ball/locking end described for different embodiments of the invention, advantageously cooperates with the circular depressions 305' to hold the tool bit 300" in the holder. Alternatively, the locking ball/locking end can cooperate with either end of the waist portion 308', to securely hold the tool bit in place, as described earlier. FIG. 53C shows a still further embodiment of a double-ended tool holder 300'", having a first tool 306 at one end, for example a screwdriving bit, a second tool 307 at the opposite end, for example a drill bit, and a waist portion 308" with a plurality of circumferentially arranged concave and elongate first cutouts 305". The locking ball/locking end described for different embodiments of the invention, advantageously cooperates with the first cutouts 305" to hold the tool bit 300" in the holder. Alternatively, the locking ball/locking end can cooperate with either end of the waist portion 308", to securely hold the tool bit in place, as described earlier. FIG. 53D, finally, shows yet a further embodiment of a double-ended tool holder 300$^{IV}$, having a first tool 306 at one end, for example a screwdriving bit, a second tool 307 at the opposite end, for example a drill bit, and a waist portion 308'" with a plurality of circumferentially arranged second cutouts 305'". The second cutouts are arranged at the corners of the hex cross-section waist portion. The locking ball/locking end described for different embodiments of the invention, advantageously cooperates with the second cutouts 305'" to hold the tool bit 300'" in the holder. Alternatively, the locking ball/locking end can cooperate with either end of the waist portion 308'", to securely hold the tool bit in place, as described earlier.

A sixteenth and preferred embodiment of the invention is shown in FIGS. 53A to 58B. The holder functions in an identical way to the holder described in conjunction with FIGS. 48A to 51D, except that a locking pin 700', having a first end 701 with a first slanted surface 703, a second end 702 with a second slanted surface 705, a protruding stop 704 arranged substantially around a middle portion of the locking pin, is slidably arranged in a first radial hole 830' arranged in a connector means 114$^{V}$. Advantageously, the locking pin 700' is biased away from the longitudinal hole 120$^{V}$ by a resilient spring washer (see FIGS. 58A and 58B), having a central cutout 707 corresponding to the cross-section of the locking pin, and a generally curved shape. Thus, the holder 100$^{IV}$ comprises the elongate connector means 114$^{V}$ and an outer sleeve 184$^{IV}$. The connector means is attachable to a power tool or hand tool (not shown) via a tool mount 10$^{VI}$. The connector means 114$^{V}$ has a longitudinal hole 120$^{VI}$, which has a cross-section corresponding to the cross-section of the mounting portion of the tool bit, and a larger diameter portion 120$^{VII}$, corresponding to a waist portion 308 of the tool bit (as defined earlier). The second end 702 of the locking pin 700' cooperates with the waist portion 308 of the tool bit to lock the tool bit in place when the tool bit is fully inserted into the holder 100$^{IV}$. The outer sleeve 184$^{IV}$ is arranged to reciprocally slide over the connector means 114$^{V}$ between two end positions, and has a stepped inside diameter, having a smaller diameter part 192' facing the tool bit insertion side and a larger diameter part 193' facing the tool mount 10$^{IV}$. A bevelled part 191' is arranged between the smaller and the larger diameter parts. The bevelled part is arranged to cooperate with the first end 701 of the locking pin 700' as the locking pin slides up or down. A sleeve biasing means 360$^{IV}$ is arranged to press the sleeve towards the tool mount 10$^{V}$. The bevelled part 191' is pressed against the locking pin 700' by the sleeve biasing means 360$^{IV}$.

Figure 53E:
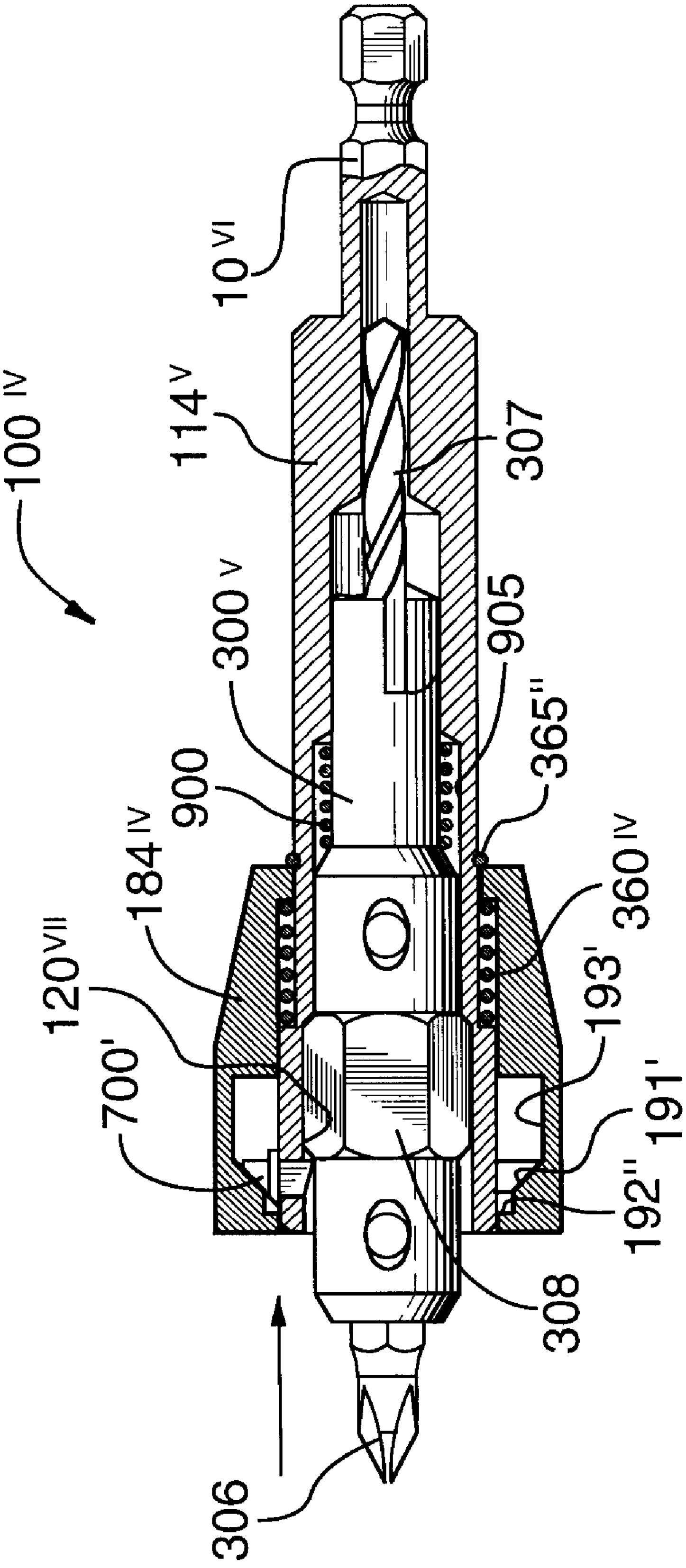
FIG. 53E is a partially sectioned side view of the device of FIG. 53A, showing the double-ended tool bit in a position inserted fully into the holder up until the collar of the tool bit is locked by the locking pin.

To insert the tool bit 300$^{V}$, see FIGS. 53A to 53E, the tool bit is inserted into the longitudinal hole 120$^{VI}$ and pressed down until it is seated at the bottom of the longitudinal hole, simultaneously as the sleeve 184$^{IV}$ is pressed towards the tool bit side of the holder 100$^{IV}$. The second slanted surface 705 of the second end 702 of the locking pin 700' will first contact the tool bit, see FIG. 53B, whereby the locking pin 700' is pressed up in the first radial hole 830', causing the sleeve to be pressed towards the tool bit. By inserting the tool bit further, see FIGS. 53C and 53D, the locking pin 700' will slide over the waist portion 308 of the tool bit. As is shown in FIG. 53E, the locking pin 700' eventually contacts one end of the waist portion 308, whereby the tool bit is securely held in the holder 100$^{IV}$. The sleeve 184$^{IV}$ is slid towards the stop ring 365", arranged in an annular recess 363' of the connecting means 114$^{V}$, because the locking pin 700' is allowed to enter the first radial hole 830' slightly and thus does not block the movement of the sleeve in its biased direction.

Figure 54A:
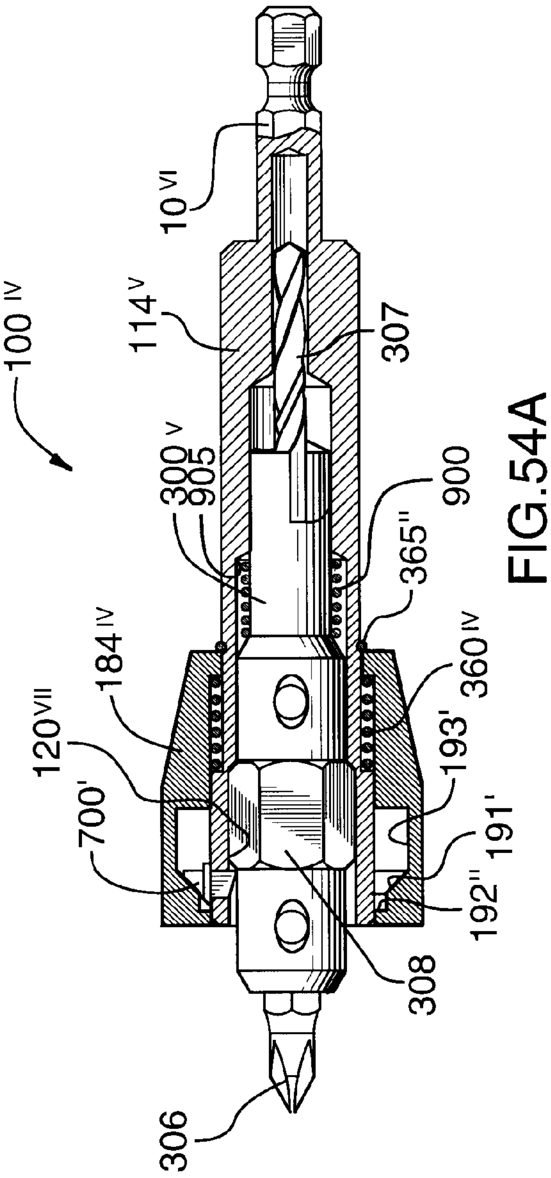
FIG. 54A is a partially sectioned side view of the device of FIG. 53A, showing the double-ended tool bit fully inserted in to the holder.
Figure 54B:
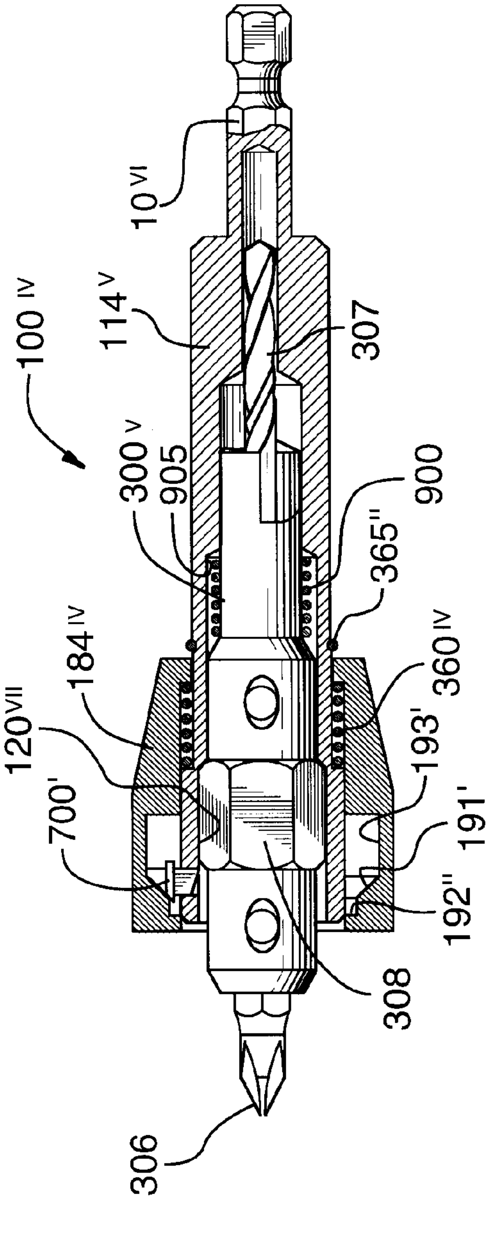
FIG. 54B is a partially sectioned side view of the device of FIG. 53A, showing the sleeve pushed forwards to unlock the locking pin and the double-ended tool bit in a position where the locking pin can begin travelling over the collar of the tool bit.
Figure 54C:
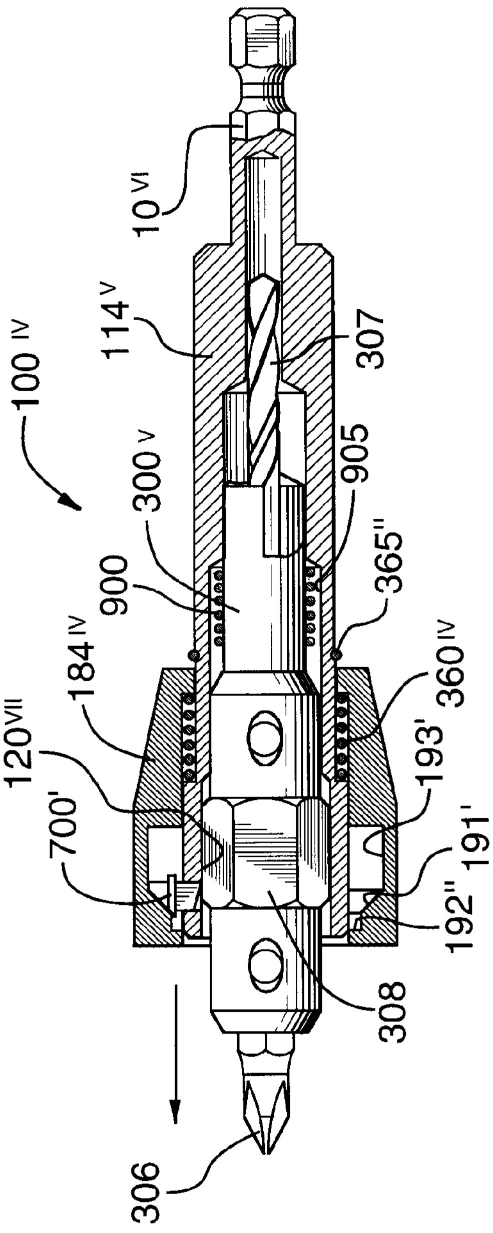
FIG. 54C is a partially sectioned side view of the device of FIG. 53A, showing the locking pin sliding on top of the collar of the tool.
Figure 54D:
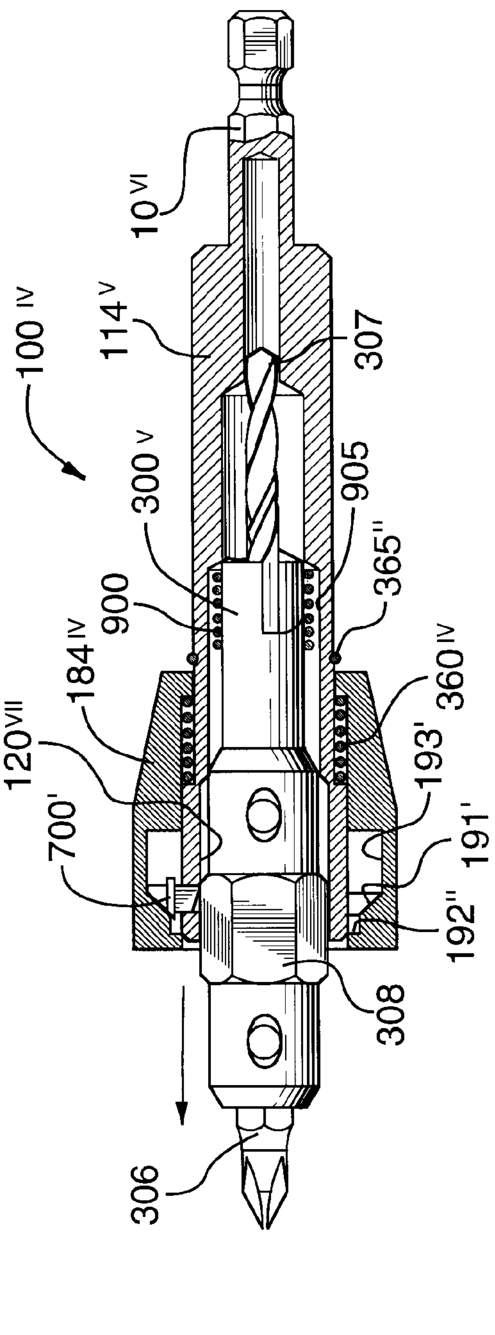
FIG. 54D is a partially sectioned side view of the device of FIG. 53A, showing the locking pin in a position to almost slide off the inner end of the collar of the tool bit.
Figure 54E:
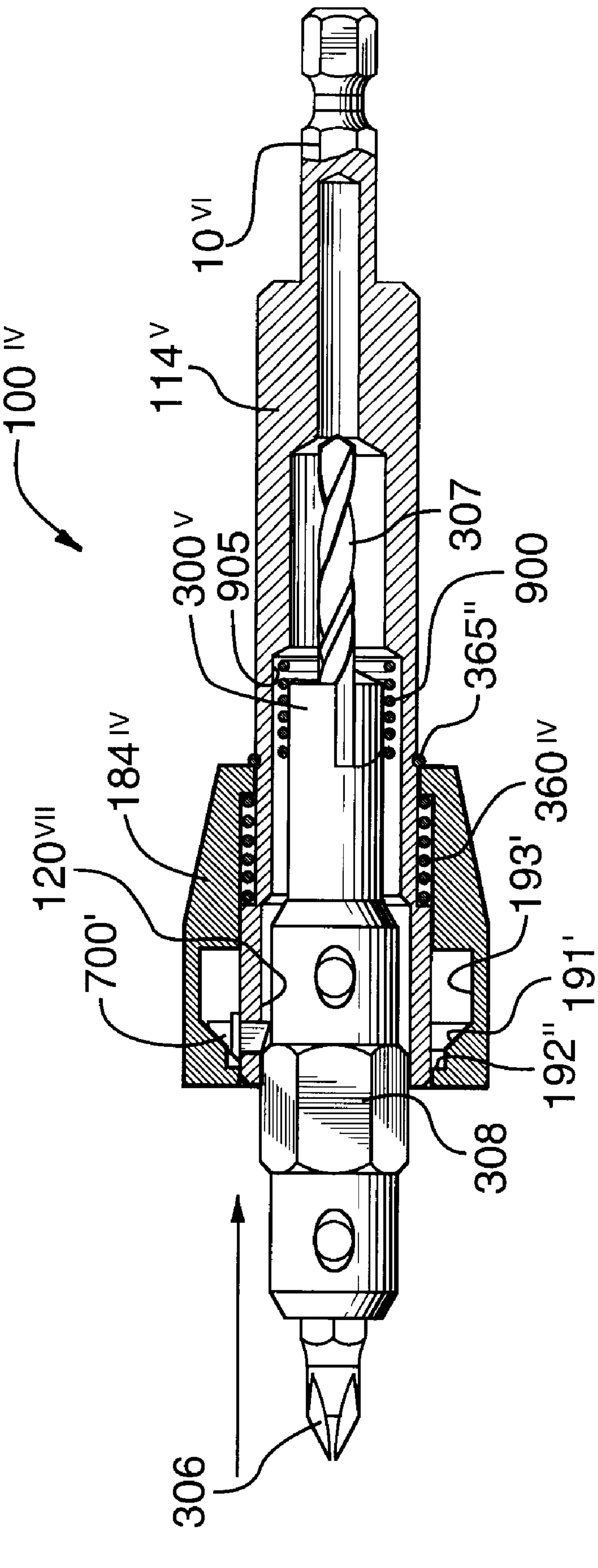
FIG. 54E is a partially sectioned side view of the device of FIG. 53A, showing the double-ended tool bit in a position where the locking pin has fully released the tool bit and the tool bit is ready to be removed from the holder.
Figure 55A:
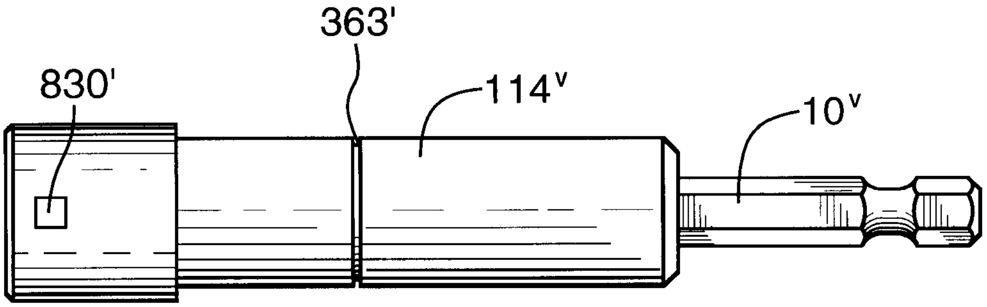
FIG. 55A is a side view of an elongate connector means according to FIG. 53A.
Figure 55B:
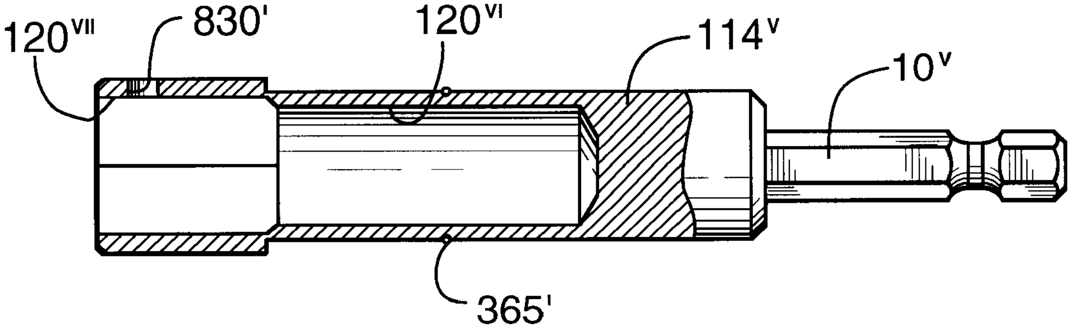
FIG. 55B is a partially sectioned side view of an elongate connector means according to FIG. 53A.
Figure 55C:
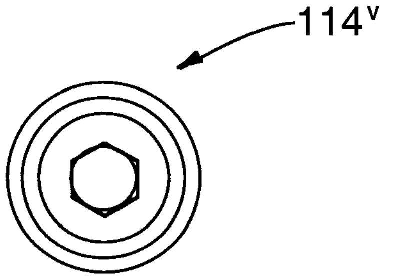
FIG. 55C is a bottom view of an elongate connector means according to FIG. 53A.
Figure 55D:
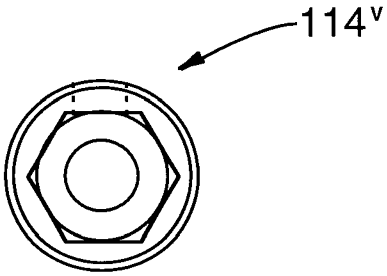
FIG. 55D is a top view of an elongate connector means according to FIG. 53A.
Figure 56A:
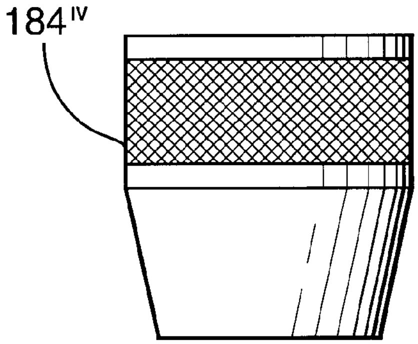
FIG. 56A is a side view of an outer sleeve according to FIG. 53A.
Figure 56B:
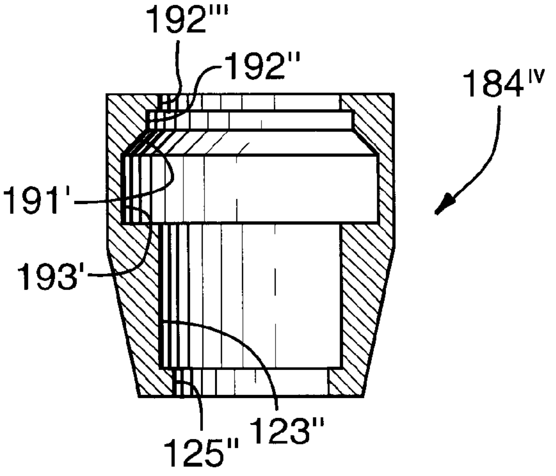
FIG. 56B is a partially sectioned side view of the sleeve according to FIG. 53A.
Figure 56C:
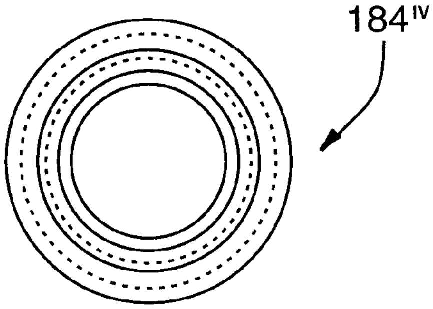
FIG. 56C is a top view of the sleeve according to FIG. 53A.
Figure 57A:
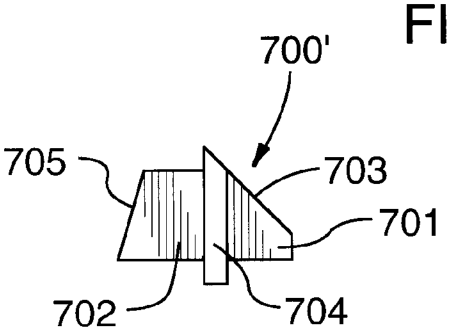
FIG. 57A is a side view of a locking pin according to FIG. 53A.
Figure 57B:
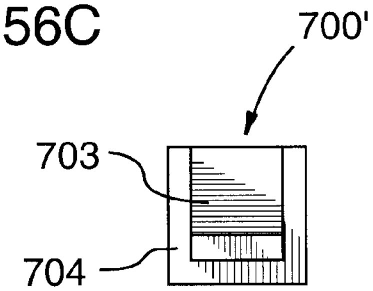
FIG. 57B is a top view of the locking pin according to FIG. 53A.
Figure 58A:
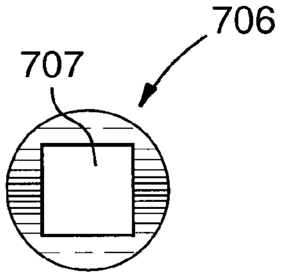
FIG. 58A is a top view of a locking pin spring washer according to FIG. 53A.
Figure 58B:
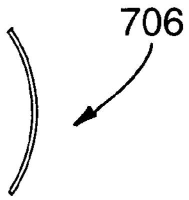
FIG. 58B is a side view of a locking pin spring washer according to FIG. 53A.

In FIG. 54A, the tool bit 300$^{V}$ is held in the longitudinal hole 120$^{VI}$ of the holder. If the sleeve 184$^{IV}$ is pressed towards the tool bit 300$^{V}$, the locking pin 700' is no longer pressed towards the longitudinal hole, and is instead pressed in the opposite direction by the spring washer 706. The tool bit 300$^{V}$ can thus be fully removed from the longitudinal hole.

For all embodiments shown in FIGS. 41A to 58B, a tool bit ejection means 900 is shown, arranged in the longitudinal hole to abut a step 905 of the longitudinal hole. The ejection means is preferably a screw spring, but any suitable biasing means may be employed. The action of the ejection means 900 biases the tool bit away from the holder, so that when the tool bit is released from the holder, the tool bit is ejected automatically from the holder. The user only has to release the tool bit with one hand and hold the hand or power tool with the other hand, thus facilitating the release of the tool bit. The arrangement with an ejection spring is applicable to all embodiments of the invention, although it is not shown in all FIGS.

Figure 51A:
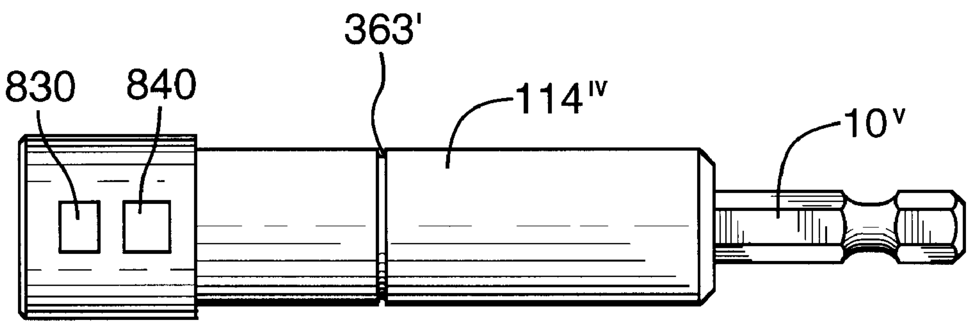
FIG. 51A is a side view of an elongate connector means according to FIG. 48A.
Figure 51B:
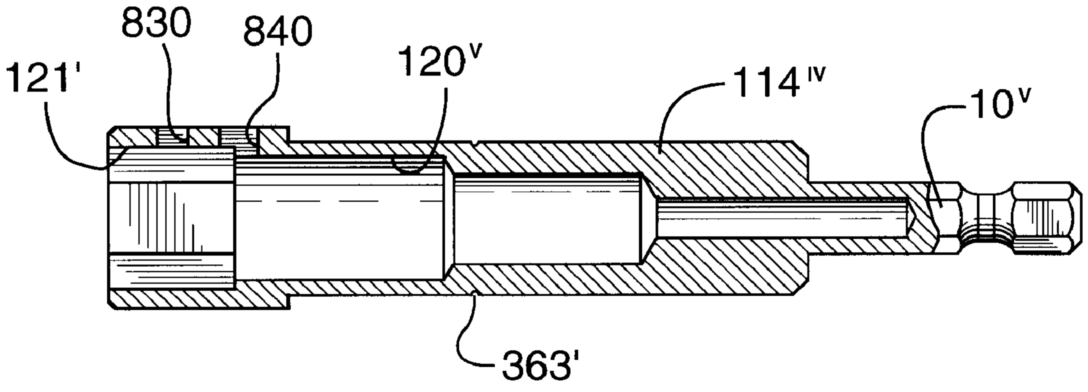
FIG. 51B is a partially sectioned side view of an elongate connector means according to FIG. 48A.
Figure 51C:
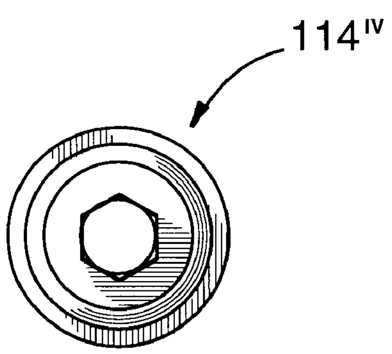
FIG. 51C is a bottom view of an elongate connector means according to FIG. 48A.
Figure 51D:
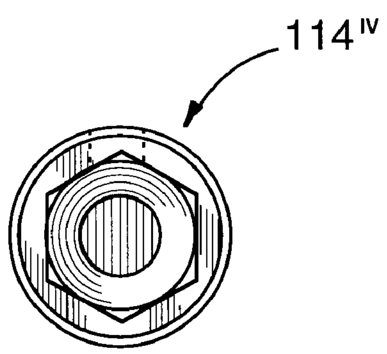
FIG. 51D is a top view of an elongate connector means according to FIG. 48A.
Figure 63C:
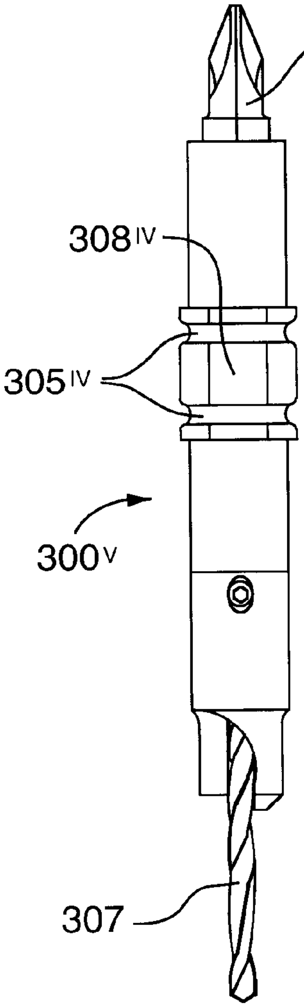
FIG. 63C is a side view of a sixth embodiment of double-ended tool bit suitable for use with a device according to FIG. 63A.
Figure 63A:
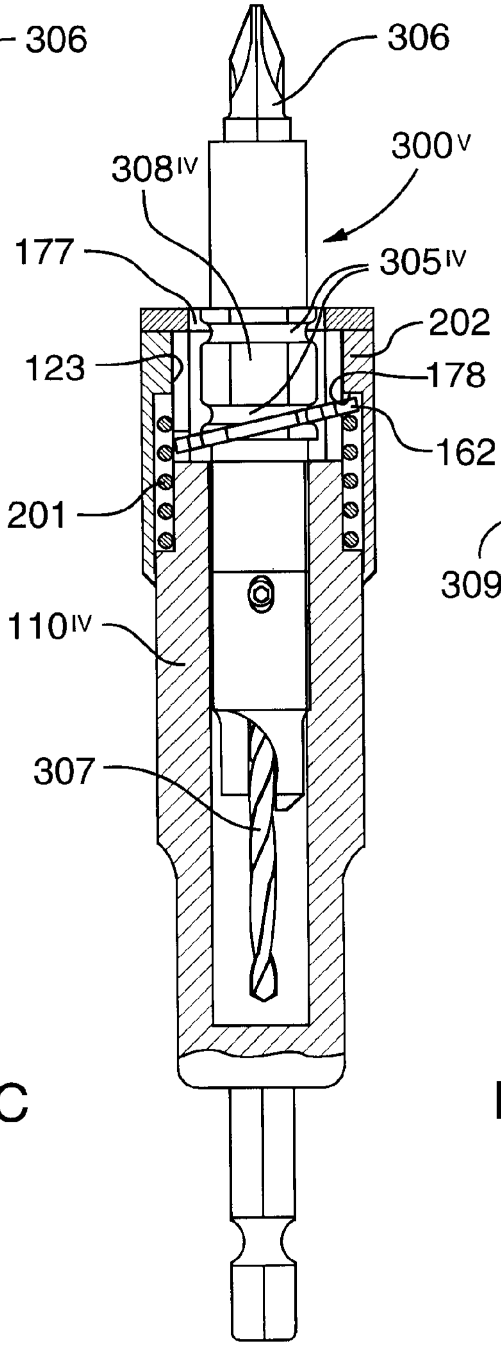
FIG. 63A is a partially sectioned side view of a seventeenth embodiment of a device according to the invention.
Figure 63B:
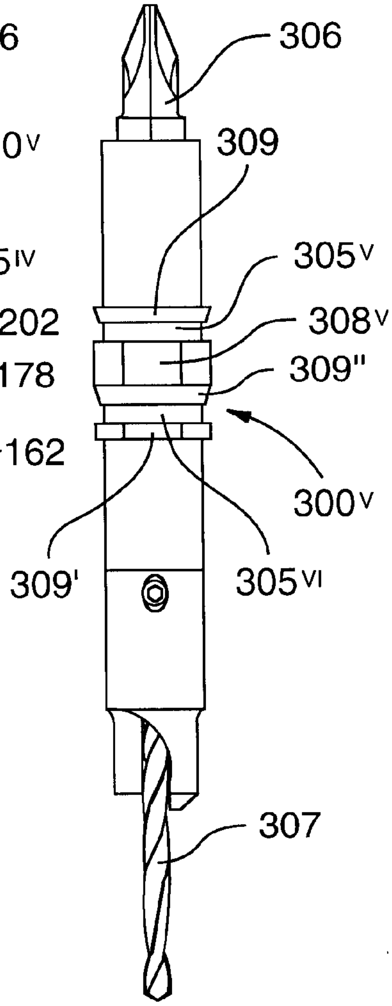
FIG. 63B is a side view of a fifth embodiment of double-ended tool bit suitable for use with a device according to FIG. 63A.

FIG. 63A shows a seventeenth embodiment of the invention, which is a further variation of the variation of the seventh embodiment of the invention is shown in FIG. 59. The central washer hole, the profiled entry hole of the sleeve and the longitudinal hole of the connector means all have to be dimensioned to accommodate the larger double-ended tool bit 308$^{IV}$. All applicable reference numerals are the same for FIG. 63A as for FIG. 29, except for the elongate connector means 110$^{IV}$. The double-ended tool bit 308$^{IV}$ is also shown in FIG. 63C. The same reference numerals have been used as for FIG. 52A to denote identical technical features. A waist portion 308$^{IV}$ has a pair of circumferential grooves 305$^{IV}$, for cooperation with the long radial protrusion 162 of the washer. A further embodiment of a double ended tool bit 300$^{V}$ is shown in FIG. 51B. All identical features have the same reference numerals as used for FIG. 51C. The waist portion 308$^{V}$ has a first circumferential groove 305$^{V}$ and a second circumferential groove 305$^{VI}$. The first circumferential groove has a conical flange portion 309 facing the screwdriving bit, for enhanced gripping of the double-ended tool bit when the drill bit portion 307 is facing outwards from the holder. The second circumferential groove preferably has a normal flange portion 309', as also shown for the previous embodiments of the double-ended tool bits. To enhance the cooperation with the washer, the second circumferential groove preferably has a sloping end facing the waist portion 308$^{V}$.

Figure 64A:
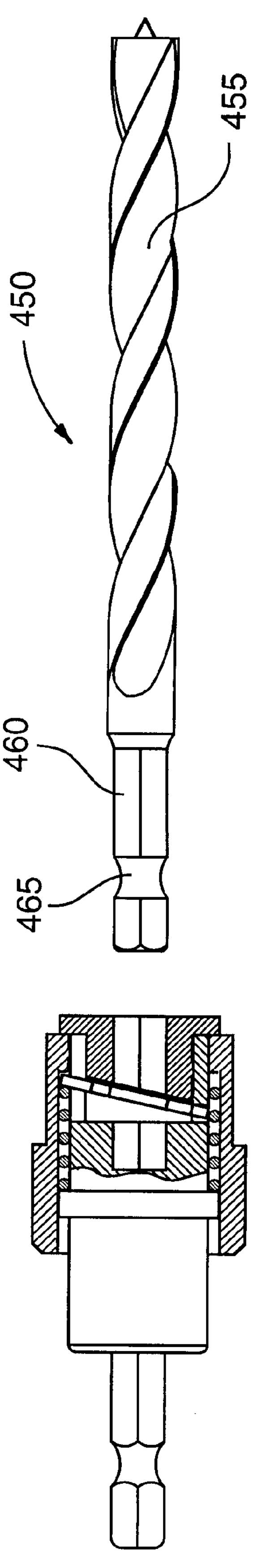
FIG. 64A is a partially sectioned side view of the device according to the seventh embodiment of the invention as shown in FIG. 29, when used with a first embodiment of a drill bit.
Figure 64B:
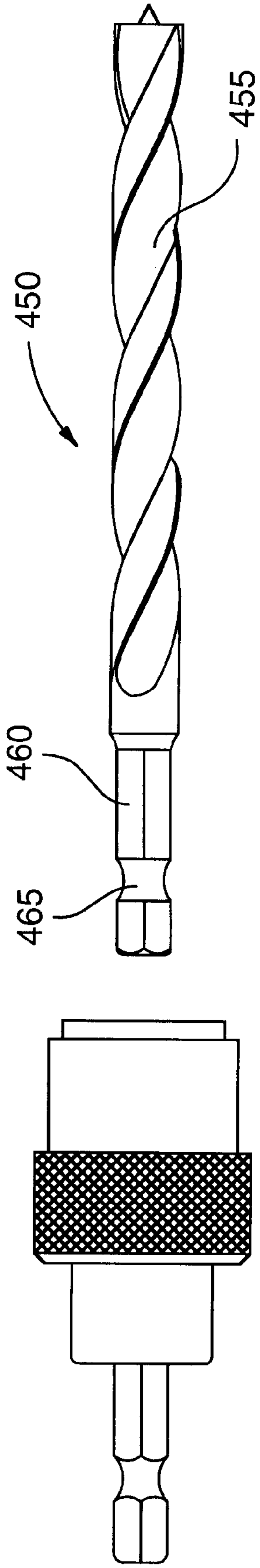
FIG. 64B is a side view of the device according to FIG. 64A.
Figure 65A:
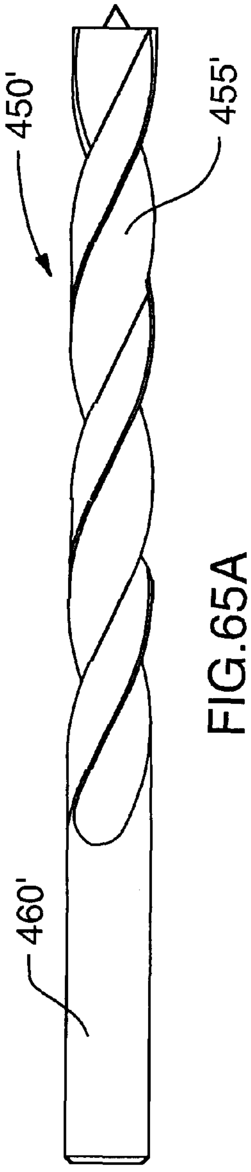
FIG. 65A is a side view of a first embodiment of a drill bit suitable for use with the device according to FIG. 64A.
Figure 65B:
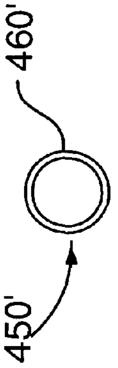
FIG. 65B is an end view of the drill bit as shown in FIG. 65A.

FIGS. 64 and 65 show a holder as described in FIG. 59 when used with a first embodiment of a drill bit 450. For reference numerals describing the holder, see FIG. 59. The drill bit preferably has a drill biting portion 455 at one end, a hex-shaped gripping portion 460 at the opposite end, and a retention groove 465 arranged on the hex-shaped portion. The retention groove cooperates with the washer of the holder to hold the drill bit securely, when the drill bit is inserted fully into the holder.

Figure 66A:
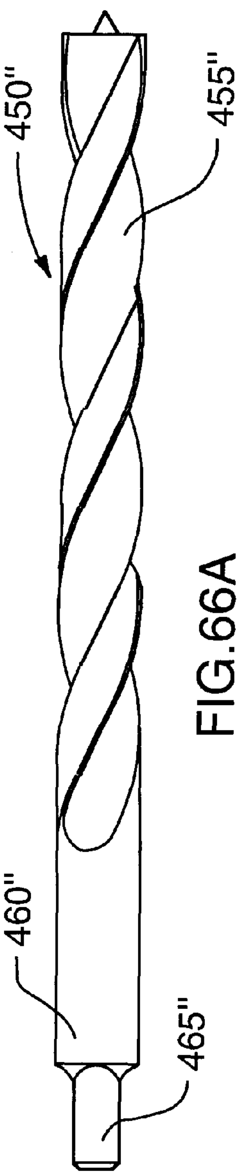
FIG. 66A is a side view of a second embodiment of a drill bit suitable for use with the device according to FIG. 64A.
Figure 66B:
FIG. 66B is an end view of the drill bit as shown in FIG. 66A.

A second embodiment of a drill bit 450" is shown in FIGS. 66A and 66B. The drill bit has a drill biting portion 455" and a cylindrical gripping portion 460", which the washer cooperates with to hold the drill bit in the holder. A rectangular drive portion 465" at the proximal end of the drill bit fits into a complementary-shaped proximal or inner end portion of the longitudinal hole 122, for torque transfer to the drill bit.

Figure 67A:
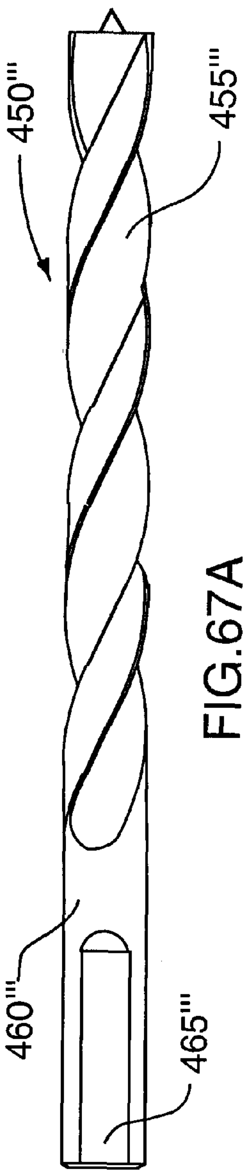
FIG. 67A is a side view of a third embodiment of a drill bit suitable for use with the device according to FIG. 64A.
Figure 67B:
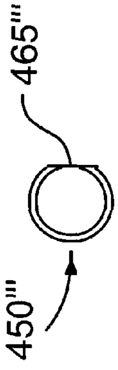
FIG. 67B is an end view of the drill bit as shown in FIG. 67A.

A third embodiment of a drill bit 450'" is shown in FIGS. 67A and 67B. The drill bit has a drill biting portion 455'" and a cylindrical gripping portion 460'", which the washer cooperates with to hold the drill bit in the holder. A drive portion 465'" at the proximal end of the drill bit has a flattened portion which fits into a complementary-shaped proximal or inner end portion of the longitudinal hole 122, for torque transfer to the drill bit.

Figure 68A:
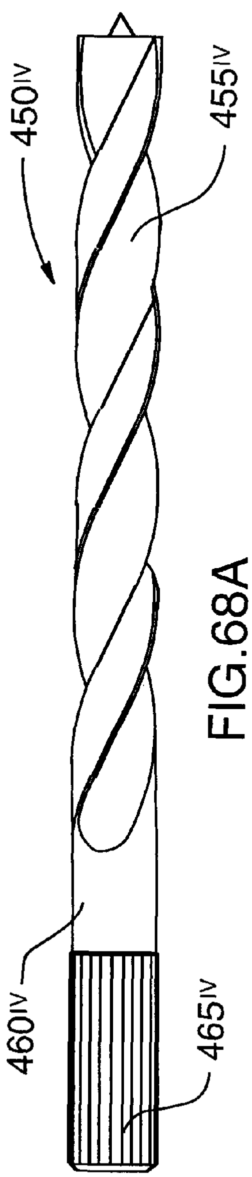
FIG. 68A is a side view of a fourth embodiment of a drill bit suitable for use with the device according to FIG. 64A.
Figure 68B:
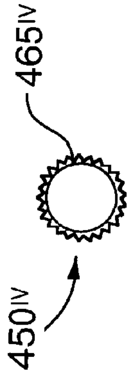
FIG. 68B is an end view of the drill bit as shown in FIG. 68A.

A fourth embodiment of a drill bit $\mathbf{450}^{IV}$ is shown in FIGS. 68A and 68B. The drill bit has a drill biting portion $\mathbf{455}^{IV}$ and a cylindrical gripping portion $\mathbf{460}^{V}$ which the washer cooperates with to hold the drill bit in the holder. A drive portion $\mathbf{465}^{V}$ at the proximal end of the drill bit has a splined or knurled portion which fits into a complementary-shaped proximal or inner end portion of the longitudinal hole 122, for torque transfer to the drill bit.

Figure 69A:
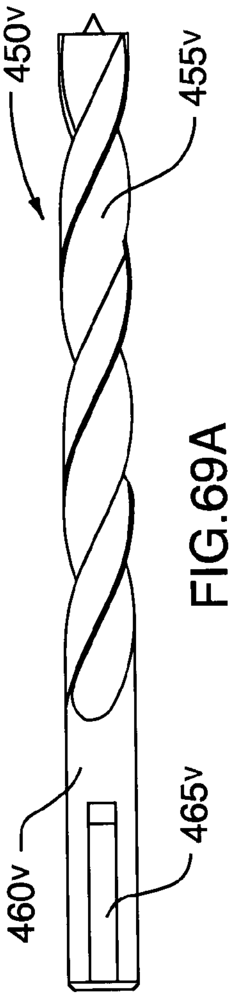
FIG. 69A is a side view of a fifth embodiment of a drill bit suitable for use with the device according to FIG. 64A.
Figure 69B:
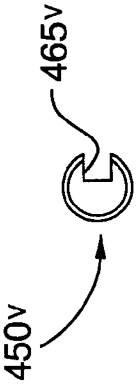
FIG. 69B is an end view of the drill bit as shown in FIG. 69A.

A fifth embodiment of a drill bit $\mathbf{450}^{V}$ is shown in FIGS. 69A and 69B. The drill bit has a drill biting portion $\mathbf{455}^{V}$ and a cylindrical gripping portion $\mathbf{460}^{V}$ which the washer cooperates with to hold the drill bit in the holder. A drive portion $\mathbf{465}^{V}$ at the proximal end of the drill bit has a slot or keyway which fits into a complementary-shaped proximal or inner end portion of the longitudinal hole 122, for torque transfer to the drill bit.

Figure 70A:
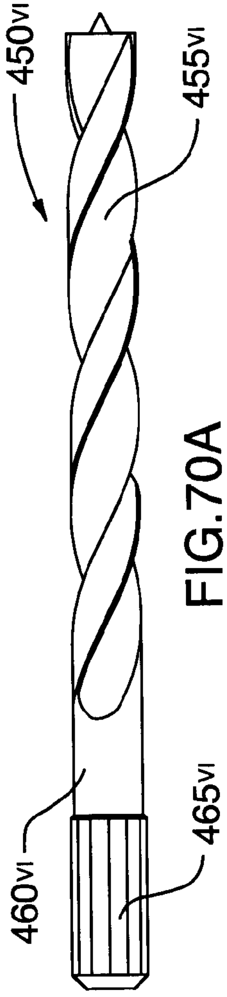
FIG. 70A is a side view of a sixth embodiment of a drill bit suitable for use with the device according to FIG. 64A.
Figure 70B:
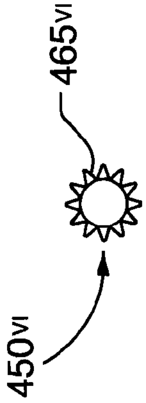
FIG. 70B is an end view of the drill bit as shown in FIG. 70A.

A sixth embodiment of a drill bit $\mathbf{450}^{VI}$ is shown in FIGS. 70A and 70B. The drill bit has a drill biting portion $\mathbf{45}^{VI}$ and a cylindrical gripping portion $\mathbf{460}^{VI}$ which the washer cooperates with to hold the drill bit in the holder. A drive portion $\mathbf{465}^{VI}$ at the proximal end of the drill bit has a toothed portion which fits into a complementary-shaped proximal or inner end portion of the longitudinal hole 122, for torque transfer to the drill bit.

Figure 71A:
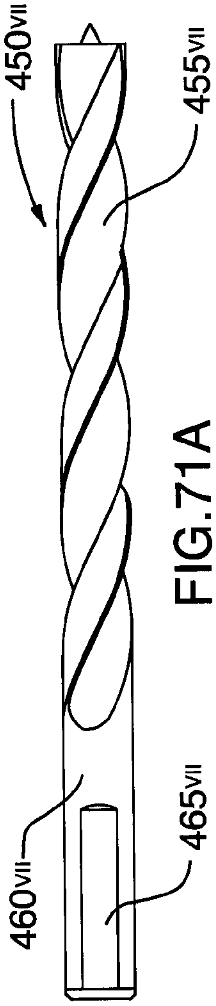
FIG. 71A is a side view of a seventh embodiment of a drill bit suitable for use with the device according to FIG. 64A.
Figure 71B:
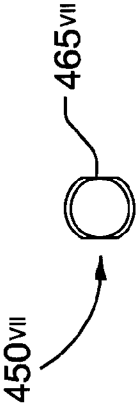
FIG. 71B is an end view of the drill bit as shown in FIG. 71A.

A seventh embodiment of a drill bit $\mathbf{450}^{VII}$ is shown in FIGS. 71A and 71B. The drill bit has a drill biting portion $\mathbf{455}^{VII}$ and a cylindrical gripping portion $\mathbf{460}^{VII}$ which the washer cooperates with to hold the drill bit in the holder. A drive portion $\mathbf{465}^{VII}$ at the proximal end of the drill bit has two flattened opposing sides, creating an ovaloid shape (or a true oval could be formed, of course), which fits into a complementary-shaped proximal or inner end portion of the longitudinal hole 122, for torque transfer to the drill bit.

Figure 72A:
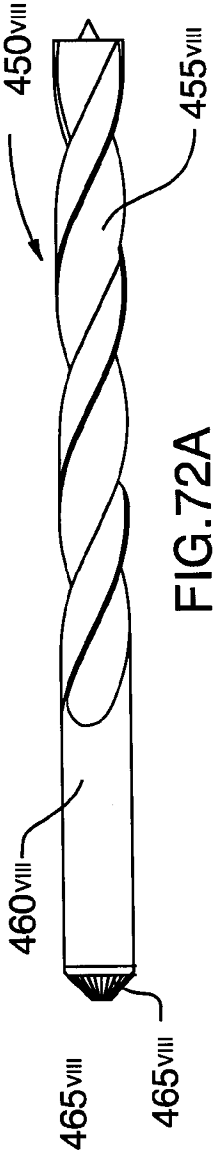
FIG. 72A is a side view of an eighth embodiment of a drill bit suitable for use with the device according to FIG. 64A.
Figure 72B:
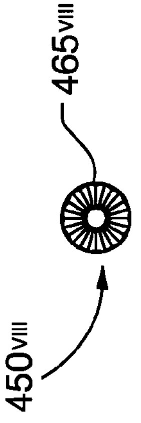
FIG. 72B is an end view of the drill bit as shown in FIG. 72A.

An eighth embodiment of a drill bit $\mathbf{450}^{VIII}$ is shown in FIGS. 72A and 72B. The drill bit has a drill biting portion $\mathbf{455}^{VIII}$ and a cylindrical gripping portion $\mathbf{460}^{VIII}$ which the washer cooperates with to hold the drill bit in the holder. A drive portion $\mathbf{465}^{VIII}$ at the proximal end of the drill bit has a bevelled gear portion which fits into a complementary-shaped (i.e. bevel geared) proximal or inner end portion of the longitudinal hole 122, for torque transfer to the drill bit.

Common to the second to eighth embodiments of a drill bit, as described above, is the necessity to provide a notch or other complementary shape in the holder, which notch or other shape has a cross-section corresponding to the cross-section of the drive portion of the drill bit, to ensure a proper torque transfer from the holder to the drill bit. It should be clearly understood that the preceding examples are not intended to be all-inclusive. Any shape could be used, as long as it engages suitably with the holder for suitable torque transfer.

Figure 73:
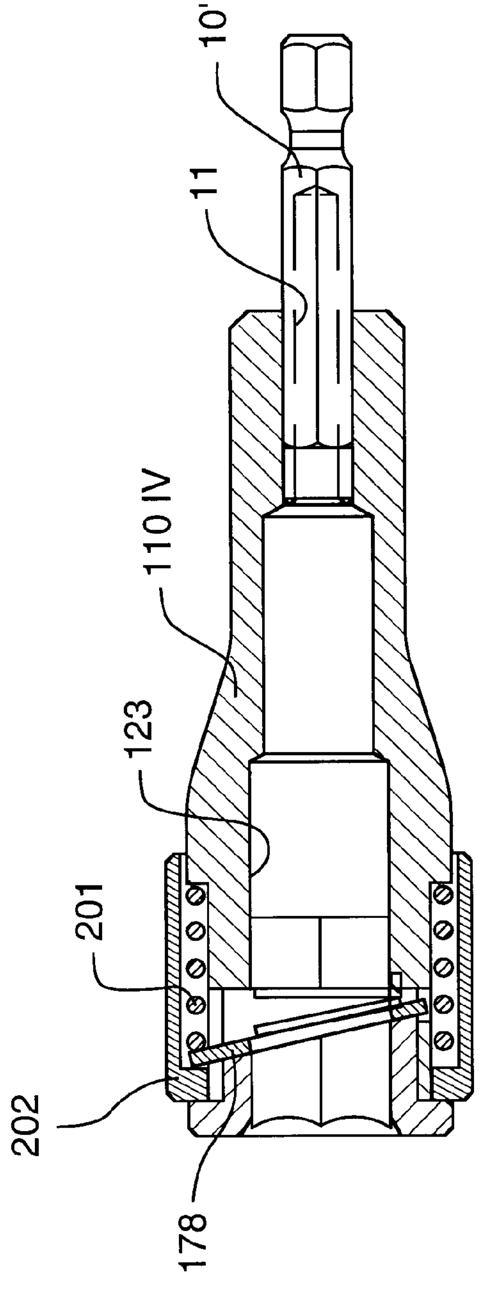
FIG. 73 is a partially sectioned side view of an eighteenth embodiment of a device according to the invention.
Figure 74A:
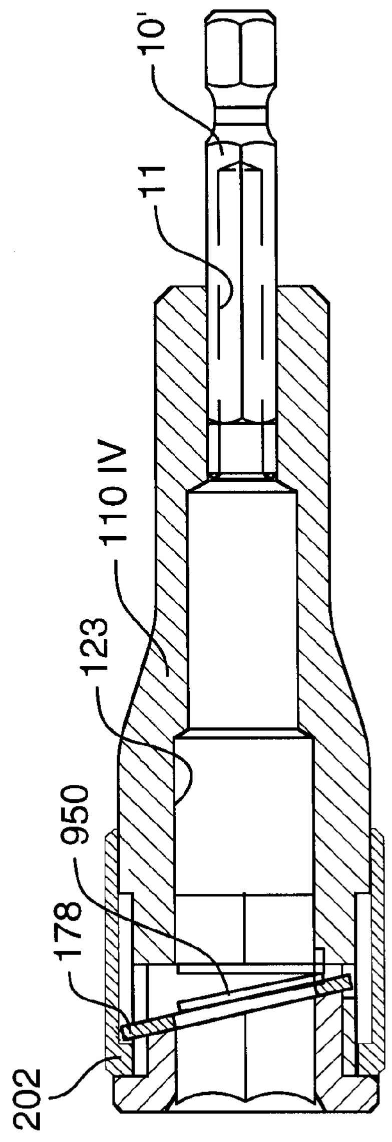
FIG. 74A is a partially sectioned side view of a nineteenth embodiment of a device according to the invention.
Figure 74C:
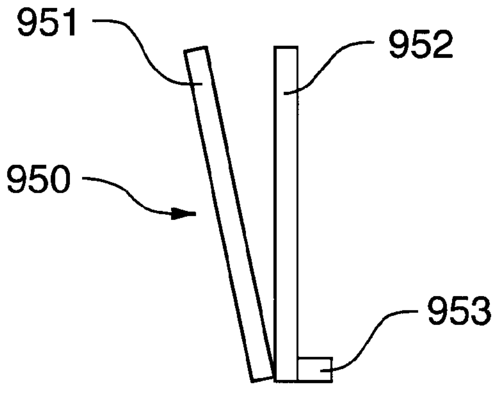
FIG. 74C is a side view of a wave spring as used in the device shown in FIG. 74A.
Figure 74B:
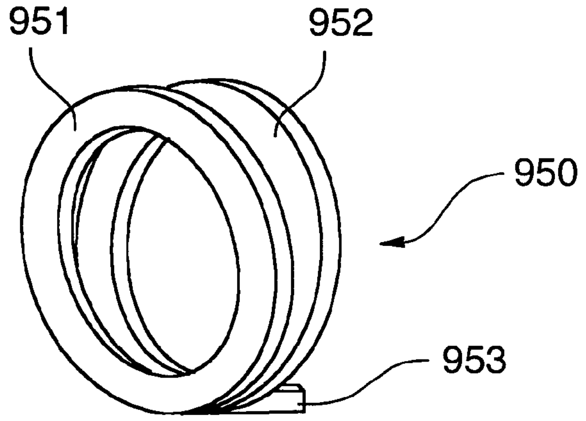
FIG. 74B is a perspective side view of a wave spring as used in the device shown in FIG.
Figure 74D:
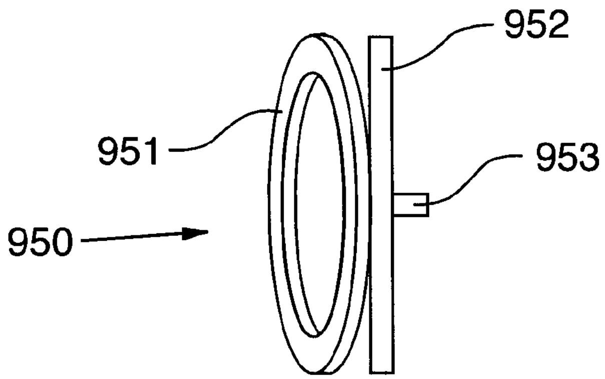
FIG. 74D is an end view of a wave spring as used in the device shown in FIG. 74A.

FIG. 73 shows a further variation of the seventeenth embodiment of the invention shown in FIG. 63A. All reference numerals of FIG. 73 correspond to the reference numerals of FIG. 63A, except a drill bit relief hole 11, arranged in the tool mount 10'. A further variation of the fifteenth embodiment is shown in FIGS. 74A to 74D. Instead of a spring type sleeve biasing means, a wave spring 950 is used. The wave spring has a first substantially ring-shaped part 951, a second substantially ring-shaped part 952 and a distance part 953. The first part is joined to the second part so that the first part is tilted an angle a with respect to the second part. The first part and the second part are joined at one point where also the distance part is joined protruding out from the second part.

Figure 75A:
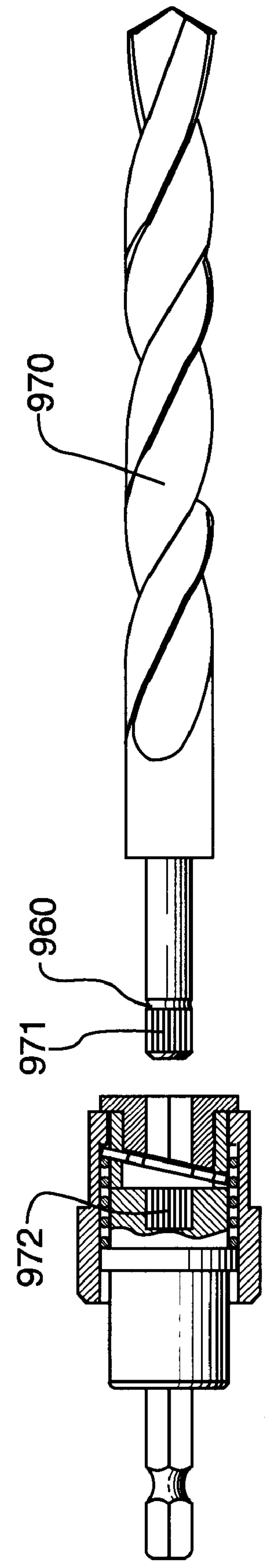
FIG. 75A is a partially sectioned side view of a further embodiment of the invention, showing a notched drill bit shank ready to be inserted in a holder according to the invention.
Figure 75B:
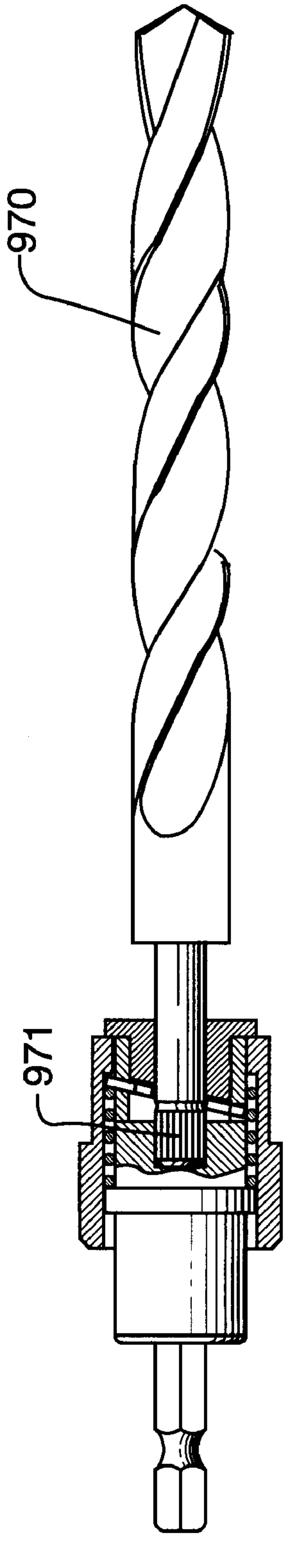
FIG. 75B is a partially sectioned view of the device of FIG. 75A, showing the drill bit fully inserted into the holder.

FIGS. 75A and 75B show a drill bit 970 for use in a holder according to the invention. The drill bit shank has a notch 960 to cooperate with the tilted washer of the holder, and has a proximal end portion 971 to engage a complementary shape 972 so torque can be transferred, for example one of the shapes in FIGS. 66–72. The notched shank principle is generally applicable to all drill bit shanks used in the invention, used with a holder having a tilted washer. The notch is not necessarily essential with the tilted washer (angled plate) embodiment, however, since the tilted washer itself may provide sufficient friction to prevent removal of the drill bit from the holder.

Figure 76:
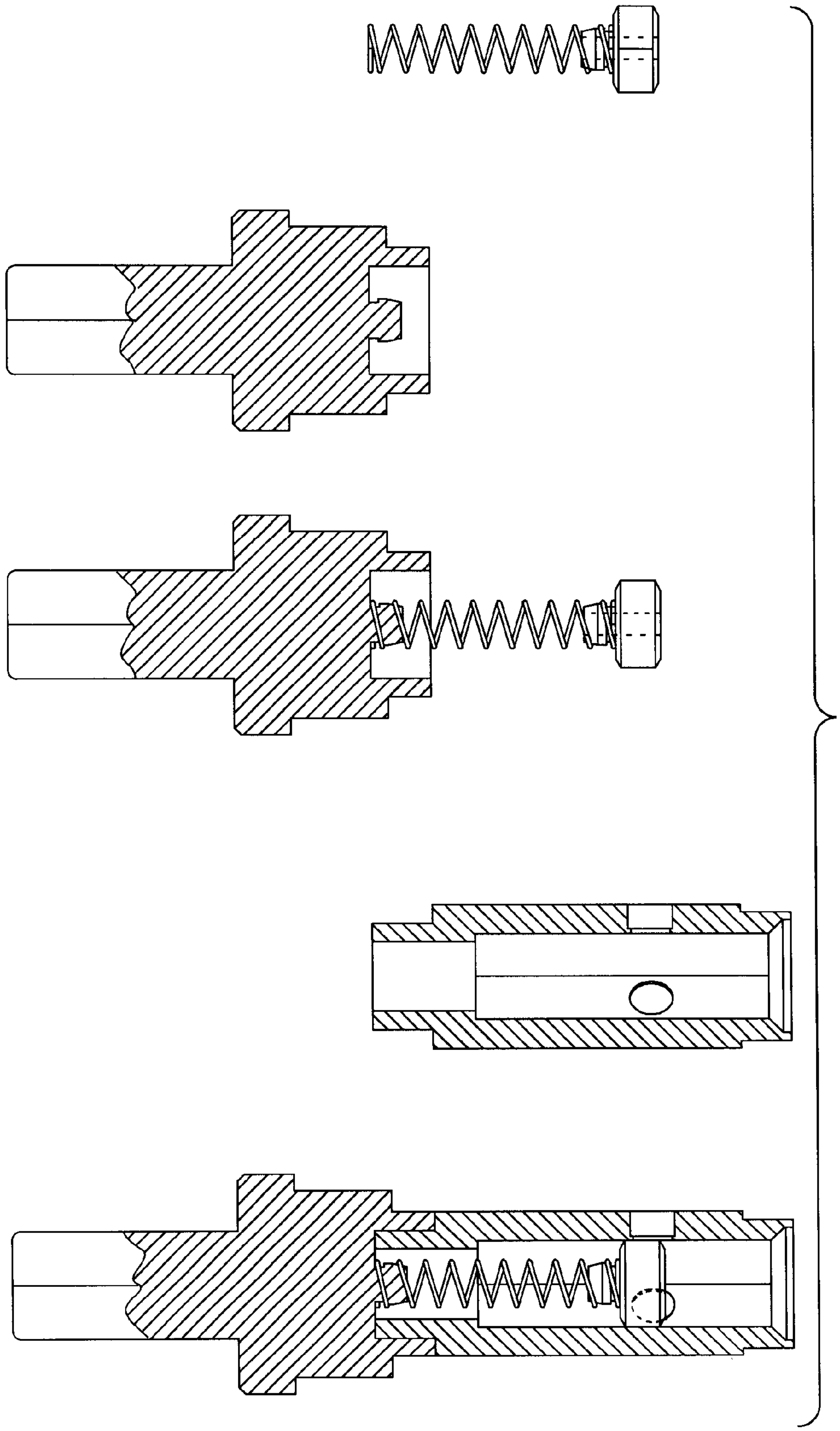
FIG. 76 is a view showing that the body can be in two pieces, if desired, namely a back housing and a nose piece.

FIG. 76 shows that the body can be in two pieces, if desired, namely a back housing and a nose piece. Similarly, the mounting portion or tool mount 10 could be a separate piece from the rest of the body, press-fitted or otherwise secured to the body.

The device according to any of the described embodiments of the invention adds safety to the use of the device, because the device automatically locks the tool bit in the holder after insertion. No action, other than the insertion itself, has to be performed by the user to insert and lock the tool bit in place. As a safeguard, the device has to be actively manipulated in order to release the tool bit from the holder again, but the tool bit will be automatically dislodged during this manipulation, so that the tool bit can be removed from the holder using only one hand.

It will be appreciated that the above description relates to the preferred embodiments by way of example only. Many variations on the invention will be obvious to those knowledgeable in the field, and such obvious variations are within the scope of the invention as described and claimed, whether or not expressly described. For example, one or more locking balls/locking bars/rocker arms may be employed to achieve the locking function of the invention.

What is claimed as the invention is:

1. A holder for a tool bit, the holder comprising:

a body having mounting means for securing a proximal end of said body to a driving tool, and an axial hole at a distal end thereof for receiving said tool bit, at least a portion of said axial hole having at least a portion of its cross-section corresponding to a corresponding cross-section of said tool bit when said tool bit is installed in said axial bole;

a locking means engaging at least a portion of said tool bit when said tool bit is installed in said axial hole;

a collar mounted around at least a portion of said body, slidable along said body between a bit-locking position and a bit-unlocking position, moving said collar from said bit-locking position freeing said bit from engagement by said locking means;

a spring mounted said body and said collar to bias said collar towards said bit-locking position; and a transition element projecting into said axial hole, said transition element arranged to be contained by said bit upon insertion, said transition element acting against said collar to above said collar towards said bit-locking position as said bit is inserted into said axial hole.

2. A holder as recited in claim 1, wherein said locking means comprises at least one locking ball arranged in a hole in said body, movable transversely between a locking position where said locking ball extends partially into said axial hole, and an unlocked position where said locking ball does not extend into said axial hole, said collar having means preventing movement of said locking ball from said locking position when said collar is in its bit-locking position, movement of said locking ball to said unlocked position being permitted when said collar is in its bit-unlocking position, said bit having means to receive said locking ball when said bit is installed.

3. A holder as recited in claim 1, wherein said body is in at least two parts, including a base part having said mounting means for securing a proximal end of said body to a driving tool, and a second part secured to said base part having said axial hole.

4. A holder as recited in claim 1, wherein said body is in at least two parts, including said mounting means being a separate part from the rest of said body, suitably secured to said body.

* * * * *

UNITED STATES PATENT AND TRADEMARK OFFICE

CERTIFICATE OF CORRECTION

PATENT NO. : 6,695,321 B2
DATED : February 24, 2004
INVENTOR(S) : Sanjeev Bedi and Kailashi C. Vasudeva It is certified that error appears in the above-identified patent and that said Letters Patent is hereby corrected as shown below:

Column 28,
Line 55, insert -- installed in said axial hole --
Line 66, insert -- transition element arranged to be contacted by said bit --

Column 29,
Line 2, insert -- said collar to move said collar towards said bit-locking --

Signed and Sealed this

Fourth Day of May, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,695,321 B2
APPLICATION NO. : 09/783082
DATED : February 24, 2004
INVENTOR(S) : Sanjeev Bedi and Kailash C. Vasudeva It is certified that error appears in the above-identified patent and that said Letters Patent is hereby corrected as shown below:

Column 28, Line 64, insert --between-- after "a spring mounted"

Signed and Sealed this
Fifth Day of July, 2011

David J. Kappos
*Director of the United States Patent and Trademark Office*